US008988494B2

(12) United States Patent
Imai et al.

(10) Patent No.: US 8,988,494 B2
(45) Date of Patent: Mar. 24, 2015

(54) STORAGE MEDIUM ENCODED WITH DISPLAY CONTROL PROGRAM, DISPLAY, DISPLAY SYSTEM, AND DISPLAY CONTROL METHOD

(75) Inventors: Daiji Imai, Kyoto (JP); Takahito Kita, Kyoto (JP); Motomasa Kondo, Kyoto (JP); Hiroshi Yamada, Kyoto (JP); Ryu Nadatani, Kyoto (JP)

(73) Assignee: Nintendo, Co., Ltd., Kyoto (JP)

( * ) Notice: Subject to any disclaimer, the term of this patent is extended or adjusted under 35 U.S.C. 154(b) by 385 days.

(21) Appl. No.: 13/091,939

(22) Filed: Apr. 21, 2011

(65) Prior Publication Data

US 2012/0176370 A1 Jul. 12, 2012

(30) Foreign Application Priority Data

Jan. 6, 2011 (JP) ................................. 2011-001532

(51) Int. Cl.
*H04N 13/00* (2006.01)
*H04N 13/04* (2006.01)
(52) U.S. Cl.
CPC ....... *H04N 13/0456* (2013.01); *H04N 13/0011* (2013.01)
USPC .......................................................... 348/42
(58) Field of Classification Search
CPC .......... H04N 13/0239; H04N 13/0055; H04N 13/0296; H04N 13/0497; H04N 13/0059; H04N 13/0022; H04N 13/00; H04N 13/0275; H04N 13/0282; H04N 13/0014; H04N 13/004; H04N 21/816; A63F 13/00
USPC ....................... 348/42, 51, 838, 840; 345/419
See application file for complete search history.

(56) References Cited

U.S. PATENT DOCUMENTS 6,833,828 B1 * 12/2004 Wininger ...................... 345/419
2002/0047835 A1 4/2002 Kawai et al.
(Continued)

FOREIGN PATENT DOCUMENTS

JP 2002-092656 3/2002
JP 2004-356820 12/2004
(Continued)

OTHER PUBLICATIONS

Nintendo 3DS Officially Released!!! E3 2010 Report, Fully Analyze Attractive Hardware Which Has Been Veiled in Secrecy! Will This Change Portable Game Devices?, Weekly Famitsu, Enterbrain Inc., Jun. 24, 2010, vol. 25, No. 27 w/partial English translation (22 pages total).

*Primary Examiner* — Andy Rao
*Assistant Examiner* — Jared Walker
(74) *Attorney, Agent, or Firm* — Nixon & Vanderhye, P.C.

(57) ABSTRACT

A display control program executed on a computer of a display having a first display portion capable of providing stereoscopic display and a second display portion configured to provide two-dimensional display is provided. The display control program includes object display instructions for controlling the first display portion and the second display portion such that a plurality of objects are displayed at respective arrangement positions set by arrangement position setting instructions and an object group is displayed across the first display portion and the second display portion. The object display instructions include instructions for determining on which of the first and second display portions objects included in the object group are to be displayed, and for providing stereoscopic display of an object determined to be displayed on the first display portion and providing two-dimensional display of an object determined to be displayed on the second display portion.

25 Claims, 29 Drawing Sheets

(56) References Cited

U.S. PATENT DOCUMENTS

| | | |
|---|---|---|
| 2003/0014754 A1* | 1/2003 | Chang ............................ 725/60 |
| 2007/0120856 A1 | 5/2007 | De Ruyter et al. |
| 2007/0178952 A1 | 8/2007 | Ehara et al. |
| 2008/0266386 A1* | 10/2008 | Maeda ........................... 348/47 |
| 2009/0115783 A1* | 5/2009 | Eichenlaub .................. 345/421 |
| 2009/0244258 A1* | 10/2009 | Masuda et al. ................. 348/43 |
| 2010/0005418 A1* | 1/2010 | Miyazaki et al. ............. 715/823 |
| 2010/0097446 A1* | 4/2010 | Miyazaki et al. ............... 348/51 |
| 2010/0188350 A1 | 7/2010 | Sawada |
| 2010/0201645 A1 | 8/2010 | Asami |
| 2011/0072464 A1 | 3/2011 | Watanabe et al. |

FOREIGN PATENT DOCUMENTS

| | | |
|---|---|---|
| JP | 2005-074094 | 3/2005 |
| JP | 2006-115467 | 4/2006 |
| JP | 2007-510215 | 4/2007 |
| JP | 2007-195830 | 8/2007 |
| JP | 2009-071588 | 4/2009 |
| JP | 2009-246625 | 10/2009 |
| JP | 2010-003260 | 1/2010 |
| JP | 2010-015442 | 1/2010 |
| JP | 2010-184009 | 8/2010 |
| JP | 2012-083809 | 4/2012 |
| WO | 2004-099965 A1 | 11/2004 |

* cited by examiner

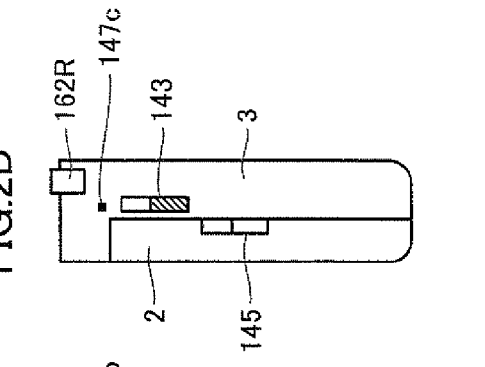
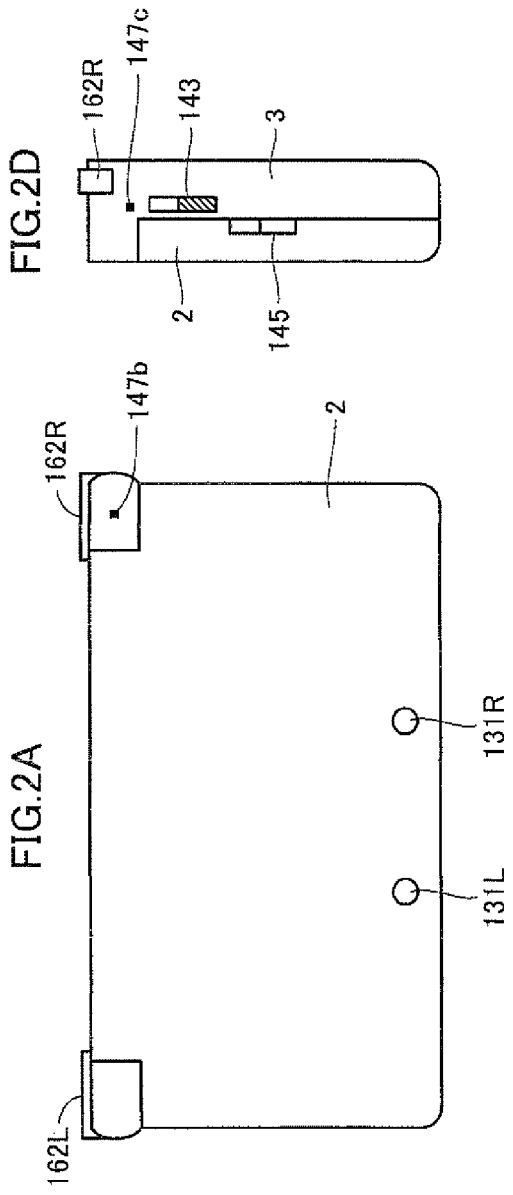
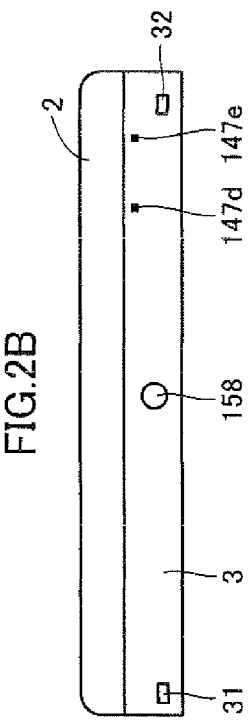
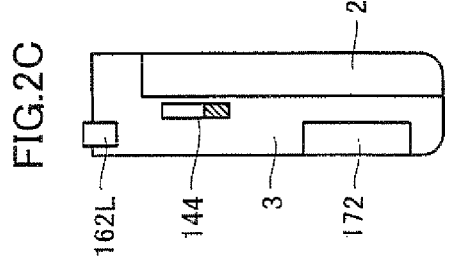

162R  174    170  176 179  162L 162R    170       176     162L

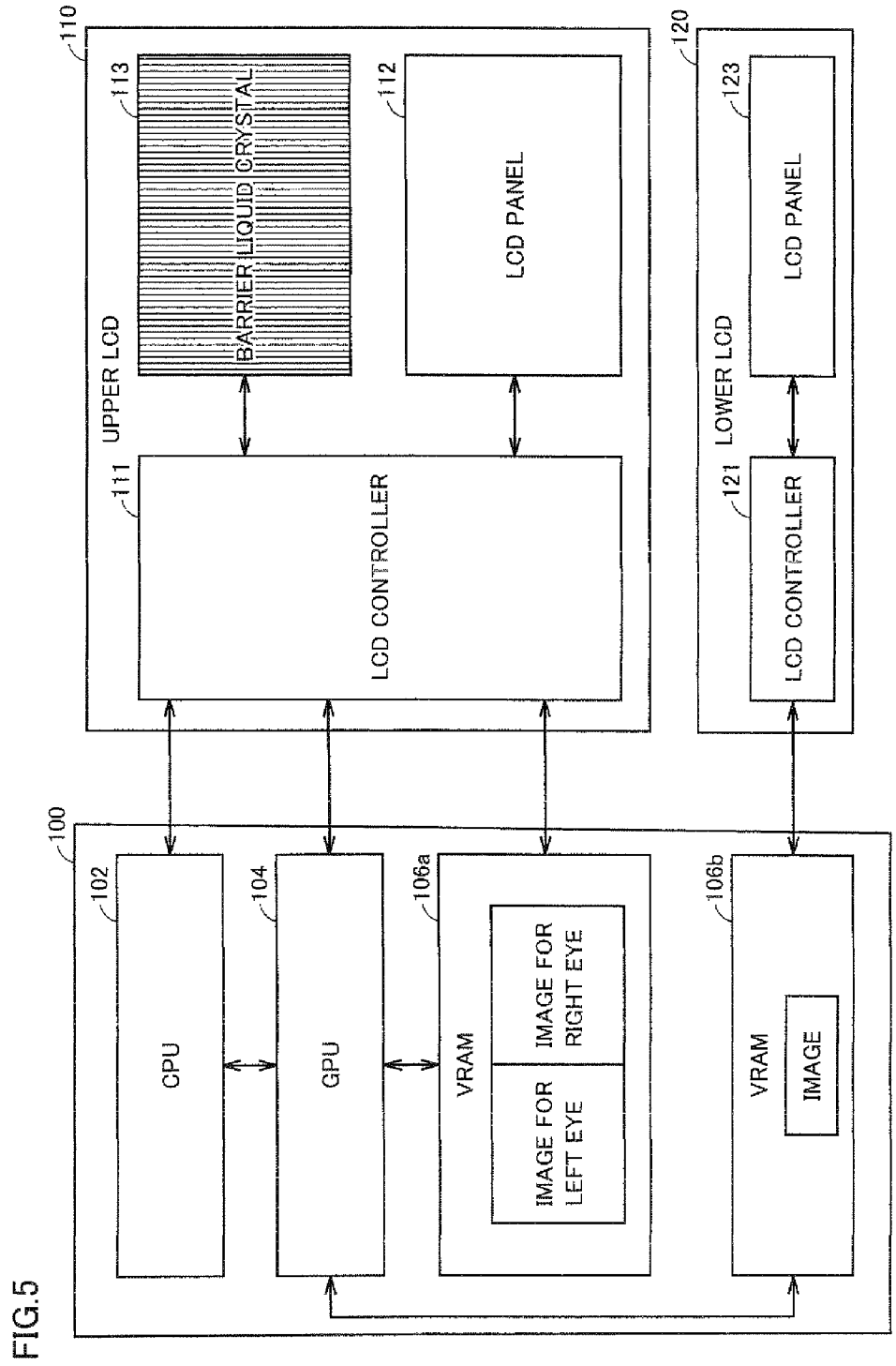

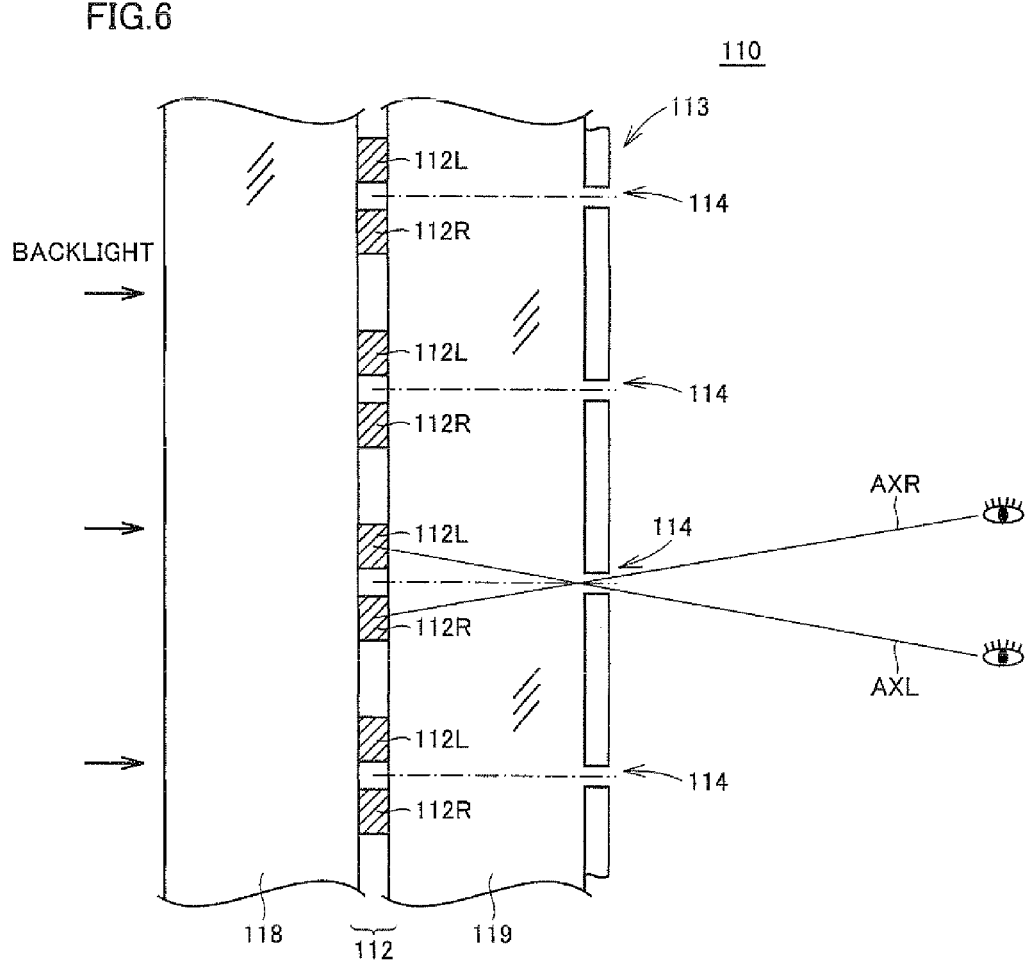

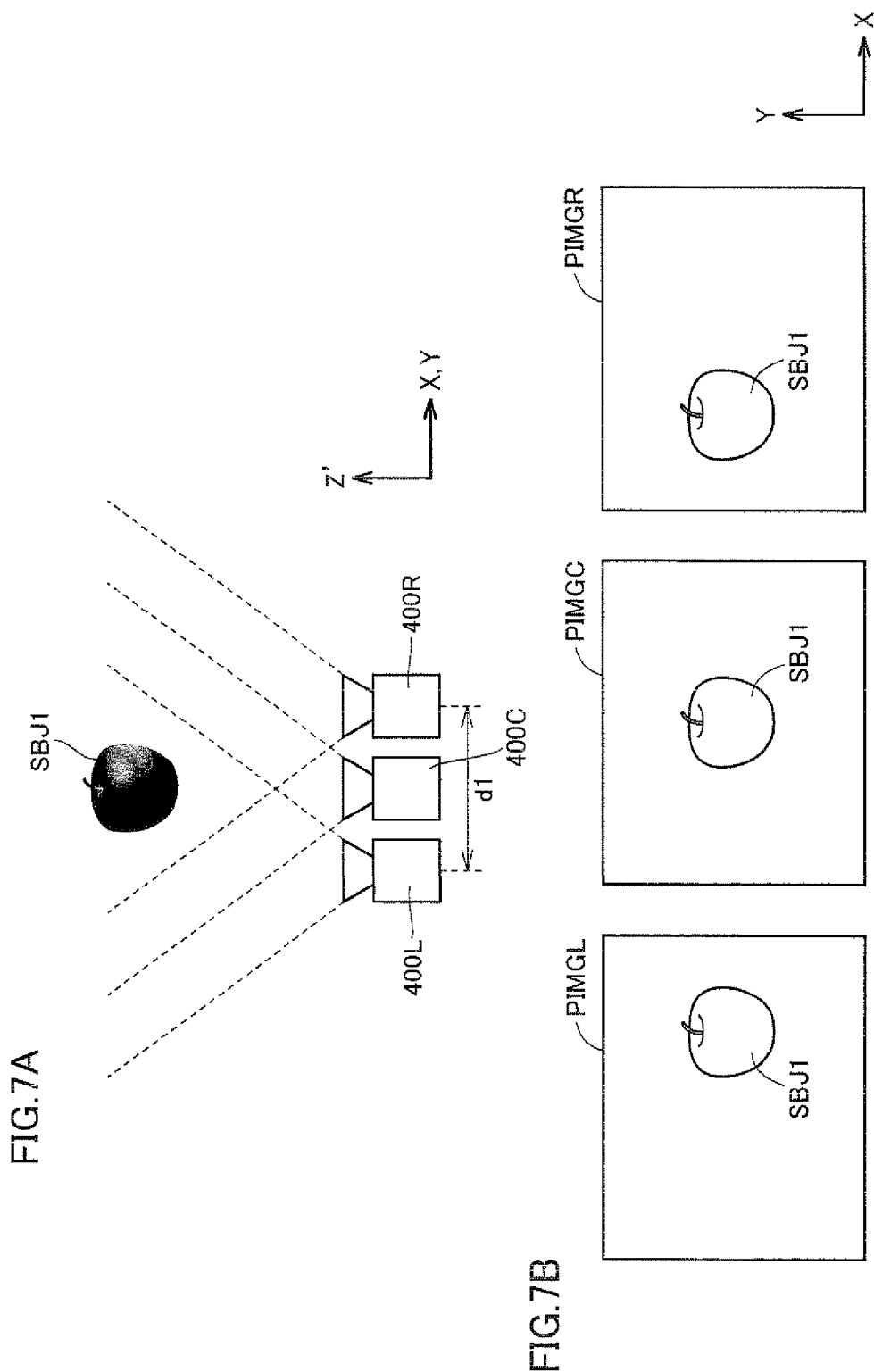

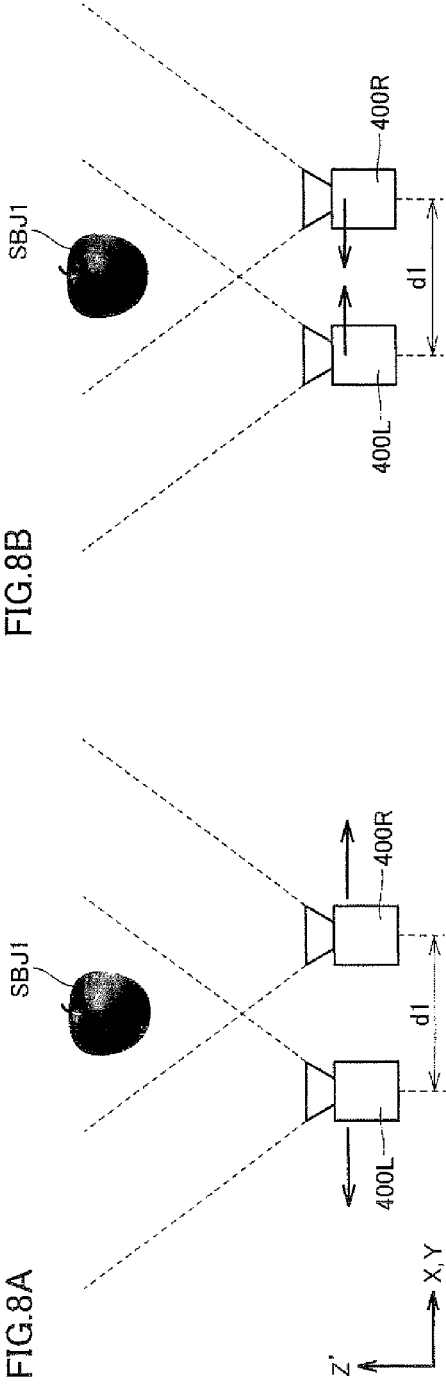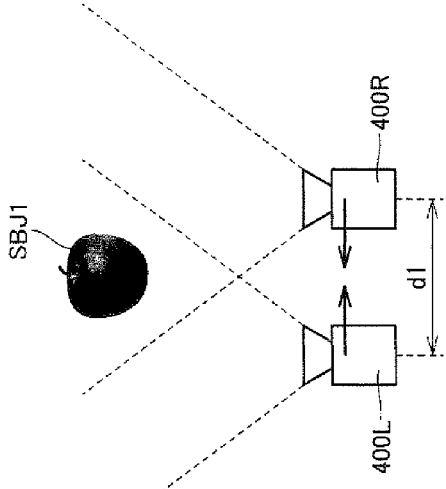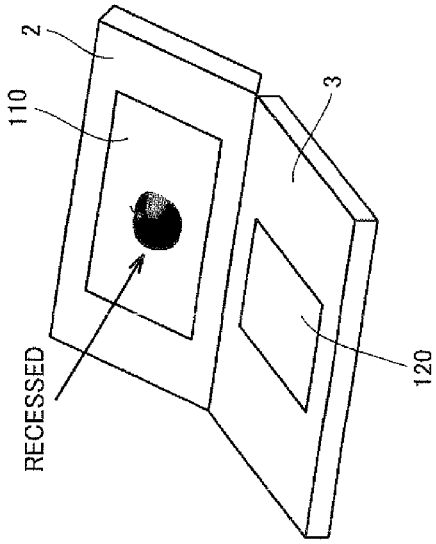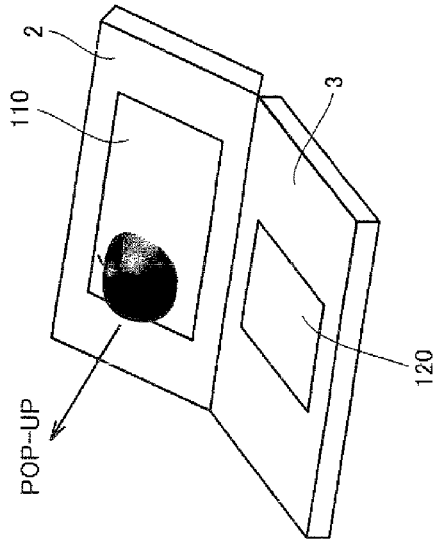

| ORDER | file NAME (TIME INFORMATION) |
|---|---|
| 1 | 20101201011200 |
| 2 | 20101201011500 |
| 3 | 20101201021000 |
| 4 | 20101201031500 |
| ( | ( |

360

← DELETE

| ORDER | file NAME (TIME INFORMATION) |
|---|---|
| 1 | 20101201011200 |
| 2 | 20101201011500 |
| 3 | 20101201031500 |
| 4 | 20101201041200 |
| ( | ( |

360

ADVANCED

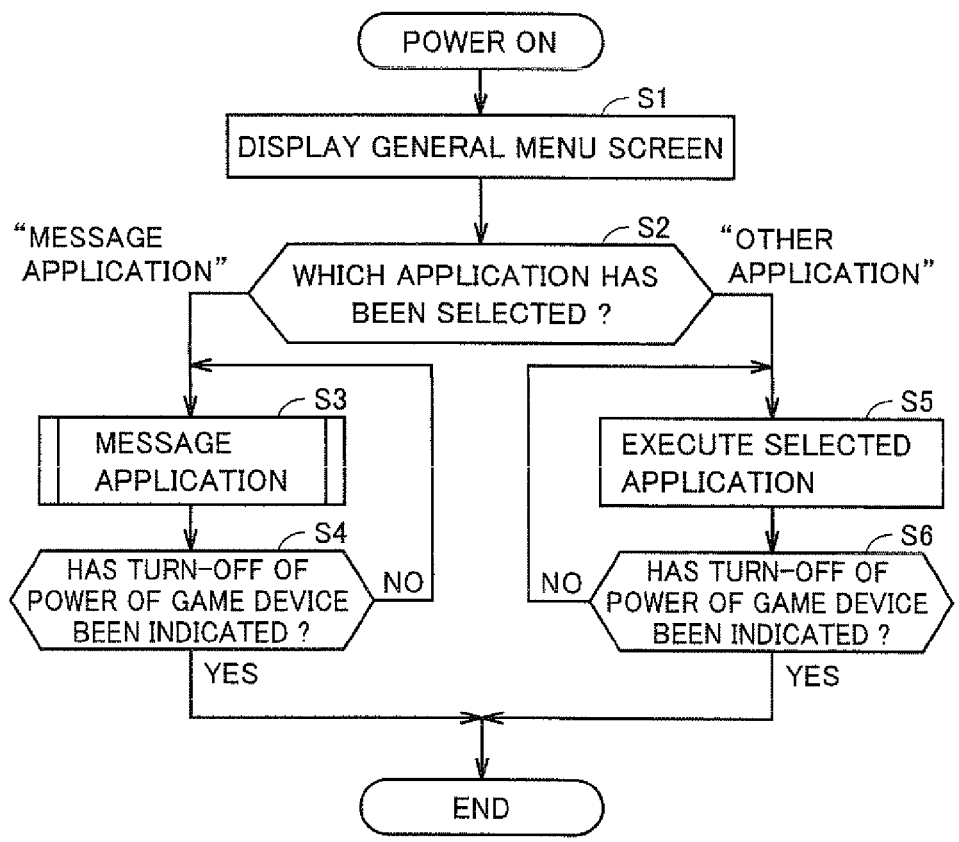

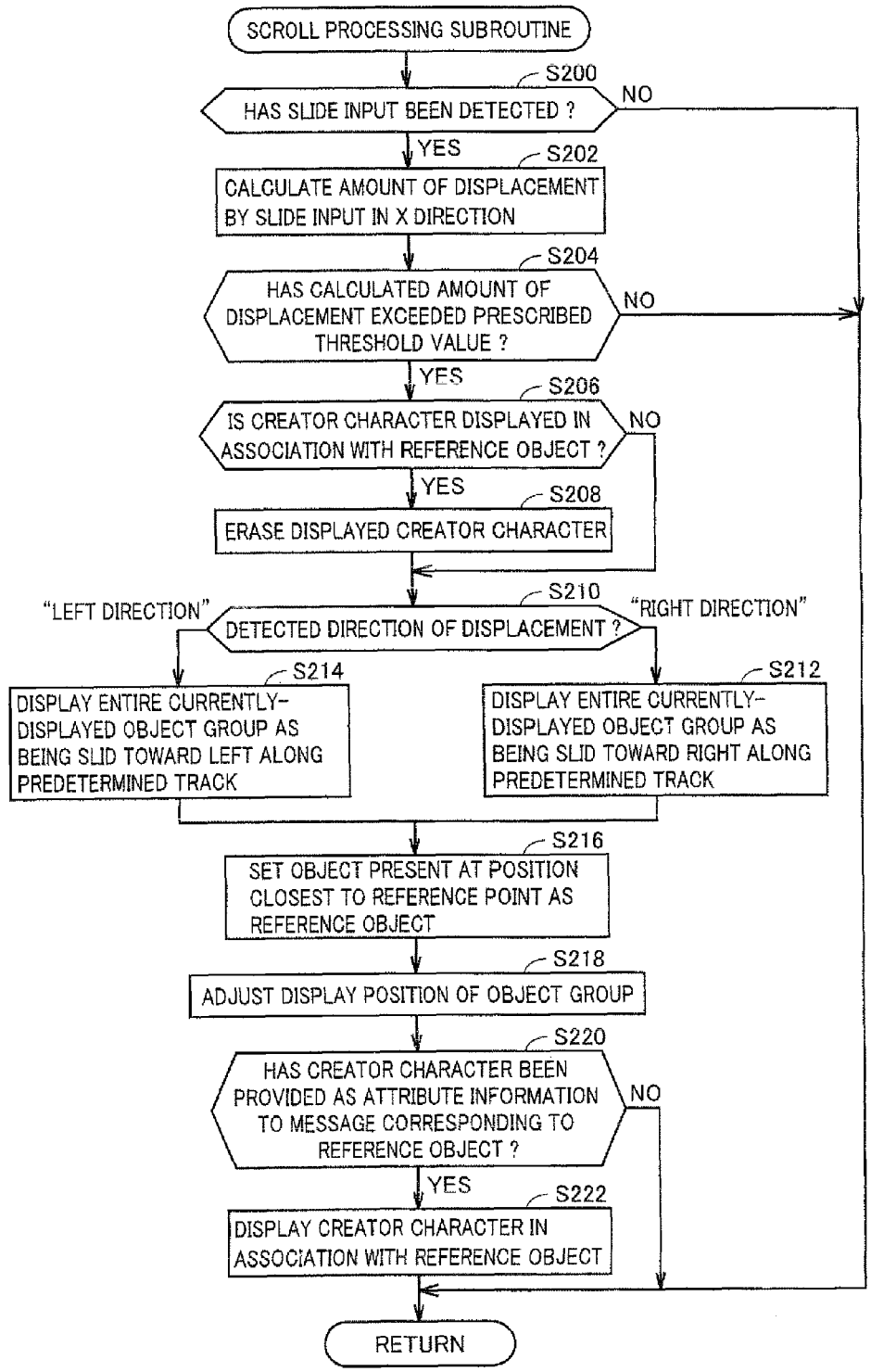

STORAGE MEDIUM ENCODED WITH DISPLAY CONTROL PROGRAM, DISPLAY, DISPLAY SYSTEM, AND DISPLAY CONTROL METHOD

This nonprovisional application is based on Japanese Patent Application No. 2011-001532 filed with the Japan Patent Office on Jan. 6, 2011, the entire contents of which are hereby incorporated by reference.

BACKGROUND OF THE INVENTION

1. Field of the Invention

The present invention relates to a storage medium encoded with a display control program executed on a computer of a display having a display portion capable of providing stereoscopic display, a display, a display system, and a display control method.

2. Description of the Background Art

An image processing device for displaying a plurality of pieces of display video image data (such as a thumbnail or an icon) in alignment in accordance with prescribed criteria has conventionally been proposed. In an image processing device disclosed, for example, in Japanese Patent Laying-Open No. 2006-115467, a plurality of object groups displayed in coordination are displayed such that they are continuously arranged in a manner three-dimensionally curved in an elliptical shape. In addition, an object serving as the reference is displayed with a large size in the center and objects are displayed in a manner gradually decreasing in size as they are more distant from the center. Thus, a user can search for a video image in a desired portion from among a series of video images.

According to a configuration of Japanese Patent Laying-Open No. 2006-115467, though a plurality of objects are three-dimensionally displayed, they can only two-dimensionally be displayed on an actual display device and hence reality of the displayed objects provided to the user has been limited.

SUMMARY OF THE INVENTION

An object of the present invention is to provide a storage medium encoded with a novel display control program capable of allowing display of a group of objects with enhanced reality, a display, a display system, and a display control method.

According to a first aspect of the present invention, a storage medium encoded with a display control program for controlling a display is provided. The display includes a first display portion capable of providing stereoscopic display and a second display portion configured to provide two-dimensional display. The display control program includes object group obtaining instructions for obtaining an object group consisting of a plurality of objects to be displayed, arrangement position setting instructions for setting arrangement positions of respective objects in the object group, and object display instructions for controlling the first display portion and the second display portion such that the plurality of objects are displayed at the respective arrangement positions set by execution of the arrangement position setting instructions and the object group is displayed across the first display portion and the second display portion. The object display instructions include instructions for determining on which of the first display portion and the second display portion an object included in the object group is to be displayed, and for providing stereoscopic display of an object determined to be displayed on said first display portion and providing two-dimensional display of an object determined to be displayed on said second display portion.

According to the first aspect of the present invention, in displaying the object group consisting of the plurality of objects, the user can feel enhanced reality because at least some objects are stereoscopically displayed.

In addition, according to the first aspect of the present invention, by providing stereoscopic display of at least some objects, recognition of not only a two-dimensional position but also positional relation in a direction perpendicular to the display surface can also be facilitated. Therefore, a developer can enhance a degree of freedom for setting a display position without paying attention to a position of display of an object. When display of a large number of objects is attempted in two-dimensional display, the objects overlap in the identical plane and ease in recognition of the objects is disadvantageously lowered. In contrast, according to the present aspect, even though the objects overlap in the identical plane, positional relation between the objects in a direction of depth can readily be recognized as a result of stereoscopic display, and hence a degree of freedom in arranging and displaying the objects can be enhanced and ease in visual recognition in displaying the objects can be improved.

Moreover, according to the first aspect of the present invention, by displaying the object group across two display portions, a larger number of objects can simultaneously be displayed. Thus, in a case where a large number of objects should simultaneously be displayed, user's ease of visual recognition of the objects can be improved.

Further, according to the first aspect of the present invention, by providing stereoscopic display of some objects and two-dimensional display of remaining objects, based on comparison therebetween, the user can feel further depth of the stereoscopically displayed object. Thus, user's ease of visual recognition of the object group can be improved.

According to a second aspect of the present invention, in the first aspect of the present invention, the arrangement position setting instructions include instructions for setting the arrangement positions of the respective objects in accordance with an order of arrangement set in advance.

According to the second aspect of the present invention, the objects are arranged in accordance with the order of arrangement set in advance. Therefore, even when the object group is moved as a whole, relation among the objects can readily be grasped.

According to a third aspect of the present invention, in the second aspect of the present invention, the object display instructions include instructions for setting a reference object serving as the reference among the plurality of objects included in the object group, and for stereoscopically displaying the objects on the first display portion such that an object ordered or positioned more distantly from the object is greater in stereo depth in a direction perpendicular to a display surface of the first display portion.

According to the third aspect of the present invention, an object ordered or positioned more distantly from the reference object is stereoscopically displayed such that it is greater in stereo depth in the direction perpendicular to the display surface of the display portion. Therefore, an object more distant from the object serving as the reference is stereoscopically displayed with increased sense of depth. Thus, even when the objects are displayed in a manner overlapping on the display surface, respective display positions thereof look different in the direction of depth (the direction perpendicular to the display surface) and hence user's ease of visual recognition of the object can be improved.

According to a fourth aspect of the present invention, in the third aspect of the present invention, the arrangement position setting instructions include instructions for setting the arrangement positions of the objects displayed on the first display portion such that the object ordered or positioned more distantly from the reference object is greater in a value of depth in a virtual three-dimensional space, and the object display instructions include instructions for providing stereoscopic display such that the object ordered or positioned more distantly from the reference object is greater in stereo depth in the direction perpendicular to the display surface of the first display portion, by arranging a left virtual camera and a right virtual camera in the virtual three-dimensional space and causing the first display portion to display an image for left eye and an image for right eye obtained as a result of image pick-up of each object by the left virtual camera and the right virtual camera respectively.

According to the fourth aspect of the present invention, stereoscopic display is realized by picking up an image of an object with the left virtual camera and the right virtual camera in the virtual three-dimensional space. Thus, stereoscopic display can be realized by arranging any object in the virtual three-dimensional space. Therefore, stereoscopic display high in a degree of freedom can be realized without increasing burden imposed on the developer.

According to a fifth aspect of the present invention, in the third or fourth aspect of the present invention, the display further has a pointing device accepting a user's operation, the object display instructions include instructions for displaying at least the reference object on the second display portion, and the display control program further includes input instructions for allowing selection of the reference object displayed on the second display portion with the use of the pointing device.

According to the fifth aspect of the present invention, if selection of a stereoscopically displayed object is attempted with the use of a pointing device, it may become difficult to intuitively select the object because of a sense of depth involved with stereoscopic display. An operation, however, is performed on the reference object (and an object in the vicinity thereof) two-dimensionally displayed on the second display portion, and hence the user can readily select the object of interest with the use of the pointing device.

According to a sixth aspect of the present invention, in any of the first to fifth aspects of the present invention, the object display instructions include instructions for providing stereoscopic display of the objects on the first display portion in a manner overlapping in a direction of depth in accordance with stereo depth in a direction perpendicular to a display surface of the first display portion.

According to the sixth aspect of the present invention, by expressing the stereoscopically displayed objects in a manner overlapping in a direction of depth in accordance with the stereo depth, the number of objects that can simultaneously be displayed can be increased, while ease in visual recognition is improved.

According to a seventh aspect of the present invention, in the first aspect of the present invention, the computer of the display can interact with transmission and reception instructions for transmitting and receiving data of a displayed object to and from another device, and the object display instructions include instructions for displaying each object included in the object group in a manner in accordance with information on corresponding data.

According to the seventh aspect of the present invention, the user can intuitively recognize the information on each object.

According to an eighth aspect of the present invention, in the seventh aspect of the present invention, the information on the data includes information for identifying whether the data is data that has been transmitted to another device or received from another device, and the object display instructions include instructions for displaying each object included in the object group in a manner allowing identification of whether the corresponding data is data that has been transmitted to another device or received from another device.

According to the eighth aspect of the present invention, the user can intuitively recognize whether corresponding data is data that has been transmitted to another device or received from another device. Thus, even when an object group in which data transmitted to another device and data received from another device are together present in a mixed manner should be displayed, the user can readily recognize the contents therein.

According to a ninth aspect of the present invention, in the eighth aspect of the present invention, the information on the data includes information indicating a creator of the data, and the object display instructions include instructions for displaying an object included in the object group in association with the information indicating the corresponding creator.

According to the ninth aspect of the present invention, the user can intuitively recognize the creator of the corresponding data.

According to a tenth aspect of the present invention, in the seventh aspect of the present invention, the display control program further includes processing execution instructions for performing associated processing on an object designated by a users operation, the information on the data includes information for identifying whether the associated processing has been performed on the corresponding object or not, and the object display instructions include instructions for displaying each object included in the object group in a manner allowing identification of whether the associated processing has been performed or not.

According to the tenth aspect of the present invention, even if the associated processing can be performed on each object included in the object group, the user can readily recognize whether the processing has already been performed on each object or not.

According to an eleventh aspect of the present invention, in the tenth aspect of the present invention, the display control program further includes object selection instructions for accepting selection of one object from among the displayed plurality of objects, and the processing execution instructions include instructions for displaying the object selected by the object selection instructions in a zoomed-up manner.

According to the eleventh aspect of the present invention, as the associated processing for the object, the selected object is displayed in a zoomed-up manner and therefore the user can readily check the contents in the selected object.

According to a twelfth aspect of the present invention, in the first aspect of the present invention, the object display instructions include instructions for displaying the plurality of objects included in the object group in alignment along a track extending from a reference point in two different directions.

According to the twelfth aspect of the present invention, by extending the track on which the objects are arranged in alignment in two different directions, a larger number of objects can simultaneously be displayed. In addition, since the objects are arranged on the track extending in the two different directions, the user can clearly recognize also the order of arrangement.

According to a thirteenth aspect of the present invention, in the first aspect of the present invention, the object display instructions include instructions for displaying the plurality of objects included in the object group in alignment along a track in an inverted omega shape.

According to the thirteenth aspect of the present invention, since the objects are arranged in alignment along the track in the inverted omega shape, a larger number of objects can simultaneously be displayed by making effective use of a space in the display portion.

According to a fourteenth aspect of the present invention, in the twelfth or thirteenth aspect of the present invention, the object display instructions include instructions for providing stereoscopic display such that an object ordered or positioned on the track more distantly from a reference object serving as the reference among the plurality of objects included in the object group is greater in stereo depth in a direction perpendicular to a display surface of the first display portion.

According to the fourteenth aspect of the present invention, by differing stereo depth of the objects to be displayed together with differing positions thereof, each object can more clearly be recognized.

According to a fifteenth aspect of the present invention, in the first aspect of the present invention, the object is configured such that time information can be set therefor, and the arrangement position setting instructions include instructions for setting the arrangement position such that the plurality of objects are chronologically displayed based on the time information set for each object included in the object group.

According to the fifteenth aspect of the present invention, since the plurality of objects are chronologically displayed based on the time information set therefor, the user can recognize the plurality of objects in time sequence.

According to a sixteenth aspect of the present invention, in the thirteenth aspect of the present invention, the display control program further includes object generation instructions for generating an object in accordance with a user's operation, and the object generation instructions include instructions for providing the generated object with time information indicating a time of generation or a time designated by the user's operation.

According to the sixteenth aspect of the present invention, as the user generates an object, the object is provided with time information without user's awareness Therefore, even in a case where the arrangement position of each object is set based on the time information, such a situation that the time information is absent can be avoided and the object groups can be displayed in a proper order.

In addition, according to the sixteenth aspect of the present invention, the user can set any time information for the object. Thus, even in a case where each object is subjected to some kind of processing based on the time information set therefor, processing intended by the user in advance can be performed.

According to a seventeenth aspect of the present invention, in the second aspect of the present invention, the object display instructions include instructions for changing in accordance with a user's operation, the respective arrangement positions of the plurality of objects by moving the plurality of objects over a prescribed track while a set order of arrangement is maintained.

According to the seventeenth aspect of the present invention, the object group as a whole can be scrolled while the order of arrangement of the objects in the object group is maintained. Thus, the user can set an object of interest in the object group at a more readily visually recognizable position or the like.

According to an eighteenth aspect of the present invention, in the first aspect of the present invention, the object display instructions include instructions for setting a reference object serving as the reference among the plurality of objects included in the object group and for displaying an object ordered or positioned more distantly from the reference object with a smaller size on the first display portion.

According to the eighteenth aspect of the present invention, by differing a size of the object in accordance with the order or the position together with stereoscopic display, reality of stereoscopic effect (sense of depth) can further be enhanced.

A display according to a nineteenth aspect of the present invention includes a first display portion capable of providing stereoscopic display, a second display portion configured to provide two-dimensional display, an object group obtaining unit for obtaining an object group consisting of a plurality of objects to be displayed, an arrangement position setting unit for setting arrangement positions of respective objects in the object group, and an object display unit for controlling the first display portion and the second display portion such that the plurality of objects are displayed at the respective arrangement positions set by the arrangement position setting unit and the object group is displayed across the first display portion and the second display portion.

The object display unit determines on which of the first display portion and the second display portion an object included in the object group is to be displayed, and provides stereoscopic display of an object determined to be displayed on said first display portion and provides two-dimensional display of an object determined to be displayed on said second display portion.

According to a twentieth aspect of the present invention, a display system including a display having a first display portion capable of providing stereoscopic display and a second display portion configured to provide two-dimensional display and an entity capable of communicating with the display is provided. The display system includes an object group obtaining unit for obtaining an object group consisting of a plurality of objects to be displayed, an arrangement position setting unit for setting arrangement positions of respective objects in the object group, and an object display unit for controlling the first display portion and the second display portion such that the plurality of objects are displayed at the respective arrangement positions set by the arrangement position setting unit and the object group is displayed across the first display portion and the second display portion. The object display unit determines on which of the first display portion and the second display portion an object included in the object group is to be displayed, and provides stereoscopic display of an object determined to be displayed on said first display portion and provides two-dimensional display of an object determined to be displayed on said second display portion.

According to a twenty-first aspect of the present invention, a display control method performed in a computer of a display having a first display portion capable of providing stereoscopic display and a second display portion configured to provide two-dimensional display is provided. The display control method includes an object group obtaining step of obtaining an object group consisting of a plurality of objects to be displayed, an arrangement position setting step of setting arrangement positions of respective objects in the object group, and an object display step of controlling the first display portion and the second display portion such that the plurality of objects are displayed at the respective arrangement positions set in the arrangement position setting step and the object group is displayed across the first display portion and the second display portion. The object display step includes the step of determining on which of the first display portion and the second display portion an object included in the object group is to be displayed and the step of providing stereoscopic display of an object determined to be displayed on said first display portion and providing two-dimensional display of an object determined to be displayed on said second display portion.

According to the nineteenth to twenty-first aspects of the present invention, the functions and effects as in the invention according to the first aspect described above can be achieved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2D are projection views with an upper surface side of the game device shown in FIG. 1 being the center.

FIG. 5 is a block diagram showing an electrical configuration for implementing display control in the game device according to the embodiment of the present invention.

FIG. 6 is a schematic cross-sectional view of an upper LCD shown in FIG. 5.

FIGS. 7A and 7B are diagrams for illustrating one example of a method of generating an image used for display control in the game device according to the embodiment of the present invention.

FIGS. 8A and 8B are diagrams for illustrating a method of realizing stereoscopic display using the image generated with the method shown in FIGS. 7A and 7B.

FIGS. 25 and 26 are flowcharts involved with a processing procedure performed in the game device according to the present embodiment.

FIG. 29 is a flowchart showing processing contents in a scroll processing subroutine shown in FIG. 26.

DESCRIPTION OF THE PREFERRED EMBODIMENTS

Figure 1:
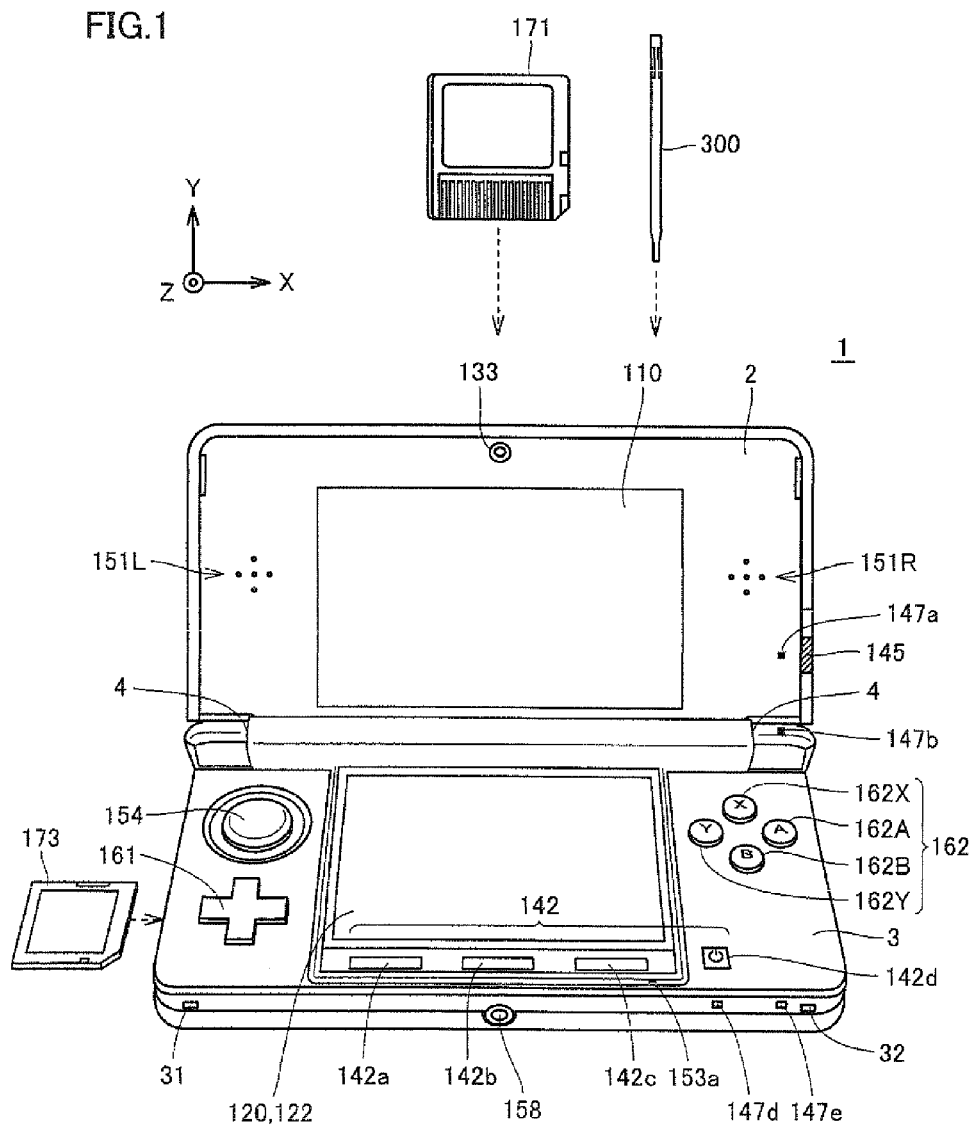
FIG. 1 is a front view of a game device (in an opened state) according to an embodiment of the present invention.

An embodiment of the present invention will be described in detail with reference to the drawings. The same or corresponding elements in the drawings have the same reference characters allotted, and description thereof will not be repeated.

A portable game device 1 representing a computer will be described hereinafter as a representative example of a display according to the present invention. In particular, game device 1 according to the present embodiment has at least one display portion capable of providing stereoscopic display as will be described later, and this display portion can be used to provide stereoscopic display of an image (object) by making use of parallax.

The game device according to the present invention is not limited to an implementation as portable game device 1, and it may be implemented as a stationary game device, a personal computer, a portable telephone, a portable terminal, or the like. In addition, as will be described later, an implementation as a display system including a recording medium storing a display control program according to the present invention and a processing device main body on which the recording medium can be mounted may be possible. Moreover, a display control method according to the present invention may be implemented by a display having a display portion capable of providing stereoscopic display and an entity capable of communicating with the display as being in coordination with each other.

A. DEFINITION

"Stereoscopic display", "three-dimensional display" and "3D display" herein mean that an image is expressed in such a manner as enabling a user to stereoscopically visually recognize at least some images (objects). In order for a user to stereoscopically visually recognize an object, typically, physiological functions of human eyes and brain are made use of. Such stereoscopic display is realized by using images generated to enable the user to stereoscopically visually recognize an object (typically, stereo images having parallax).

"Stereo depth" herein refers to a position of an object in a direction perpendicular to a display surface, of which presence is visually recognized by the user. Namely, "stereo depth" refers to a display position of an object in a direction perpendicular to a display surface (position in a direction of depth). In the description below, "stereo depth" in such a state that an object is displayed toward the user relative to the display surface is also referred to as an "amount of pop-up," and "stereo depth" in such a state that an object is displayed opposite to the user relative to the display surface is also referred to as an "amount of recess." In addition, "stereo depth" can also be expressed as a degree or intensity of stereoscopic effect or parallax.

"Two-dimensional display" and "2D display" herein are terms relative to "stereoscopic display" and the like described above, and they refer to representation of an image in such a manner that the user cannot stereoscopically visually recognize the image (object).

B. OVERVIEW

Game device 1 representing a typical example of a display according to the present embodiment has a display portion (an upper LCD 110) capable of providing stereoscopic display. As a computer of game device 1 executes a display control program, an object group consisting of a plurality of objects is displayed. In the present embodiment, a case where a plurality of objects represent a plurality of messages exchanged with another device or user will be described. For the plurality of objects included in this object group, an arrangement position of each object in the object group is set based on attribute information or the like of each object. A plurality of object groups are displayed at these set arrangement positions. Typically, the arrangement position of each object is set in accordance with an order of arrangement set in advance. In addition, at least some objects included in the object group are stereoscopically displayed by using a display portion capable of providing stereoscopic display.

By adopting an interface for presenting a series of object groups including such stereoscopically displayed objects to the user, the user can grasp each object at a glance, even in an application with which a large number of objects should simultaneously be displayed. In addition, the user can also select a necessary object and in succession can perform desired processing on the object.

Though an example where the interface according to the present invention is applied to a message application will be described below, the present invention is not limited to such an application and it is applicable to any form so long as a plurality of objects are displayed.

C. OVERALL CONFIGURATION OF GAME DEVICE

Initially, an overall configuration of game device 1 according to the present embodiment will be described.

Figure 3B:
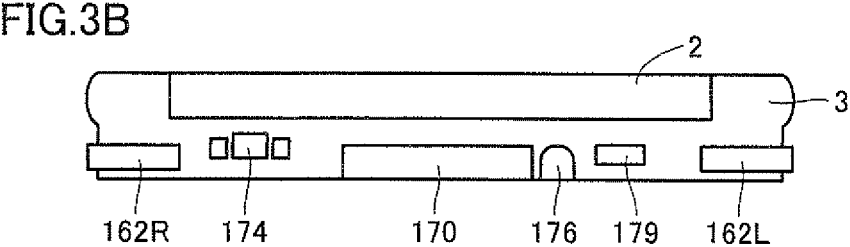
FIGS. 3A and 3B are projection views with a bottom surface side of the game device shown in FIG. 1 being the center.
Figure 3A:
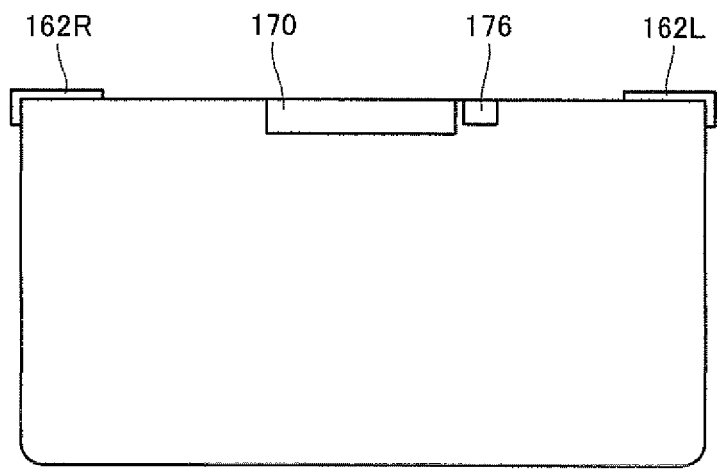

FIG. 1 is a front view of game device 1 (in an opened state) according to the embodiment of the present invention. FIGS. 2A to 2D are projection views with an upper surface side of game device 1 shown in FIG. 1 being the center. Namely, FIG. 2A shows a top view of game device 1 (in a closed state), FIG. 2B shows a front view of game device 1, FIG. 2C shows a left side view of game device 1, and FIG. 2D shows a right side view of game device 1. FIGS. 3A and 3B are projection views with a bottom surface side of game device 1 shown in FIG. 1 being the center. Namely, FIG. 3A shows a bottom view of game device 1 and FIG. 3B shows a rear view of game device 1. In the present specification, for the sake of convenience, with arrangement of game device 1 as shown in FIG. 1 being the reference, the terms "top", "front", "left side", "right side", "bottom", and "rear" are used, however, these terms are formally used and they do not intend to restrict a manner of use of game device 1 by the user.

Referring to FIGS. 1, 2A to 2D, 3A, and 3B, portable game device 1 according to the present embodiment is configured to be foldable. Appearance of game device 1 in an opened state is as shown in FIG. 1, and appearance thereof in a closed state is as shown in FIG. 2A, Game device 1 preferably has such a size that the user can hold game device 1 with both hands or one hand even in the opened state.

Game device 1 has an upper housing 2 and a lower housing 3. Upper housing 2 and lower housing 3 are coupled to allow opening and closing (be foldable). In the example shown in FIG. 1, upper housing 2 and lower housing 3 are each formed like a rectangular plate, and they are coupled to each other to be pivotable around a long side portion thereof by means of a hinge 4. Game device 1 is maintained in the opened state when used by the user and it is maintained in the closed state when not used.

In addition, in game device 1, an angle between upper housing 2 and lower housing 3 can also be maintained at any angle between a position in the closed state and a position in the opened state (approximately 0° to approximately 180°). In other words, upper housing 2 can rest at any angle with respect to lower housing 3. For resting of these housings, friction force or the like generated in a coupling portion between upper housing 2 and lower housing 3 is used. In addition to or instead of friction force, a latch mechanism may be adopted in the coupling portion between upper housing 2 and lower housing 3.

Upper LCD (Liquid Crystal Display) 110 is provided in upper housing 2 as the display portion (display means) capable of providing stereoscopic display. Upper LCD 110 has a rectangular display region and it is arranged such that a direction in which its long side extends coincides with a direction in which a long side of upper housing 2 extends. Such a configuration that upper LCD 110 greater in screen size than a lower LCD 120 is adopted in game device 1 according to the present embodiment so that the user can further enjoy stereoscopic display is shown. It is noted, however, that the screen size does not necessarily have to be different as such, and a screen size can be designed as appropriate, depending on usage of an application, a size of game device 1, or the like. A detailed configuration of upper LCD 110 will be described later.

An image pick-up device (image pick-up means) for picking up an image of some subject is provided in upper housing 2. More specifically, a pair of outer cameras 131L, 131R (see Fig, 2A) and an inner camera 133 (see FIG. 1) are provided in upper housing 2. Inner camera 133 is arranged above upper LCD 110, while the pair of outer cameras 131L and 131R is arranged in a surface opposite to an inner main surface where inner camera 133 is arranged, that is, in an outer main surface of upper housing 2 (corresponding to a surface on the outside when game device 1 is in the closed state). Based on such positional relation, the pair of outer cameras 131L and 131R can pick up an image of a subject present in a direction in which the outer main surface of upper housing 2 faces, while inner camera 133 can pick up an image of a subject present in a direction opposite to the direction of image pick-up by outer cameras 131L and 131R, that is, in a direction in which the inner main surface of upper housing 2 faces.

The pair of outer cameras 131L and 331R is arranged at a prescribed distance from each other, and prescribed parallax in accordance with relative positional relation between outer camera 131L and outer camera 131R is present between the pair of input images obtained as a result of image pick-up by outer cameras 131L and 131R. Thus, data of a pair of images obtained by these outer cameras 131L and 131R can also be used for stereoscopic display of the subject. Namely, outer cameras 131L and 131R function as what is called stereo cameras.

Meanwhile, an input image obtained as a result of image pick-up by inner camera 133 is basically used for non-stereoscopic display (two-dimensional display). Therefore, in game device 1 according to the present embodiment, a pair of input images for stereoscopic display can be obtained by activating outer cameras 131L and 131R, and an input image for non-stereoscopic display can be obtained by activating inner camera 133.

In addition, in upper housing 2, stereoscopic vision volume 145 is provided on the right of upper LCD 110. This stereoscopic vision volume 145 is used for adjusting a degree (parallax and intensity) of stereoscopic effect in stereoscopic display on upper LCD 110.

A speaker (a speaker 151 shown in FIG. 4) serving as an audio generation device (audio generation means) is accommodated in upper housing 2. More specifically, sound emission holes 151L and 151R are arranged on respective left and right sides of upper LCD 110 arranged in a central portion of the inner main surface of upper housing 2. Voice and sound generated from speaker 151 is emitted toward the user through sound emission holes 151L and 151R communicating with speaker 151.

Meanwhile, lower LCD 120 is provided as a display portion (display means) in lower housing 3. Lower LCD 120 has a rectangular display region and it is arranged such that a direction in which its long side extends coincides with a direction in which a long side of lower housing 3 extends.

Though a display portion capable of providing stereoscopic display as will be described later may be adopted as lower LCD 120, in the present embodiment, a common display device for providing non-stereoscopic display (two-dimensional display) of objects and various types of information or the like is adopted. Therefore, for example, a display portion of other appropriate types such as a display portion utilizing EL (Electro Luminescence) technique may be adopted as lower LCD 120. In addition, resolution of the display portion (display means) is appropriately designed, depending on an application or the like to be executed.

In lower housing 3, a control pad 154, a cross-shaped button 161, and button groups 142, 162 are provided as input means (input devices) for accepting an input operation from a user or the like. These input portions are provided on a main surface of lower housing 3 located on the inner side when upper housing 2 and lower housing 3 are folded. In particular, control pad 154 and cross-shaped button 161 are arranged at such positions as being readily operated with the user's left hand when he/she holds game device 1, and button group 162 is arranged at such a position as being readily operated with the user's right hand when he/she holds game device 1.

Control pad 154 mainly accepts an operation for adjusting stereoscopic display on game device 1. More specifically, control pad 154 has a projection accepting a user's operation and it is structured to be able to change relative positional relation with respect to lower housing 3 at least in a vertical direction of the sheet surface and a horizontal direction of the sheet surface. It is noted that an analog stick, a joystick or the like may be adopted, instead of control pad 154 shown in FIG. 1.

Cross-shaped button 161 is an input portion capable of independently operating two directions, and generates a command having values in accordance with a user's button operation in respective directions. Button group 162 includes four operation buttons 162A, 162B, 162X, and 162Y brought in correspondence with the vertical and horizontal directions of the sheet surface.

The operation input output from cross-shaped button 161 and/or button group 162 may be used for adjustment of stereoscopic display in game device 1. Alternatively, in various applications executed on game device 1, these operation inputs are used for such operations as select, enter and cancel involved with game processing.

Button group 142 includes a select button 142a, a HOME button 142b, a start button 142c, and a power button 142d. Select button 142a is typically used for selecting an application to be executed on game device 1. HOME button 142b is typically used for setting a menu application and/or various applications executed on game device 1 to an initial state. Start button 142c is typically used for starting execution of an application on game device 1. Power button 142d is used for turning ON/OFF power of game device 1.

A microphone (a microphone 153 shown in FIG. 4) serving as an audio obtaining device (audio obtaining means) is accommodated in lower housing 3. On the main surface of lower housing 3, a microphone hole 153a for microphone 153 to obtain sound around game device 1 is provided. It is noted that a position where microphone 153 is accommodated and a position of microphone hole 153a communicating with microphone 153 are not limited to those in the main surface of lower housing 3. For example, microphone 153 may be accommodated in hinge 4 and microphone hole 153a may be provided in the surface of hinge 4 at a position corresponding to a position where microphone 153 is accommodated.

In game device 1, in addition to control pad 154, cross-shaped button 161, and button groups 142, 162, a touch panel 122 is further provided as a pointing device serving as another input portion (input means). Touch panel 122 is attached to cover a screen of lower LCD 120, and when the user performs an input operation (a position indication operation or a pointing operation), touch panel 122 detects a value of a corresponding two-dimensional coordinate. Namely, game device 1 has a pointing device accepting a user's operation.

Typically, resistive touch panel 122 can be adopted. It is noted, however, that touch panel 122 is not limited to the resistive type and various pressing-type touch panels may also be adopted. In addition, touch panel 122 preferably has resolution (detection accuracy) as high as that of lower LCD 120 (display accuracy). It is noted that the resolution of touch panel 122 does not necessarily have to exactly be equal to the resolution of lower LCD 120.

A pointing operation onto touch panel 122 is normally performed by the user with the use of a stylus 300. Instead of stylus 300, however, the pointing operation (input operation) can also be performed with a user's own finger or the like. As shown in FIGS. 1, 3A and 3B, an accommodation portion 176 for stylus 300 is provided in the rear surface of lower housing 3. Stylus 300 for an input operation onto touch panel 122 is normally stored in accommodation portion 176 and it is taken out by the user as necessary.

Instead of or in addition to touch panel 122, a mouse, a track ball, a pen tablet, or the like may be employed as the pointing device serving as the input portion (input means) accepting an instruction of a position from the user. In addition, a pointer device capable of indicating a coordinate remotely from the display surface of the display portion (typically, a controller or the like of Wii®) may be adopted. In a case of using any device, the device is preferably configured to accept an instruction of a position associated with a position within a display region of lower LCD 120.

As shown in FIGS. 2C, 2D, 3A, and 3B, an L button 162L is provided at a left end portion of the rear surface of lower housing 3, and an R button 162R is provided at a right end portion of the rear surface of lower housing 3. L button 162L and R button 162R are used for such an operation as select in various applications executed on game device 1.

As shown in FIG. 2C, sound volume 144 is provided on a left side surface of lower housing 3. Sound volume 144 is used for adjusting a volume of the speaker (speaker 151 shown in FIG. 4) mounted on game device 1.

As shown in FIG. 2D, a wireless switch 143 is provided on the right side surface of lower housing 3. Wireless switch 143 switches wireless communication in game device 1 between an ON state (an active state) and an OFF state (an inactive state).

A game card 171 and/or a memory card 173 can be attached to game device 1. More specifically, as shown in FIG. 3B, a game card slot 170 for attaching game card 171 is provided in the rear surface of lower housing 3. In the rear of game card slot 170, an interface (not shown) for electrical connection between game device 1 and game card 171 is provided. Game card slot 170 is configured such that game card 171 is removably attached. Game card 171 retains an application program, a game program (both of which include an instruction set), or the like.

In addition, as shown in FIGS. 1 and 2C, a memory card slot 172 for attaching memory card 173 is provided in the left side surface of lower housing 3. In the rear of memory card slot 172, an interface for electrical connection between game device 1 and memory card 173 is provided. Memory card slot 172 is configured such that memory card 173 is removably attached. Memory card 173 is used for reading a program or image data obtained from another information processing device or game device, storage (saving) of data of an image picked up and/or processed by game device 1, or the like. Game card 171 is implemented by a non-volatile recording medium such as an SD (Secure Digital) card.

In game device 1, an indicator for presenting an operation state or the like to the user is provided. More specifically, in lower housing 3 and upper housing 2, an indicator group 147 consisting of a plurality of LEDs (Light Emitting Diodes) is provided. Indicator group 147 includes a stereoscopic display indicator 147a, a notification indicator 147b, a wireless indicator 147c, a power supply indicator 147d, and a charge indicator 147e. Stereoscopic display indicator 147a is provided on the main surface of upper housing 2 and other indicators are provided on the main surface or on the side surface of lower housing 3.

Stereoscopic display indicator 147a notifies whether stereoscopic display is provided on upper LCD 110 or not. Typically, while stereoscopic display on upper LCD 110 is active, stereoscopic display indicator 147a illuminates.

Notification indicator 147b notifies whether information to be notified of the user is present or not. Typically, when a mail unread by the user is present or when some message is received from various servers, notification indicator 147b illuminates.

Wireless indicator 147c gives notification of a state of wireless communication in game device 1. Typically, when wireless communication is active, wireless indicator 147c illuminates.

Power supply indicator 147d gives notification of a power supply state in game device 1. Game device 1 contains a not-shown battery (typically, accommodated in lower housing 3), and it is mainly driven by electric power from this battery. Therefore, power supply indicator 147d gives notification of a state of power ON in game device 1 and/or a state of charge of the battery. Typically, while power of game device 1 is turned ON (in the ON state) and a state of charge of the battery is sufficiently high, power supply indicator 147d illuminates in green, and while power of game device 1 is turned ON (in the ON state) and a state of charge of the battery is low, it illuminates in red.

Charge indicator 147e gives notification of a state of charge of the battery described above. Typically, when a charge adapter (not shown) or the like is attached to game device 1 and the contained battery is being charged, charge indicator 147e illuminates. It is noted that the charge adapter is connected to a charge terminal 174 provided in the rear surface of game device 1, as shown in FIG. 3B.

In addition, game device 1 according to the present embodiment incorporates an infrared communication function. As shown in FIG. 3B, an infrared port 179 is provided on the rear surface of game device 1. This infrared port 179 projects/receives infrared rays, which are carrier waves for data communication.

Moreover, in the front surface of game device 1, hooks 31, 32 for connection to a strap for suspending game device 1 are provided.

Further, on the front surface of lower housing 3, a connection terminal 158 for connecting a headphone and/or a microphone is provided.

D. ELECTRICAL CONFIGURATION OF GAME DEVICE

An electrical configuration of game device 1 according to the present embodiment will now be described.

Figure 4:
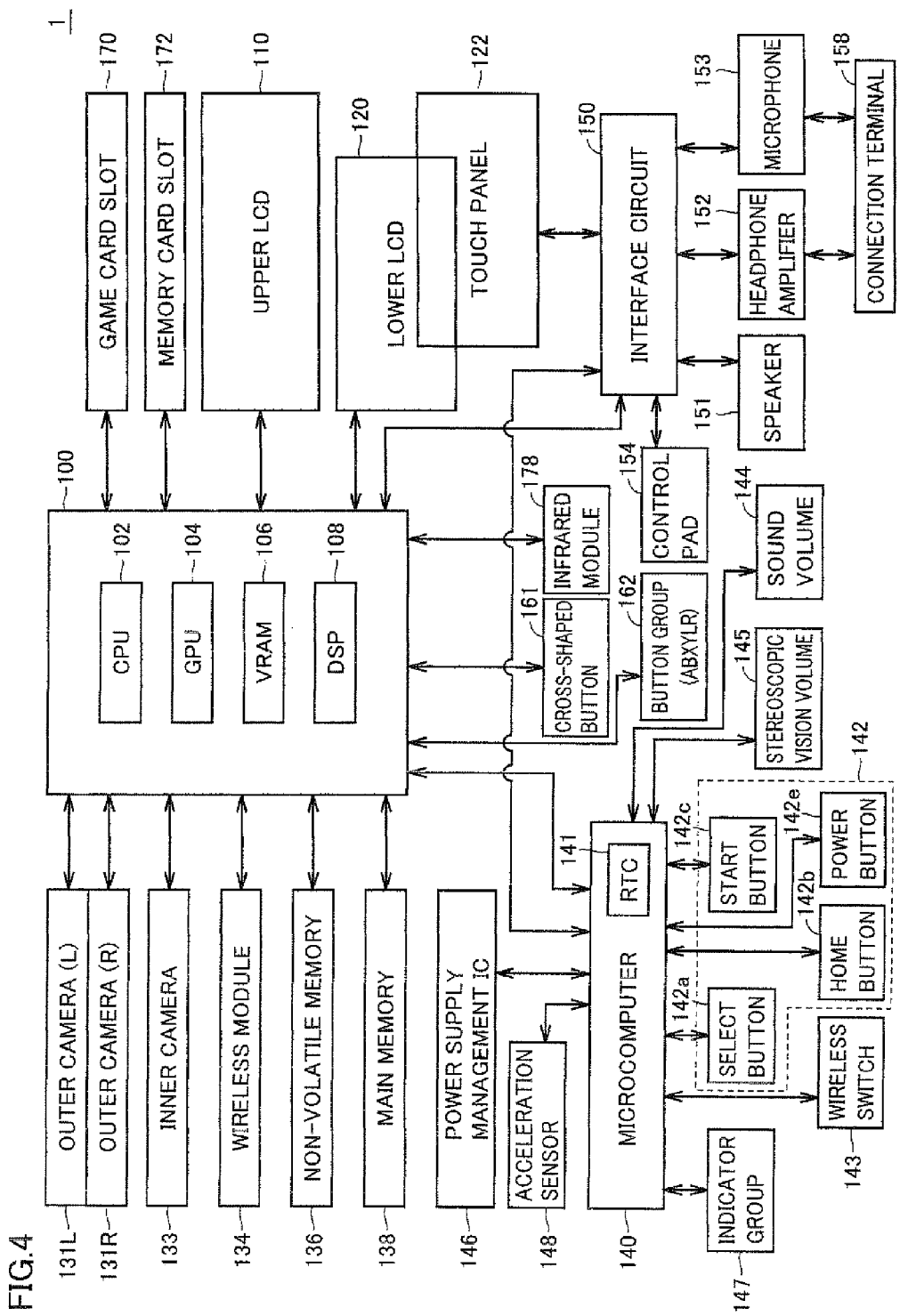
FIG. 4 is a block diagram showing an electrical configuration of the game device according to the embodiment of the present invention.

FIG. 4 is a block diagram showing an electrical configuration of game device 1 according to the embodiment of the present invention.

Referring to FIG. 4, game device 1 includes an operation processing unit 100, upper LCD 110, lower LCD 120, touch panel 122, outer cameras 131L, 131R, inner camera 133, a wireless module 134, a non-volatile memory 136, a main memory 138, a microcomputer 140, button group 142, sound volume 144, stereoscopic vision volume 145, a power supply management IC (Integrated Circuit) 146, indicator group 147, an acceleration sensor 148, an interface circuit 150, speaker 151, a headphone amplifier 152, microphone 153, connection terminal 158, cross-shaped button 161, button group 162, game card slot 170, memory card slot 172, and an infrared module 178. In addition, game device 1 includes a battery and a power supply circuit that are not shown.

Operation processing unit 100 is responsible for overall control of game device 1. More specifically, operation processing unit 100 realizes various types of processing including control of stereoscopic display on upper LCD 110 by executing firmware (an instruction set) stored in advance in non-volatile memory 136, a program (an instruction set) or data read from game card 171 attached to game card slot 170, a program (an instruction set) or data read from memory card 173 attached to memory card slot 172, or the like.

It is noted that, in addition to a case where a program (an instruction set) executed by operation processing unit 100 is provided through game card 171 or memory card 173, a program may be provided to game device 1 through an optical non-transitory recording medium such as a CD-ROM or a DVD. Moreover, a program may be provided from a server device (not shown) connected through a network.

More specifically, operation processing unit 100 includes a CPU (Central Processing Unit) 102, a GPU (Graphical Processing Unit) 104, a VRAM (Video Random Access Memory) 106, and a DSP (Digital Signal Processor) 108, Processing in each unit will be described later. In addition, operation processing unit 100 exchanges data with each unit.

Each of outer cameras 131L, 131R and inner camera 133 is connected to operation processing unit 100, and outputs an input image obtained as a result of image pick-up to operation processing unit 100 in response to an instruction from operation processing unit 100. Each of these cameras includes image pick-up elements such as CCD (Charge Coupled Device) or CIS (CMOS Image Sensor) and a peripheral circuit for reading image data (input image) obtained by the image pick-up elements.

Wireless module 134 exchanges data with another game device 1 or some information processing device through a wireless signal. By way of example, wireless module 134 communicates data with another device under a wireless LAN scheme complying with such standards as IEEE802.11a/b/g/n.

Non-volatile memory 136 stores firmware or the like necessary for a basic operation of game device 1 and a code describing the firmware is developed on main memory 138. As CPU 102 of operation processing unit 100 executes the code developed on main memory 138, basic processing in game device 1 is realized. In addition, non-volatile memory 136 may store data on various parameters set in advance in game device 1 (pre-set data). By way of example, non-volatile memory 136 is implemented by a flash memory.

Main memory 138 is used as a work area or a buffer area for operation processing unit 100 to perform processing. Namely, main memory 138 temporarily stores a program (a code) or data necessary for processing by operation processing unit 100, By way of example, main memory 138 is implemented by a PSRAM (Pseudo-SRAM).

Microcomputer 140 mainly provides processing involved with a user interface. More specifically, microcomputer 140 is connected to operation processing unit 100 as well as to button group 142, sound volume 144, stereoscopic vision volume 145, power supply management IC 146, indicator group 147, and acceleration sensor 148. Microcomputer 140 senses a user's button operation or the like, outputs the result of sensing to operation processing unit 100, and causes an indicator for notifying the user of various types of information to illuminate, in response to a signal from operation processing unit 100.

In addition, microcomputer 140 has a real time counter (RTC: Real Time Clock) 141. Real time counter 141 is a part providing a time-counting function, and counts time in a predetermined cycle. The result of counting is successively output to operation processing unit 100. Operation processing unit 100 can also calculate the current time (date) or the like based on a count value counted by real time counter 141.

Power supply management IC 146 supplies electric power from a power supply (typically, the battery described above) mounted on game device 1 to each unit and controls an amount of supply thereof.

Acceleration sensor 148 detects displacement of game device 1 and the result of detection is output to operation processing unit 100 through microcomputer 140. The result of detection by acceleration sensor 148 is utilized in a program (a game application) executed on game device 1.

Infrared module 178 establishes wireless communication (infrared communication) with another game device 1. Wireless communication established by this infrared module 178 is narrower in coverage than wireless communication through wireless module 134. It is noted that infrared rays which are carrier waves for infrared communication are projected/received through infrared port 179 (see FIG. 3B).

Interface circuit 150 is connected to operation processing unit 100 as well as to speaker 151, headphone amplifier 152, microphone 153, control pad 154, and touch panel 122. More specifically, interface circuit 150 includes an audio control circuit (not shown) for controlling speaker 151, headphone amplifier 152 and microphone 153 and a touch panel control circuit (not shown) for controlling touch panel 122.

Speaker 151 amplifies an audio signal from interface circuit 150 to output voice and sound through sound emission holes 151L and 151R. Headphone amplifier 152 amplifies an audio signal from interface circuit 150 to output voice and sound from a connected headphone Microphone 153 senses user's voice or the like uttered toward game device 1 to output an audio signal indicating sensed voice to interface circuit 150.

As described above, the audio control circuit constituting interface circuit 150 carries out A/D (analog/digital) conversion of an analog audio signal sensed by microphone 153 to output the resultant digital audio signal to operation processing unit 100, and carries out D/A (digital/analog) conversion of a digital audio signal generated by operation processing unit 100 or the like to output the resultant analog audio signal to speaker 151 and/or a connected headphone.

In addition, the touch panel control circuit constituting interface circuit 150 generates touch position data indicating a position where the user performed an input operation (a pointing operation) in response to a detection signal from touch panel 122 and outputs the data to operation processing unit 100.

Game card slot 170 and memory card slot 172 are each connected to operation processing unit 100. Game card slot 170 reads and writes data from and into attached game card 171 through a connector in response to a command from operation processing unit 100. Memory card slot 172 reads and writes data from and into attached memory card 173 through a connector in response to a command from operation processing unit 100.

Lower LCD 120 and upper LCD 110 each display an image in response to a command from operation processing unit 100. In a typical manner of use of game device 1, an image for accepting various operations is displayed on lower LCD 120 and stereoscopic display is provided on upper LCD 110.

E. CONFIGURATION FOR PROVIDING STEREOSCOPIC DISPLAY

A configuration for providing stereoscopic display in game device 1 according to the present embodiment will now be described.

FIG. 5 is a block diagram showing an electrical configuration for implementing display control in game device 1 according to the embodiment of the present invention. FIG. 6 is a schematic cross-sectional view of upper LCD 110 shown in FIG. 5.

Referring to FIG. 5, operation processing unit 100 includes GPU 104 for mainly performing processing for displaying images on upper LCD 110 and lower LCD 120 respectively (image processing), in addition to CPU 102. GPU 104 has a processing circuit specialized for image processing and successively generates images to be displayed on upper LCD 110 and lower LCD 120 respectively in response to a command from CPU 102. These images are transferred to a VRAM 106a for upper LCD 110 and a VRAM 106b for lower LCD 120 respectively.

Here, a pair of images (an image for left eye and an image for right eye) for stereoscopic display on upper LCD 110 is written in VRAM 106a independently of each other. In contrast, since two-dimensional display (non-stereoscopic display) is provided on lower LCD 120, a single image is written in VRAM 106b.

Upper LCD 110 includes an LCD controller 111, an LCD panel 112, and a barrier liquid crystal 113. In contrast, lower LCD 120 includes an LCD controller 121 and an LCD panel 123.

A structure of upper LCD 110 is further described.

FIG. 6 shows a structure of a parallax barrier type liquid crystal display device as a typical example of upper LCD 110. Upper LCD 110 includes LCD panel 112 arranged between a glass substrate 118 and a glass substrate 119.

LCD panel 112 includes a left eye pixel group 112L and a right eye pixel group 112R. A not-shown backlight is provided on a side of glass substrate 118 opposite to glass substrate 119 and light from this backlight is emitted toward left eye pixel group 112L and right eye pixel group 112R. Left eye pixel group 112L and right eye pixel group 112R function as a spatial light modulator for adjusting light from the backlight. Here, each pixel in left eye pixel group 112L and each pixel in right eye pixel group 112R are alternately arranged.

Barrier liquid crystal 113 representing a parallax optical system is provided on a side opposite to the side where glass substrate 118 is in contact with left eye pixel group 112L and right eye pixel group 112R. In this barrier liquid crystal 113, a plurality of slits 114 are provided in rows and columns at prescribed intervals. Left eye pixel group 112L and right eye pixel group 112R are arranged symmetrically to each other, with an axis passing through a central position of each slit 114 and perpendicular to a surface of glass substrate 118 serving as the reference. By appropriately designing positional relation with the slit, of each set of left eye pixel group 112L and right eye pixel group 112R brought in correspondence with each slit, the user visually recognizes only left eye pixel group 112L with his/her left eye and visually recognizes only right eye pixel group 112R with his/her right eye.

Namely, each slit 114 included in barrier liquid crystal 113 restricts a field of view of each of the user's right and left eyes to a corresponding angle. Consequently, only left eye pixel group 112L is present in a line of sight AXL of the user's left eye, while only right eye pixel group 112R is present in a line of sight AXR of the user's right eye.

Here, by causing left eye pixel group 112L and right eye pixel group 112R to display a pair of images having prescribed parallax, an image having prescribed parallax can be presented to the user. By displaying such a pair of images having prescribed parallax, the user feels as if he/she stereoscopically viewed a subject. Hereinafter, a surface of barrier liquid crystal 113 on the user side, that is, a surface on which this image is actually displayed, is also referred to as a display surface (of upper LCD 110).

More specifically, as shown in FIG. 5, GPU 104 successively writes an image for left eye and an image for right eye, by designating an address in VRAM 106a. LCD controller 111 successively reads image data in each column from the address of interest in VRAM 106a such that images in the direction of column constituting the image for left eye and the image for right eye written in VRAM 106a are alternately displayed in alignment on LCD panel 112, and drives LCD panel 112.

It is noted that upper LCD 110 can also provide two-dimensional display, that is, non-stereoscopic display, of an image. In this case, a method of inactivating barrier liquid crystal 113 and a method of setting parallax between the image for left eye and the image for right eye used for display to substantially zero, by providing a command to LCD controller 111, are available.

In the case of the former method, since a plurality of slits 114 provided in barrier liquid crystal 113 are inactivated, light from left eye pixel group 112L and right eye pixel group 112R is substantially incident on the user's left and right eyes. In this case, resolution for the user is substantially twice as high as resolution in stereoscopic display.

In the case of the latter method, since the image visually recognized by the user's left eye and the image visually recognized by the user's right eye are substantially equally controlled, the user visually recognizes the same image with his/her left and right eyes.

Meanwhile, non-stereoscopic display is provided on lower LCD 120. Namely, GPU 104 successively writes an image to be displayed, by designating an address in VRAM 106b, and LCD controller 121 successively reads images written in VRAM 106b and drives LCD panel 123.

Though a parallax barrier type display device has been exemplified in FIG. 6 by way of a typical example of a display portion capable of providing stereoscopic display, for example, a lenticular type display device or the like may also be adopted. According to such a type, a display area for an image for left eye and a display area for an image for right eye are arranged in a certain pattern (typically, alternately).

It is noted that such a form that an image for left eye and an image for right eye are alternately displayed with a display area for the image for left eye and a display area for the image for right eye being common may be adopted, as in the method of utilizing shutter glasses (time-division type).

F. IMPLEMENTATION OF STEREOSCOPIC DISPLAY/TWO-DIMENSIONAL DISPLAY

An implementation of stereoscopic display of an object on upper LCD 110 and two-dimensional display of an object on lower LCD 120 will now be described. As a typical implementation on a game device, a method of generating an image by (virtually) picking up an image of an object arranged in a virtual three-dimensional space with a virtual camera and displaying this generated image will be described below.

FIGS. 7A and 7B are diagrams for illustrating one example of a method of generating an image used for display control in game device 1 according to the embodiment of the present invention. FIGS. 8A and 8B are diagrams for illustrating a method of realizing stereoscopic display using the image generated with the method shown in FIGS. 7A and 7B.

Referring to FIG. 7A, an "apple" is arranged as an object or a subject SBJ1 in a virtual three-dimensional space, and a pair of images (an image for left eye PIMGL and an image for right eye PLMGR) for stereoscopic display of the "apple" on upper LCD 110 is generated by picking up an image of this "apple" with a pair of virtual cameras (a left virtual camera 400L and a right virtual camera 400R). In addition, a single image (an image PIMGC for two-dimensional display) for two-dimensionally displaying the "apple" on lower LCD 120 is generated by picking up an image of this "apple" with a single virtual camera 400C (typically, arranged at a position intermediate between left virtual camera 400L and right virtual camera 400R).

It is assumed that the pair of virtual cameras (left virtual camera 400L and right virtual camera 400R) is arranged in alignment in a horizontal direction (hereinafter referred to as an X direction) in the virtual three-dimensional space. Here, a vertical direction is referred to as a Y direction, and a camera direction of each virtual camera (a direction of an optical axis of image pick-up) is referred to as a Z' direction. It is noted that the X direction and the Y direction in the virtual three-dimensional space correspond to the horizontal direction (X direction) and the vertical direction (Y direction) of the display surface, respectively. In addition, the Z' direction in the virtual three-dimensional space corresponds to a value of depth of an object. A position of each object in the direction (a value of depth) determines stereo depth when it is stereoscopically displayed. Namely, an object arranged at a position more distant (a greater value of depth) from a reference object (having a value of depth of "0") is displayed with greater stereo depth. By thus setting a value of depth, when a pair of images (image for left eye PIMGL and image for right eye PIMGR) picked up by the pair of virtual cameras is used for stereoscopic display, an abject greater in value of depth in the virtual three-dimensional space has relatively greater stereo depth.

Namely, an absolute value of stereo depth of each stereoscopically displayed object is determined by a position in the direction (value of depth) in the virtual three-dimensional space and a distance d1 between the pair of virtual cameras.

A pair of images shown in FIG. 7B (image for left eye PIMGL and image for right eye PIMGR) is displayed in substantially the same display region. Namely, according to the lenticular type as shown in FIG. 6, a pixel for left eye and a pixel for right eye are alternately arranged so that image for left eye PIMGL and image for right eye PIMGR of interest are spatially alternately displayed in a lateral direction of the display surface. Alternatively, according to shutter glasses (time-division type), image for left eye PIMGL and image for right eye PIMGR of interest are temporally alternately displayed as the same display surface is temporally divided.

A region in the pair of images (image for left eye PIMGL and image for right eye PIMGR) shown in FIG. 7B where parallax is zero looks like being present at a position in the direction of depth around the display surface when viewed from the user. Namely, by setting parallax of a target region to zero, the user feels that an object included in that region is located on or around the display surface of upper LCD 110.

Meanwhile, image PIMGC for two-dimensional display shown in FIG. 7B is displayed in its entirety on lower LCD 120. Therefore, when viewed from the user, normal two-dimensional display is provided.

Stereo depth (a position in a direction of depth, that is, an amount of pop-up or an amount of recess) of an object stereoscopically displayed on upper LCD 110 is varied depending on distance d1 between the pair of virtual cameras (left virtual camera 400L and right virtual camera 400R). Namely, as distance d1 between the pair of virtual cameras is greater, difference between image pick-up ranges (fields of view) of the respective virtual cameras is greater and hence parallax generated between the pair of images (image for left eye PIMGL and image for right eye PIMGR) is also greater.

More specifically, as shown in FIG. 8A, when positional relation between the pair of virtual cameras (left virtual camera 400L and right virtual camera 400R) is changed in a direction to increase an amount of parallax regarding subject SBJ1, the user feels that subject SBJ1 is present closer toward the user side, relative to the display surface of upper LCD 110. So to speak, the user visually recognizes the subject image of subject SBJ1 as if it "popped up" from the display surface.

In contrast, as shown in FIG. 8B, when positional relation between the pair of virtual cameras (left virtual camera 400L and right virtual camera 400R) is changed in a direction to decrease an amount of parallax regarding subject SBJ1, the user feels that subject SBJ1 is present on a side opposite to the user, relative to the display surface of upper LCD 110. So to speak, the user visually recognizes the subject image of subject SBJ1 as if it were "recessed" in the display surface.

By thus changing positional relation between the pair of virtual cameras (left virtual camera 400L and right virtual camera 400R), stereo depth visually recognized by the user can be adjusted as appropriate.

As an alternative method, by fixing positional relation between the pair of virtual cameras (left virtual camera 400L and right virtual camera 400R), obtaining the pair of picked-up images (image for left eye PIMGL and image for right eye PIMGR), and changing relative display positions of the pair of images on the display surface of upper LCD 110, stereo depth visually recognized by the user can also be adjusted. In addition, by changing both of positional relation between the pair of virtual cameras (left virtual camera 400L and right virtual camera 400R) and relative display positions of the pair of images (image for left eye PIMGL and image for right eye PIMGR), stereo depth visually recognized by the user may be adjusted as appropriate.

G. MESSAGE APPLICATION

A message application executed on game device 1 according to the present embodiment will now be described.

Figure 9:
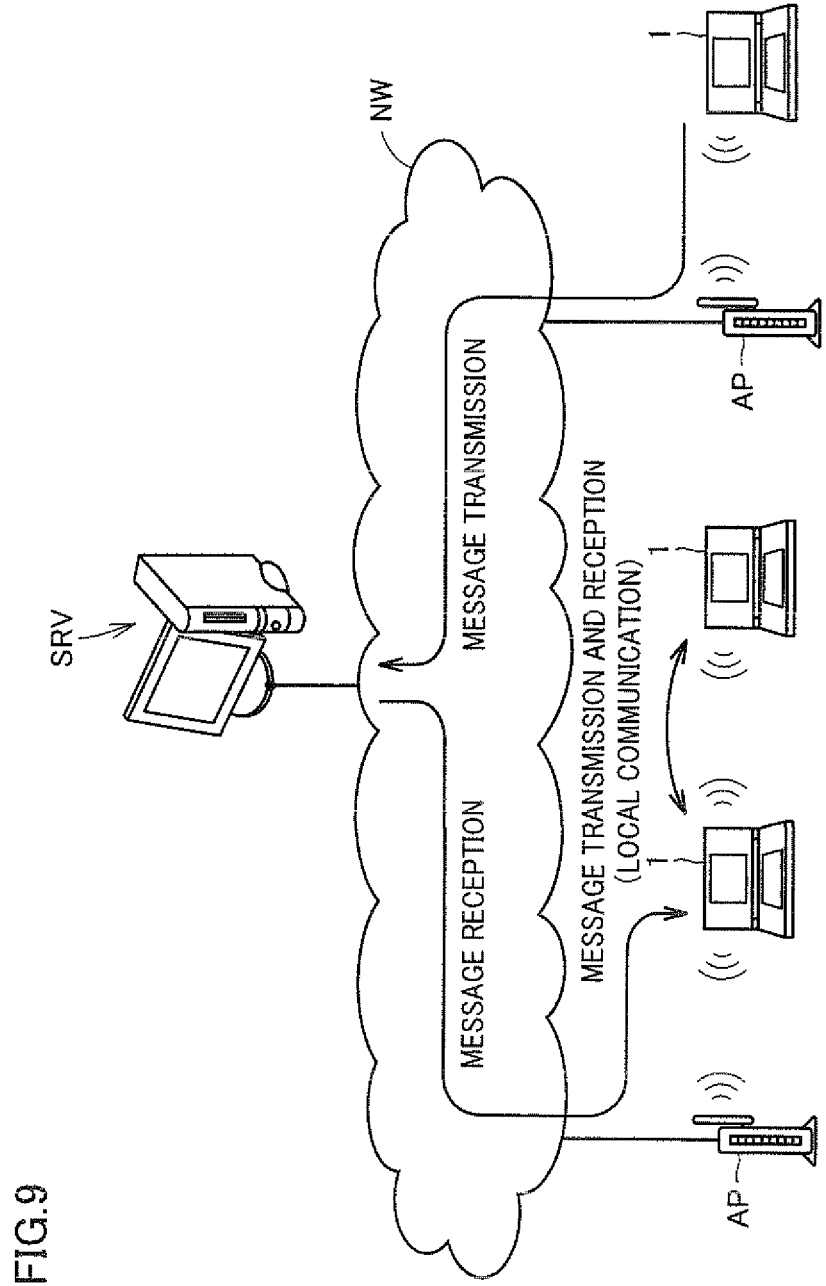
FIG. 9 is a schematic diagram showing a system configuration relating to a message application executed on the game device according to the embodiment of the present invention.
Figure 10:
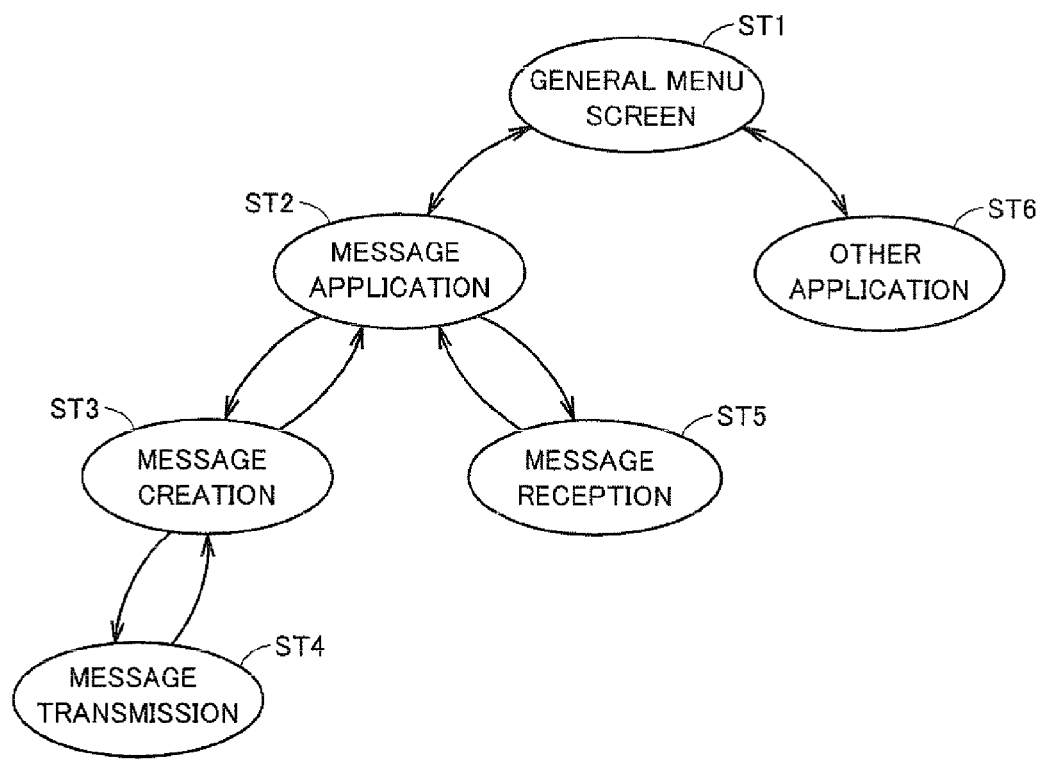
FIG. 10 is a transition diagram showing a mode of the message application executed on the game device according to the embodiment of the present invention.

FIG. 9 is a schematic diagram showing a system configuration relating to a message application executed on game device 1 according to the embodiment of the present invention. FIG. 10 is a transition diagram showing a mode of the message application executed on game device 1 according to the embodiment of the present invention.

Referring to FIG. 9, game device 1 according to the present embodiment is adapted to two functions of (1) a function to exchange a message via a server device SRV with another game device 1 (another user) and (2) a function to directly exchange a message with another game device 1.

More specifically, server device SRV for exchanging a message and an access point AP for wireless communication with game device 1 are connected to a network NW. Game device 1 can transmit and receive data to and from server device SRV via this access point AP. Namely, game device 1 can transmit and receive data to and from another game device 1 via server device SRV and access point AP. In addition, game device 1 can directly transmit and receive data to and from another game device 1. On game device L an object indicating data (message) transmitted and received to and from another game device 1 is displayed.

Game device 1 according to the present embodiment can interact with transmission and reception means for transmitting and receiving data of an object to be displayed with another device. It is noted that a party to/from which game device 1 transmits and receives data is not limited to game device 1 of the same type and it may be a personal computer or a portable telephone.

More specifically, a wireless communication method such as wireless LAN (IEEE802.11) or Bluetooth® may be adopted in game device 1 and access point AP. It is noted that game device 1 may be connected to a network through a LAN cable or the like. In this case, access point AP is not necessary. Meanwhile, a wireless communication method such as infrared communication or Bluetooth® can be adopted in game device 1 and another game device 1 (local communication).

A function for the user of game device 1 to create and transmit a message or a function to display a received message is provided, as the message application is executed on game device 1. Initially, overview of this message application will be described.

A plurality of applications can be executed on game device 1 according to the present embodiment. Therefore, as shown in. FIG. 10, in order to enable the user to selectively execute the plurality of these applications, a general menu screen for selecting an application to be executed is displayed on game device 1 (state ST1). Typically, in this general menu screen, applications that can be executed on game device 1 are displayed in a list, and as the user selects any application, the selected application is executed.

For example, when the message application is selected, processing in the message application according to the present embodiment is started with the use of a user interface as will be described later (state ST2). In this message application, state transition to a message creation mode (state ST3), a message transmission mode (state ST4), a message reception mode (state ST5), and the like is made.

When another application is selected in the general menu screen, selected another application is executed (state ST6).

H. USER INTERFACE

A user interface provided in the message application (state ST2 shown in FIG. 10) will now be described.

(h1: Menu Screen)

Figure 11:
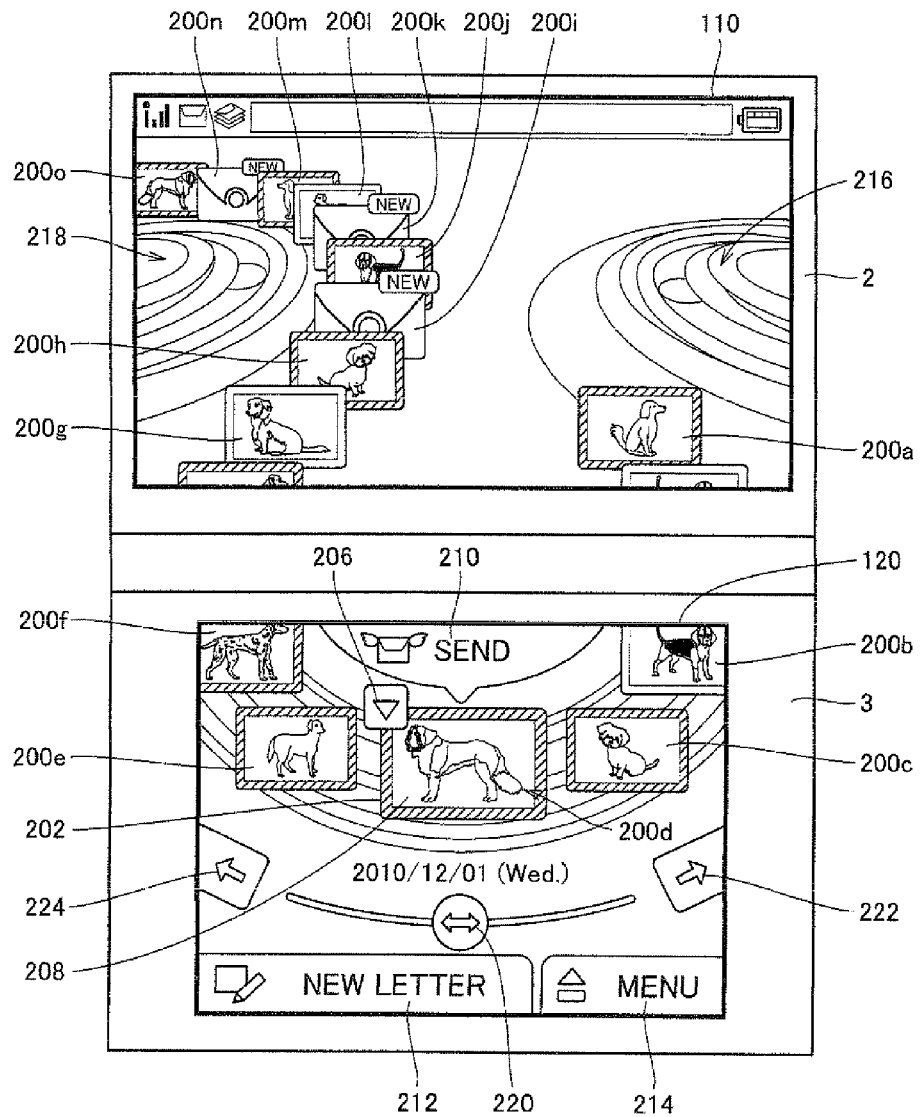
FIGS. 11 to 13 are diagrams each showing one example of a menu screen provided as a result of execution of the message application according to the embodiment of the present invention.
Figure 12:
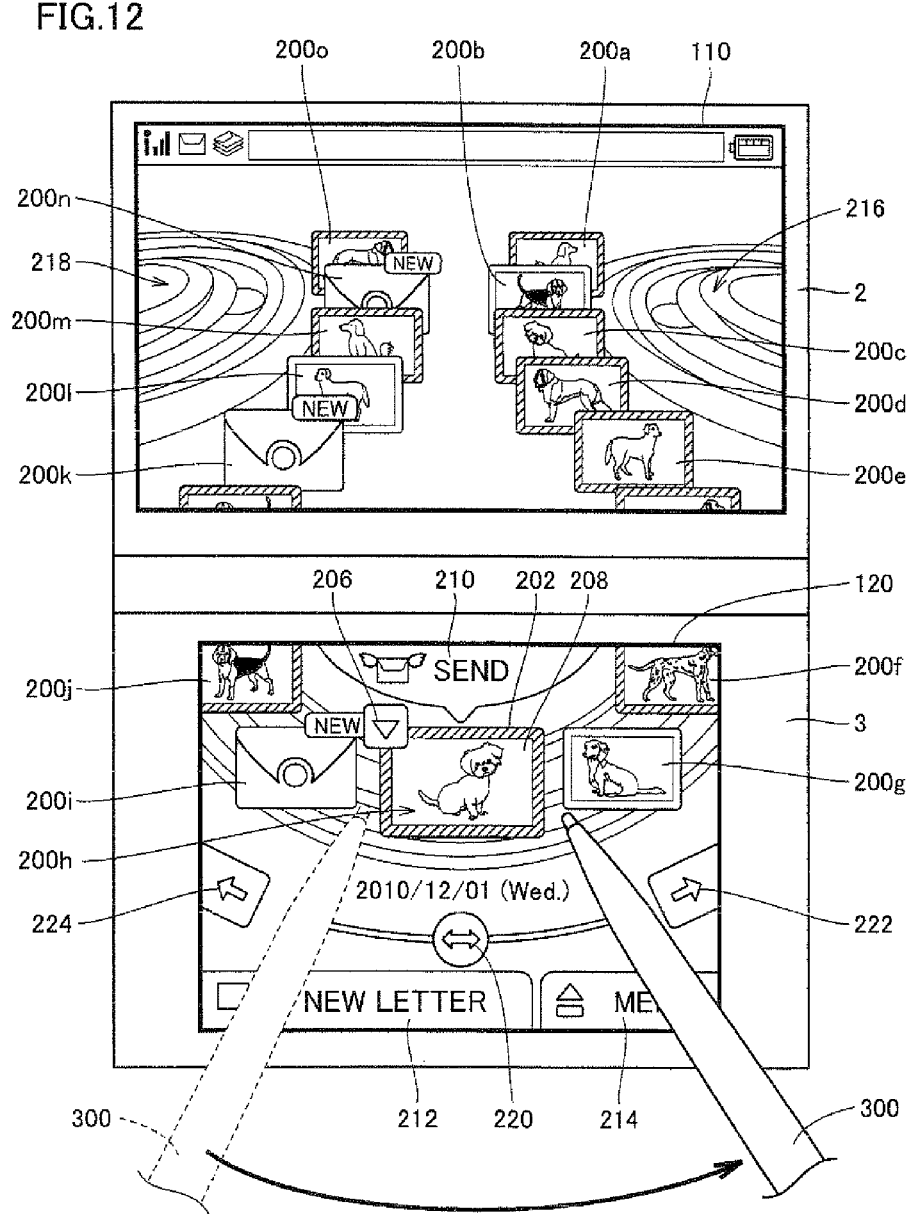
Figure 13:
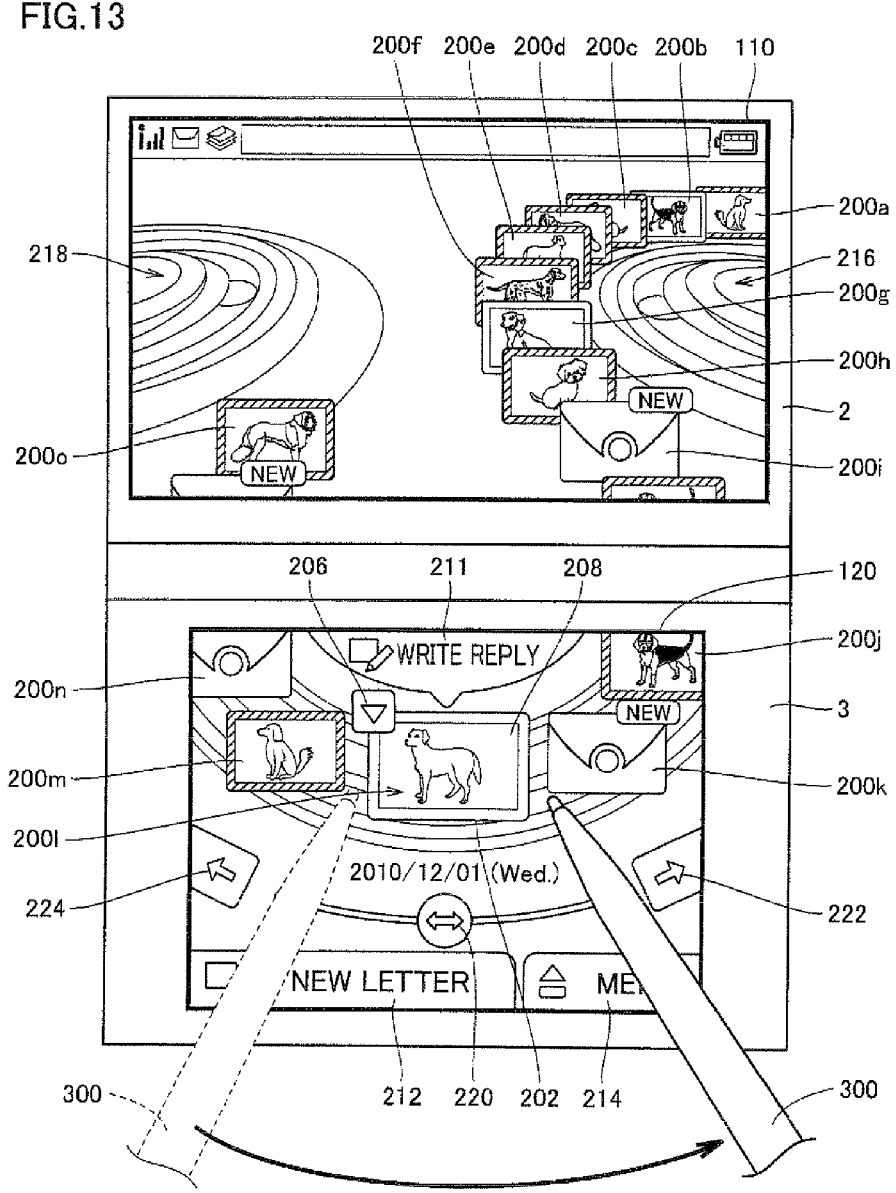

FIGS. 11 to 13 are diagrams each showing one example of a menu screen provided as a result of execution of the message application according to the embodiment of the present invention. It is noted that, for the sake of brevity of illustration, FIGS. 11 to 13 schematically show contents displayed on upper LCD 110 and lower LCD 120 in correspondence with positional relation therebetween, which is also the case with the drawings shown below.

In the message application according to the present embodiment, an object group consisting of (a plurality of) objects associated with messages (which may include also a message being created before transmission) to be transmitted to and received from another game device 1 is displayed. More specifically, the message application according to the present embodiment can handle a message including image data such as a photograph or a motion picture and audio data such as user's voice. Then, in the menu screen, an object including a thumbnail image of each message is displayed.

In the menu screen of the message application according to the present embodiment shown in FIG. 11, an object group consisting of a plurality of objects 200a to 200o including thumbnail images of respective messages (hereinafter may also collectively be referred to as an "object 200") is displayed across upper LCD 110 (first display portion) and lower LCD 120 (second display portion), Here, among objects 200a to 200o included in the object group, objects displayed on upper LCD 110 are stereoscopically displayed, while objects displayed on lower LCD 120 are two-dimensionally displayed. Namely, objects 200a, 200b, 200f, 200g, 200h, 200i, 200j, 200k, 200l, 200m, 200n, and 200o (only a part of objects 200b and 200f) are stereoscopically displayed, while objects 200b, 200c, 200d, 200e, and 200f (only a part of objects 200b and 200f) are two-dimensionally displayed.

In the object group displayed on the menu screen shown in FIG. 11, an arrangement position of each object included therein is set in advance. More specifically, an order of arrangement of each object in the object group is set in advance based on attribute information or the like of a message to be displayed, and the arrangement position of each object is set in accordance with this order of arrangement. By way of example of such attribute information, the message application according to the present embodiment determines the order of arrangement based on time information provided to each message and causes the object indicating each message to be displayed in accordance with this order of arrangement. Consequently, on the display portion, the objects are chronologically displayed in alignment based on the time information provided to the corresponding message.

In addition, in the message application according to the present embodiment, an object corresponding to a message received from another game device 1 (hereinafter also referred to as a "reception message") and an object corresponding to a message transmitted (or to be transmitted) to another game device 1 (hereinafter also referred to as a "transmission message") are chronologically displayed in alignment as being mixed together. In the example shown in FIG. 11, objects of which background image is hatched (objects 200a, 200c, 200d, 200e, 200f, 200h, 200j, 200m, and 200o) represent transmission messages, while the objects of which background image is not hatched (objects 200b, 200g, 200i, 200k, 200l, and 200n) represent reception messages.

It is noted that each object shown in FIG. 11 is generated, with a thumbnail image indicating the corresponding message and a background image in accordance with attribute information or the like of the corresponding message being combined with each other. Object 200d displayed in a central portion of lower LCD 120 in FIG. 11 will be described by way of example. A thumbnail image 208 showing contents in the corresponding message is superimposed on a background image 202 in accordance with attribute information of the corresponding message, to thereby generate object 200.

Thus, in the message application according to the present embodiment, an object group consisting of a plurality of objects 200 to be displayed is obtained, and arrangement positions of respective objects 200 in the object group are set. Then, the display portion (upper LCD 110 and lower LCD 120) is controlled such that the plurality of objects are displayed at the respective set arrangement positions and the object group is displayed across upper LCD 110 and lower LCD 120. In addition, on which of upper LCD 110 and lower LCD 120 the objects included in the object group should be displayed is determined, and then the object to be displayed on upper LCD 110 is stereoscopically displayed and the object to be displayed on lower LCD 120 is two-dimensionally displayed.

Typically, arrangement positions of respective objects are set in accordance with the order of arrangement set in advance.

As shown in FIGS. 12 and 13, in the message application according to the present embodiment, in response to a user's operation to indicate scroll of the object group, relative arrangement position of the object group is changed. Here, the display position of the object group is changed while the order of arrangement of the objects on a prescribed track is maintained. Alternatively, in the message application according to the present embodiment, the plurality of objects (object group) are displayed at positions on the prescribed track in accordance with the user's operation while the set order of arrangement is maintained. Then, in response to the user's operation to indicate another position on the track, the plurality of objects (object group) may be displayed at new respective positions while the set order of arrangement is maintained.

Such a user's operation for scrolling the object group is detected by touch panel 122 representing a typical example of the pointing device, that is provided in correspondence with lower LCD 120. Namely, as shown in FIGS. 11 and 12, as the user performs an operation on touch panel 122 by using stylus 300 or the like (pointing operation), the object group as a whole is scrolled in the direction of operation. A speed of scroll and/or an amount of scroll of the object group may be changed depending on a speed of the user's operation on touch panel 122. For example, as the user more quickly operates stylus 300, the object group may be scrolled more. Alternatively, in order to provide a more natural operation, a speed of scroll of the object group may be varied at a prescribed rate. Namely, such an effect that the object group gradually stops can be provided by carrying out control such that the speed of scroll of the object group decreases by a prescribed amount per unit time even after the user stops operation.

Instead of or in addition to detection of such a user's operation on touch panel 122, a button for a scroll operation may be displayed on lower LCD 120. In the menu screen shown in FIG. 11, a left scroll button object 224 and a right scroll button object 222 are displayed on lower LCD 120. As the user uses stylus 300 or the like to press such a button, the object group is scrolled in the corresponding direction. It is noted that, for example, scrolling of an object one by one may be realized in correspondence with pressing of such a button. In addition, a scroll bar 220 is displayed on lower LCD 120. As the user uses stylus 300 or the like to operate scroll bar 220, the object group is scrolled in the direction of operation.

Further, the object group may be scrolled in response to pressing of L button 162L or R button 162R by the user.

As shown in FIGS. 11 to 13, the object group as a whole is scrolled over the prescribed track and the object arranged in the central portion of lower LCD 120 is set as the reference object. It is noted that the user may use stylus 300 or the like to press object 200 so that pressed object 200 is selected as the reference object. This selected object 200 is displayed with a largest size in the object group.

When certain object 200 is selected as the reference object, a button for displaying a menu screen showing processing associated with selected object 200 is displayed. For example, as shown in FIG. 11, when object 200d is selected as the reference object, a zoomed-up display button object 206 is displayed over object 200d. Processing at the time when this zoomed-up display button object 206 is pressed will be described later.

The user may arbitrarily select this reference object, however, in the initial state, an object of which associated time information coincides with or is closest to the time of execution of the message application (current time) may be selected as the reference object. Alternatively, in accordance with some other rules, any one of the plurality of objects constituting the object group may be selected as the reference object.

In a case where the object selected as the reference object is an object corresponding to the transmission message (in the case of FIGS. 11 and 12), an icon indicating mail transmission and a button object 210 including characters "send" are displayed in the upper portion of lower LCD 120. As the user uses stylus 300 or the like to press this button object 210, transition to a screen for creating a transmission message corresponding to the selected reference object (a communication method selection screen) is made. This communication method selection screen will be described later. In a case where a transmission message corresponding to the selected reference object has already been transmitted, this button object 210 may be inactivated.

On the other hand, in a case where the object selected as the reference object is an object corresponding to a reception message (in the case of FIG. 13), an icon indicating mail creation and a button object 211 including characters "write reply" are displayed in the upper portion of lower LCD 120. As the user uses stylus 300 or the like to press this button object 211, transition to a screen for replying to the selected reference object (a message creation screen) is made. This message creation screen will be described later.

As shown in FIG. 11, the reference object is displayed at a lowermost position at a central point on the prescribed track over which the object group is scrolled. In other words, the object located at the central point (hereinafter also refereed to as a "reference point") on the prescribed track is selected as the reference object.

By way of example, in the message application according to the present embodiment, the plurality of objects included in the object group are displayed in alignment along a track extending from this reference point in two different directions (for example, directions extending upward from left and right of the reference point). As shown in FIGS. 11 to 13, the object group is scrolled over the track including respective outer circumferences of objects 216 and 218 simulating a pair of rollers displayed on upper LCD 110 and a substantial semicircle displayed on lower LCD 120. So to speak, the plurality of objects included in the object group are displayed in alignment along a track in an inverted omega shape with the reference point being located at a vertex (lowermost position).

Thus, by displaying the plurality of objects included in the object group in a meandering manner (typically, along the track in the inverted omega shape), a larger number of objects can be displayed in a limited display region. In addition, as shown in FIGS. 11 to 13, an object ordered or positioned more distantly from the reference object is displayed on the display portion with a smaller size. Namely, an object present at the reference point (reference object) is displayed with a largest size, and as the distance on the track from this reference object is greater, a size of the displayed object becomes smaller. By thus differing the display size, sense of perspective with respect to the reference object can be expressed and a larger number of objects can be displayed in the same screen.

Though the track in the inverted omega shape is shown in FIGS. 11 to 13 as a typical example of the track on which the plurality of objects are displayed in alignment, a track of any shape may be adopted, so long as the track extends from the reference point in two different directions. For example, a track in a U-shape, a track in a V-shape or the like may be employed. Alternatively, a plurality of such tracks may be provided so that a plurality of objects are displayed in alignment on the plurality of tracks, respectively.

Moreover, as shown in FIGS. 11 to 13, the message application according to the present embodiment provides stereoscopic display such that at least the objects displayed on upper LCD 110 look like overlapping with one another in a direction of depth. For example, in the menu screen displayed on upper LCD 110 shown in FIG. 11, objects 200f to 200o are arranged such that display contents are partially overlapping with those of an adjacent object. These objects 200f to 200o are stereoscopically displayed, however, a position of display of each object in a direction perpendicular to the display surface (a position in a direction of depth, that is, an amount of pop-up or an amount of recess) is determined in accordance with the order starting from the reference object. The position of display of this stereoscopically displayed object will be described with reference to FIG. 14. It is noted that, as shown in FIG. 1, the lateral direction of the display surface is referred to as the X direction, the vertical direction of the display surface is referred to as the Y direction, and the direction perpendicular to the display surface (direction of depth) is referred to as a Z direction.

A position of display of an object on the display surface (an X coordinate value and a Y coordinate value) is set differently from each other, and a depth in a direction of depth representing a degree of stereoscopic effect, that is, an amount of pop-up or an amount of recess (a Z coordinate value), is also set differently from each other.

Figure 14:
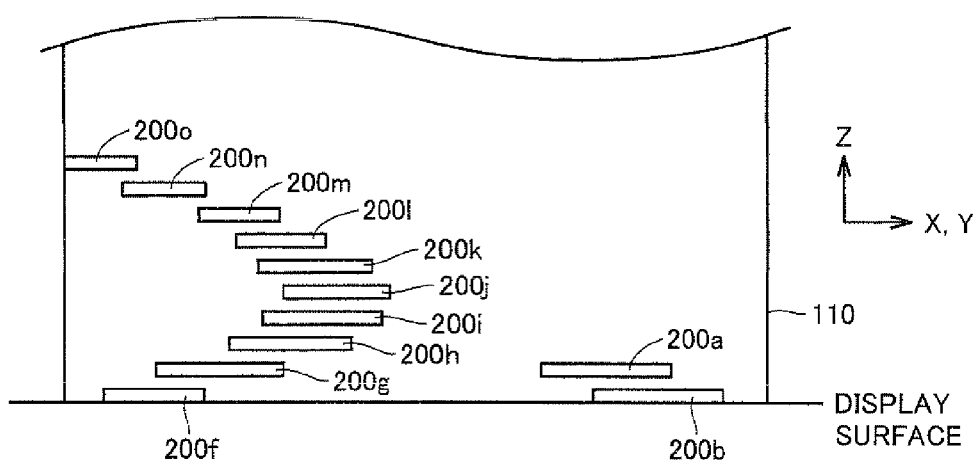
FIG. 14 is a schematic diagram showing a display position in a direction perpendicular to a display surface (a Z direction), of each object displayed on the menu screen shown in FIGS. 11 to 13.

FIG. 14 is a schematic diagram showing a display position in the direction perpendicular to the display surface (the Z direction; a direction of depth), of each object displayed on the menu screen shown in FIGS. 11 to 13. More specifically, referring to FIG. 14, regarding objects 200a, 200b, and 200f to 200o displayed on the menu screen, their positions on the display surface (XY coordinate plane) are also differed and an amount of recess representing a degree in accordance with the order of display of each object is set. In the example shown in FIG. 14, object 200f closest to the reference object is displayed substantially at a position of the display surface, while object 200o most distant from the reference object is displayed at a position distant in the Z direction from the display surface.

Thus, any object 200 among the plurality of objects 200 included in the object group is set as the reference object, and at least some stereoscopically displayed objects are stereoscopically displayed such that object 200 ordered or positioned more distantly from the reference object is greater in stereo depth in the direction perpendicular to the display surface of the display portion (Z direction).

More specifically, stereo depth (position in the direction of depth) of each object is determined in accordance with the order or the position from the reference object. Then, in the virtual three-dimensional space as shown in FIGS. 7A and 7B and FIGS. 8A and 8B, each object as well as left virtual camera 400L and right virtual camera 400R are arranged in accordance with the determined stereo depth. In addition, each object is stereoscopically displayed by displaying on upper LCD 100, image for left eye PIMGL and image for right eye PIMGR obtained as a result of image pick-up by left virtual camera 400L and right virtual camera 400R respectively.

Namely, in order to display the menu screen as shown in FIGS. 11 to 13, as shown in FIG. 14, for each of the plurality of objects included in the object group (each object for displaying the menu screen in the virtual three-dimensional space), an arrangement position of an object is set such that an object ordered or positioned more distantly from the reference object is greater in value of depth in the virtual three-dimensional space. Then, the left virtual camera and the right virtual camera are arranged in the virtual three-dimensional space. In such a state, by displaying on upper LCD 110 the image for left eye and the image for right eye obtained as a result of image pick-up of each object by the left virtual camera and the right virtual camera respectively, the object ordered or positioned more distantly from the object is stereoscopically displayed such that its stereo depth in the direction perpendicular to the display surface of upper LCD 110 is greater.

A value of depth in the virtual three-dimensional space for each object determines relative stereo depth among objects, and a distance between the left virtual camera and the right virtual camera arranged in the virtual three-dimensional space determines magnitude of difference in stereo depth among objects stereoscopically displayed on upper LCD 110 (for example, difference between a minimum value and a maximum value of stereo depth). It is noted that this distance between the cameras can be changed in accordance with the user's operation of stereoscopic vision volume 145 (FIG. 2D).

On the other hand, since lower LCD 120 is unable to provide stereoscopic display, an image for providing two-dimensional display on lower LCD 120 is generated by image pick-up by single virtual camera 400C in the virtual three-dimensional space.

By stereoscopically displaying each object 200 with sense of depth (stereo depth) in accordance with such a position in a direction of depth (stereo depth) in the direction perpendicular to the display surface (Z direction), difference in display position (in particular, a position in the direction of depth) among objects can be emphasized.

As described above, the message application according to the present embodiment causes each object 200 to be displayed in a manner in accordance with information on the corresponding message. Types of such a manner of display include (1) display for identification between reception and transmission messages, (2), display of a creator character, (3) display for identification between unread and already-read messages, (4) display for identification of a new message, and the like. Variations of such a manner of display will be described below.

(1) Display for Identification Between Reception and Transmission Messages

As shown in FIG. 11 and the like, the message application according to the present embodiment provides chronological display in alignment of objects 200 corresponding to reception messages and objects 200 corresponding to transmission messages as being mixed together. Therefore, in order to enable the user to grasp at a glance whether the message corresponding to each object 200 is a reception message or a transmission message, a manner of display is differed for each type of the message. In the present embodiment, by differing a background image arranged around the thumbnail image, display for identification of a type of the message is provided. By way of example, the objects of which background image is hatched (objects 200a, 200c, 200d, 200e, 200f, 200h, 200j, 200m, and 200o) represent the transmission messages, while the objects (objects 200b, 200g, 200i, 200k, 200l, and 200n) of which background image is not hatched represent the reception messages. For the sake of illustration in the drawings, in FIG. 11 and the like, the type of the message is identified and displayed based on whether the background image is hatched or not, however, any manner of display allowing identification of the type may be adopted. Namely, any manner of display such as color, gradation and pattern may be differed so that the type of a message can be specified.

Information on such a type of the message is included in attribute information or the like of the message corresponding to each object 200, and the message application changes a manner of display based on such attribute information. Namely, information for identifying whether the message is a message that has been transmitted to another game device 1 or received from another game device 1 is included as the information on the message corresponding to each object 200. Then, the message application causes each object 200 included in the object group to be displayed in such a manner that the corresponding message can be identified as either a message transmitted to another game device 1 or a message received from another game device 1.

(2) Display of Creator Character

Information indicating a creator of a message may be provided to the message transmitted and received in connection with the message application according to the present embodiment, A creator character registered in advance by a creator can be adopted as information indicating such a creator of a message.

Figure 15:
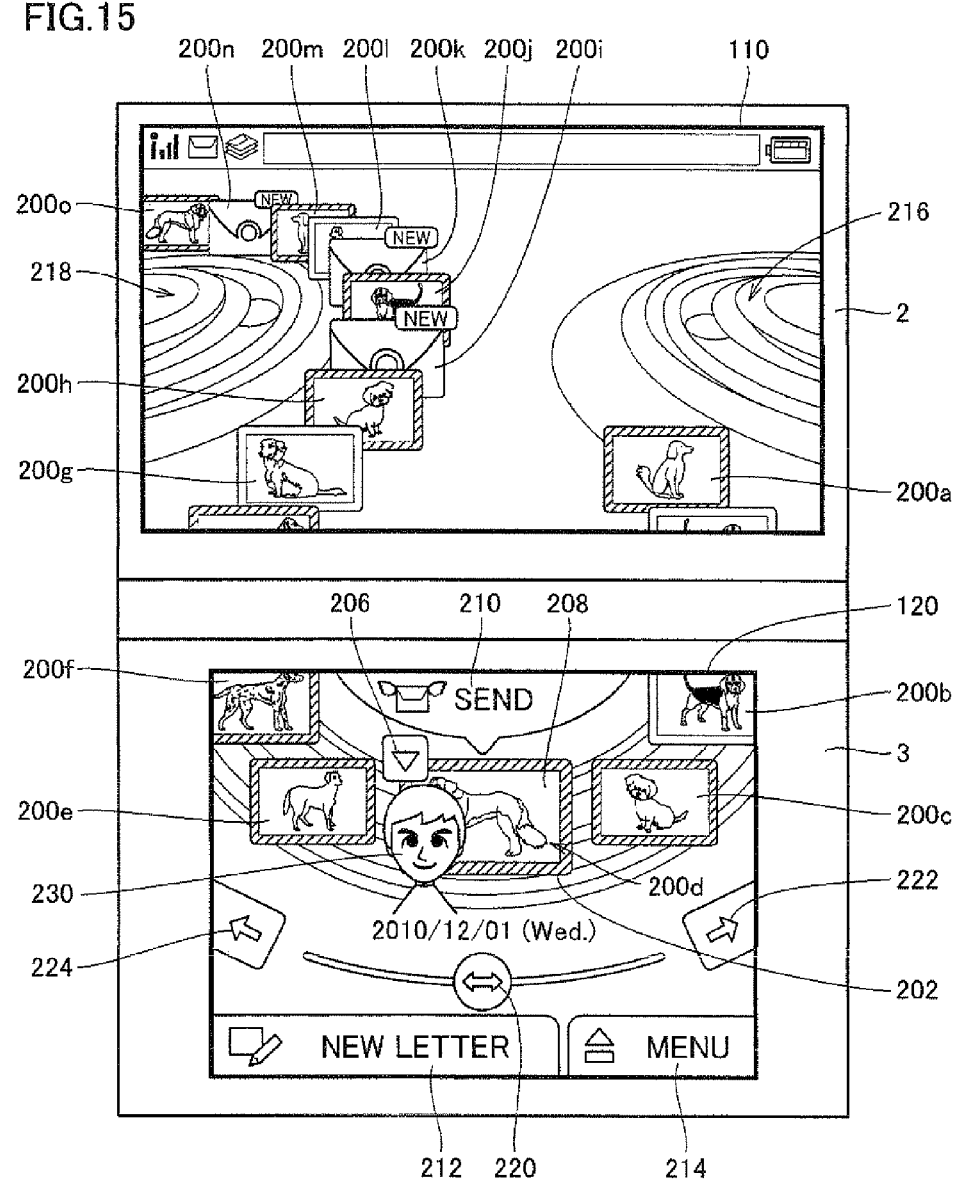
FIG. 15 is a diagram showing a display example of a creator character in the menu screen provided as a result of execution of the message application according to the embodiment of the present invention.

FIG. 15 is a diagram showing a display example of a creator character in the menu screen provided as a result of execution of the message application according to the embodiment of the present invention. When a creator character indicating any creator is associated with the message corresponding to the object selected as the reference object, a creator character 230 is displayed in association with the reference object as shown in FIG. 15.

Information (image) for displaying this creator character 230 may directly be embedded in a message to be transmitted and received. This method is suitable for a configuration in which a message is directly transmitted and received between game devices 1. Alternatively, in a case where information (image) for displaying a creator character is stored in advance in a game device carrying out transmission and reception, identification information may be provided to the creator character registered in advance and the identification information of this creator character may be embedded in the message to be transmitted and received. This method is suitable for a configuration in which a message is transmitted and received via server device SRV.

Thus, the transmitted and received message includes information indicating a creator of the message (creator character). Then, the message application according to the present embodiment causes any object included in the object group (reference object) to be displayed in association with the corresponding creator character.

In a case where a transmission message is selected as the reference object, a creator of the reference object is set as a basic user of game device 1 and thus display of the creator character corresponding to the reference object may not be provided. In addition, even in a case where a reception message is selected as the reference object, when the message is unread, display of the creator character corresponding to the reference object may not be provided.

(3) Display for Identification Between Unread and Already-Read Messages

In the message application according to the present embodiment, various types of processing associated with an object to be displayed (or a corresponding message) can be performed. By way of example of such processing, processing for displaying contents in a message in a zoomed-up manner will be described.

Figure 16:
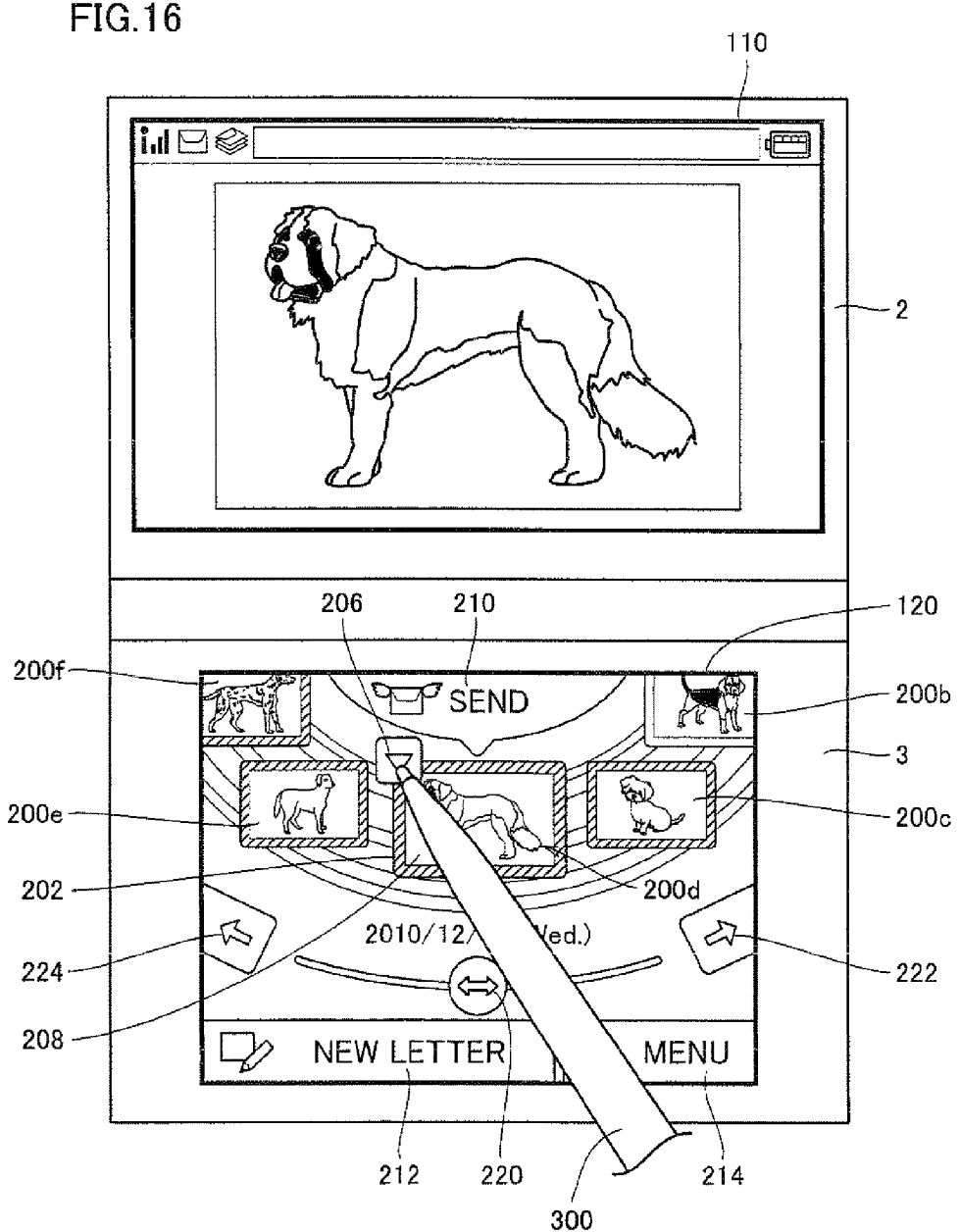
FIG. 16 is a diagram showing one example of zoomed-up display on the menu screen provided as a result of execution of the message application according to the embodiment of the present invention.

FIG. 16 is a diagram showing one example of zoomed-up display on the menu screen provided as a result of execution of the message application according to the embodiment of the present invention. As shown in FIG. 16, zoomed-up display button object 206 is displayed over an upper left portion of the object set as the reference object. Then, as the user uses stylus 300 to select zoomed-up display button object 206, contents in the selected reference object are displayed on upper LCD 110.

Thus, the message application according to the present embodiment accepts selection of one object among the plurality of displayed objects and causes upper LCD 110 to display the selected object in a zoomed-up manner. Normally, in order to achieve faster display processing, a thumbnail image is used as the object, while an image of a message body is used in a case of zoomed-up display as shown in FIG. 16.

As the object is displayed in a zoomed-up manner as shown in FIG. 16, the user can check the contents in the message. Namely, zoomed-up display of the object means that the message has already been read. Then, the message application according to the present embodiment causes the object to be displayed in a different manner of display, such that whether each message has already been read or has not yet been read can be grasped at a glance. For example, since objects 200b, 200g and 200l shown in FIG. 11 are already-read messages, thumbnail images of the corresponding messages are displayed and the contents thereof can visually be recognized. On the other hand, for example, since objects 200i, 200k and 200n shown in FIG. 11 are unread messages, a thumbnail image of the corresponding message is not shown but instead an object simulating an envelope is displayed.

Namely, the message application according to the present embodiment performs associated processing (in the example shown in FIG. 16, zoomed-up display) on the object designated by the user's operation. Here, as the information on the message, information for identifying whether the associated processing (in the example shown in FIG. 16, zoomed-up display) has been performed on the corresponding object or not is included. Then, the message application according to the present embodiment causes each object included in the object group to be displayed in a manner allowing identification of whether the associated processing has been performed or not.

Though FIG. 16 shows processing for displaying contents in the message in a zoomed-up manner by way of example of the processing associated with the object, other processing may be performed. For example, in a case where a message includes a motion picture (or a plurality of still images ordered in advance), such processing as reproducing the motion picture or the plurality of still images may be performed.

(4) Display for Identification of New Message

In the message application according to the present embodiment, regarding an unread message among reception messages, such an object as "NEW" is further added in order to indicate newly arriving information. For example, in the example shown in FIG. 11, a new arrival object indicating "NEW" is displayed over objects 200i, 200k and 200n. The new arrival object indicating "NEW" is erased as the reception message is read.

As a result of display of such a new arrival object, the user can grasp at a glance which is an object corresponding to a newly arriving message, among the plurality of objects displayed in a list.

In addition to zoomed-up display as described above, in the message application according to the present embodiment, an object of interest can be subjected to other associated processing. One example of this processing will be described with reference to FIGS. 17 to 20.

Figure 17:
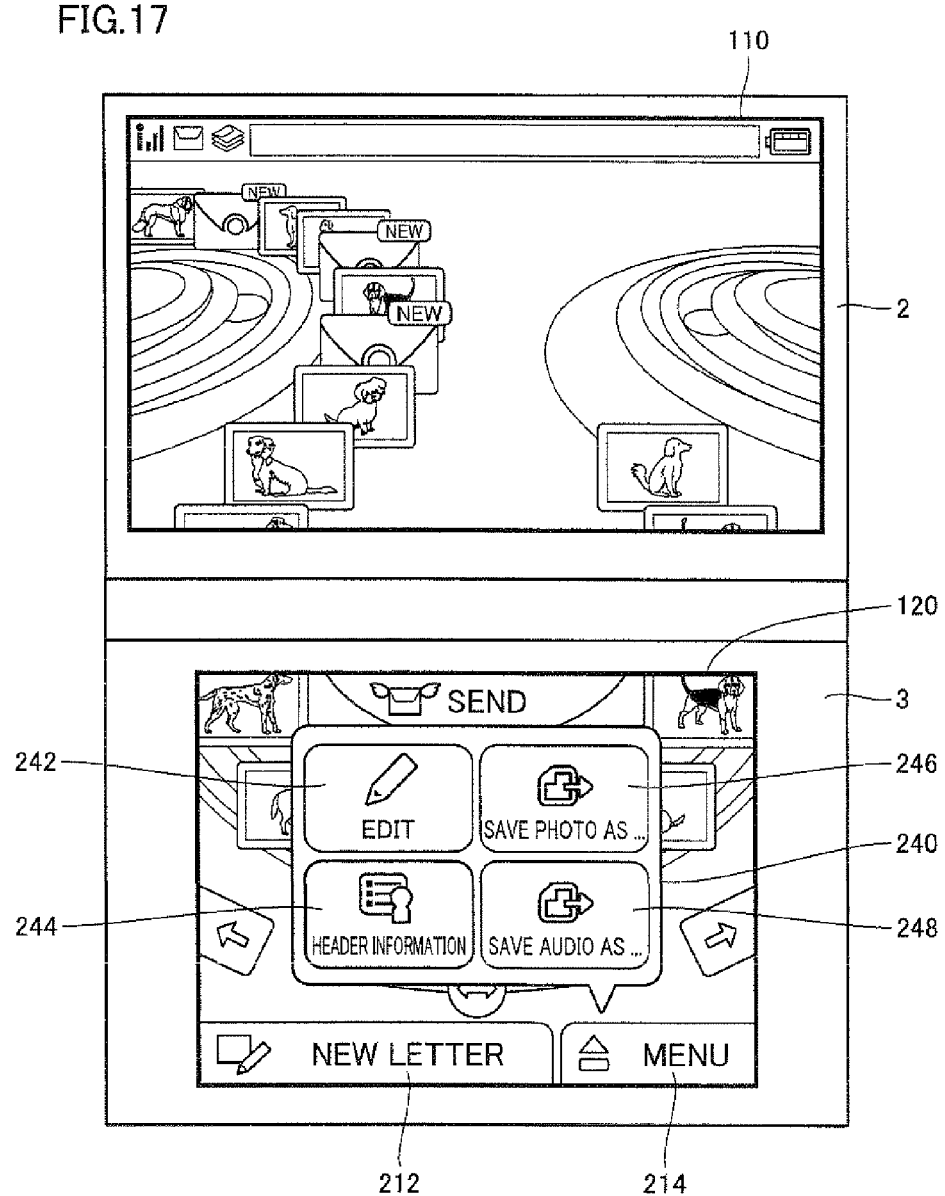
FIG. 17 is a diagram showing one example of a processing menu associated with a message provided by the message application according to the embodiment of the present invention.

FIG. 17 is a diagram showing one example of a processing menu associated with a message provided by the message application according to the embodiment of the present invention. A menu pop-up 240 shown in FIG. 17 is displayed, as a "menu" button object 214 is selected while the object corresponding to the reception message is set as the reference object.

This menu pop-up 240 includes an "edit" button object 242, a "header information" button object 244, a "save photo as . . . " button object 246, and a "save audio as . . . " button object 248. As the user uses stylus 300 or the like to press button object 242, the message creation screen is displayed. In the message creation screen displayed in this case, contents in the message corresponding to the previously selected object are initially displayed. This message creation screen will be described later.

As the user uses stylus 300 or the like to press button object 244, attribute information of the message corresponding to the selected reference object is displayed. This header information includes time and day of creation of the message, time and day of reception of the message, or the like. In addition, various types of information on the message as described above may be displayed.

As the user uses stylus 300 or the like to press button object 246, image data included in the message corresponding to the selected reference object is saved in memory card 173, non-volatile memory 136 or the like. Similarly, as the user uses stylus 300 or the like to press button object 248, audio data included in the message corresponding to the selected reference object is saved in memory card 173, non-volatile memory 136 or the like.

(h2: Message Creation Screen)

The message creation screen will now be described.

Figure 18:
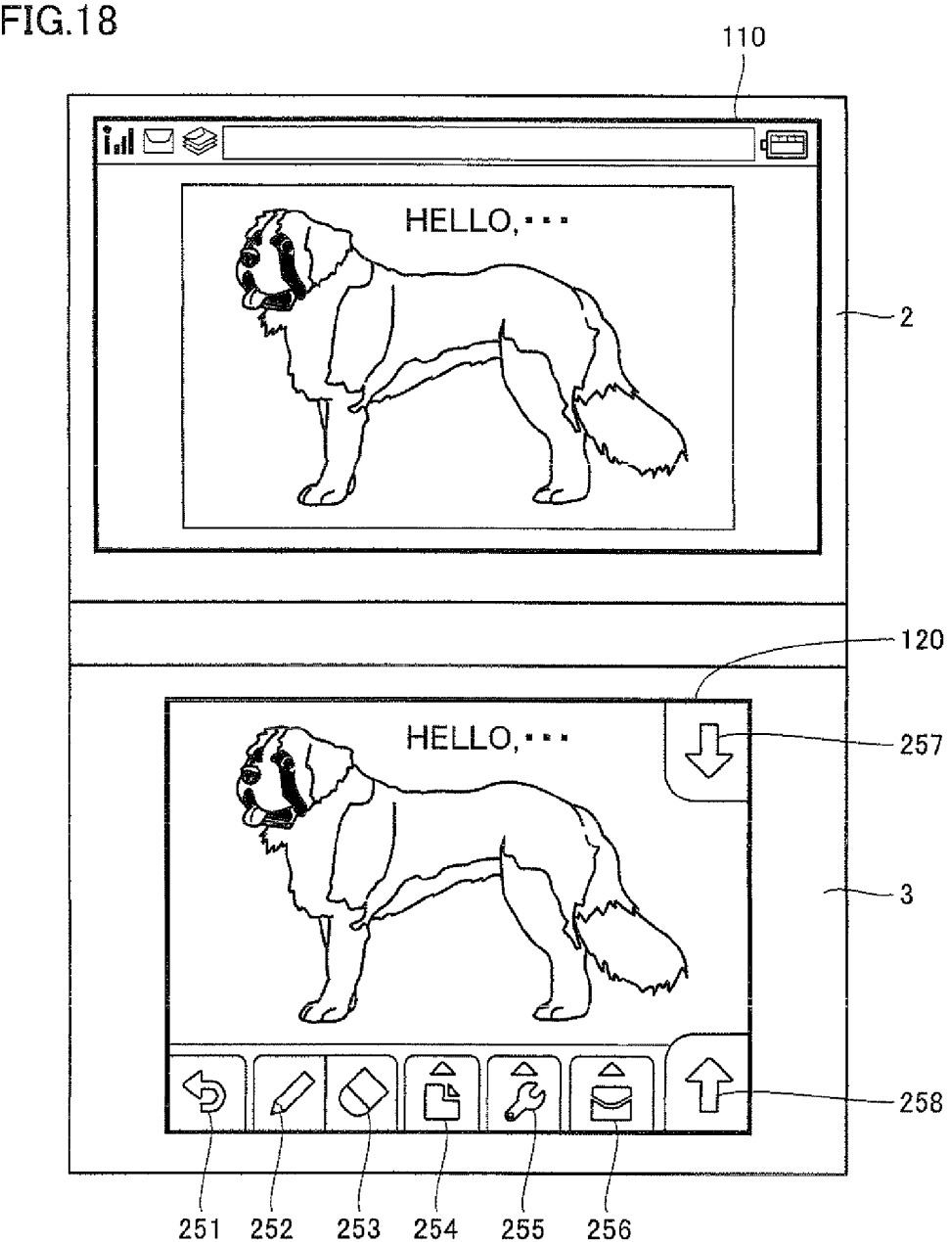
FIG. 18 is a diagram showing one example of a message creation screen provided by the message application according to the embodiment of the present invention.

FIG. 18 is a diagram showing one example of the message creation screen provided by the message application according to the embodiment of the present invention. As shown in FIG. 18, a message being crated/edited is displayed on upper LCD 110 and lower LCD 120. On lower LCD 120 to which touch panel 122 is attached, an icon group representing operations necessary for creation and edition is displayed in addition to the message being created/edited. This icon group includes a "back" icon 251, a "pencil" icon 252, an "eraser" icon 253, a "data insertion" icon 254, a "set" icon 255, a "transmit" icon 256, and "display size change" icons 257 and 258.

As the user uses stylus 300 or the like to press icon 251, the screen returns to the screen as shown in FIG. 11.

As the user uses stylus 300 or the like to press icon 252 or 253, a hand-written message (image) can be added to or deleted from a displayed image.

As the user uses stylus 300 or the like to press icon 254, image data or audio data can be added to the message.

As the user uses stylus 300 or the like to press icon 255, various types of setting (setting of property) for a message to be created can be made.

As the user uses stylus 300 or the like to press icon 256, transmission processing of the created message is started.

Icons 257 and 258 are used for changing a display size (zoomed-up display, full-screen display, or the like).

The message (object) created in the message creation screen as shown in FIG. 18 is transmitted to another game device 1 or saved in game device 1 itself. Thus, the message application according to the present embodiment provides a function to generate an object in accordance with the user's operation. Here, the generated object is provided with time information indicating the time of generation of the message. This time information is a part of information on the message described above and made use of for display or the like of the menu screen of the message application.

Though the time information provided to each message may be such that the time of creation of the message is automatically provided, the user may set arbitrary time. For example, the message transmission function supports such processing as starting transmission at the time designated for each message. Use of such a transmission function is convenient for such a case as transmitting a message on a birthday or the like of a family member, a friend or the like. Namely, by creating a message in advance and designating a time to transmit the message in advance, the message can reliably be transmitted on the intended day (birthday of a family member, a friend or the like).

Thus, the message application according to the present embodiment may provide a generated object with time information designated by the user's further operation.

The message creation screen shown in FIG. 18 is activated also when the user uses stylus 300 to press a "new letter" button object 212 displayed on the menu screen shown in FIG. 11.

Figure 19:
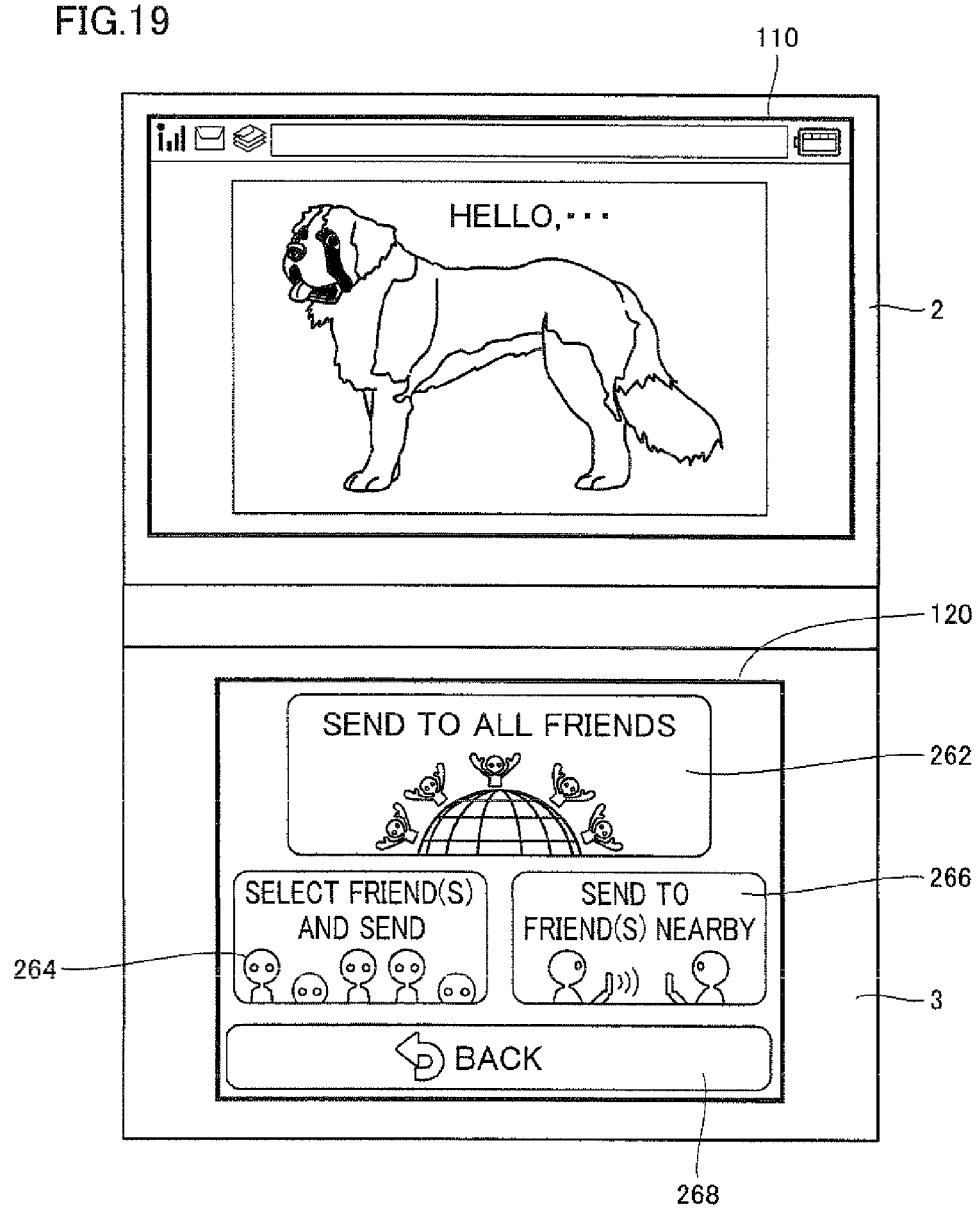
FIG. 19 is a diagram showing one example of a communication method selection screen provided by the message application according to the embodiment of the present invention.

When "transmit" icon 256 shown in FIG. 18 is pressed, the communication method selection screen shown in FIG. 19 is displayed. FIG. 19 is a diagram showing one example of the communication method selection screen provided by the message application according to the embodiment of the present invention. As shown in FIG. 19, in the communication method selection screen, a message to be transmitted is displayed on upper LCD 110, while button objects 262, 264 and 266 for selecting a transmission method are displayed on lower LCD 120.

Button objects 262 and 264 serve to select a method of transmission to another game device 1 (user) via server device SRV. More specifically, other users can be registered as destinations in server device SRV, for each user. The users registered as the destinations are also referred to as "friends". When button object 262 of "send to all friends" is pressed, a broadcast mode in which all friends registered in association with the user using game device 1 are set as the destinations is selected. On the other hand, button object 264 of "select friend(s) and send" is pressed, friends registered in association with the user using game device 1 are displayed in a list (not shown) and selection of friend(s) to be set as the destination(s) is accepted. Then, a message for which the destination has been selected is transmitted from game device 1 to server device SRV.

Meanwhile, button object 266 serves to select a method of directly transmitting a message to another game device 1. When button object 266 is pressed, game device 1 starts to send a wireless signal for transmitting the message to be transmitted. As another game device 1 capable of receiving a message approaches game device 1 in this state, the message is transmitted.

When "back" button object 268 is pressed in the communication method selection screen shown in. FIG. 19, the screen returns to the message creation screen as shown in FIG. 18.

(h3: Message Operation Screen)

The message application according to the present embodiment provides a function to operate a message that has already been created or received. A message operation screen for operating this message will be described below.

Figure 20:
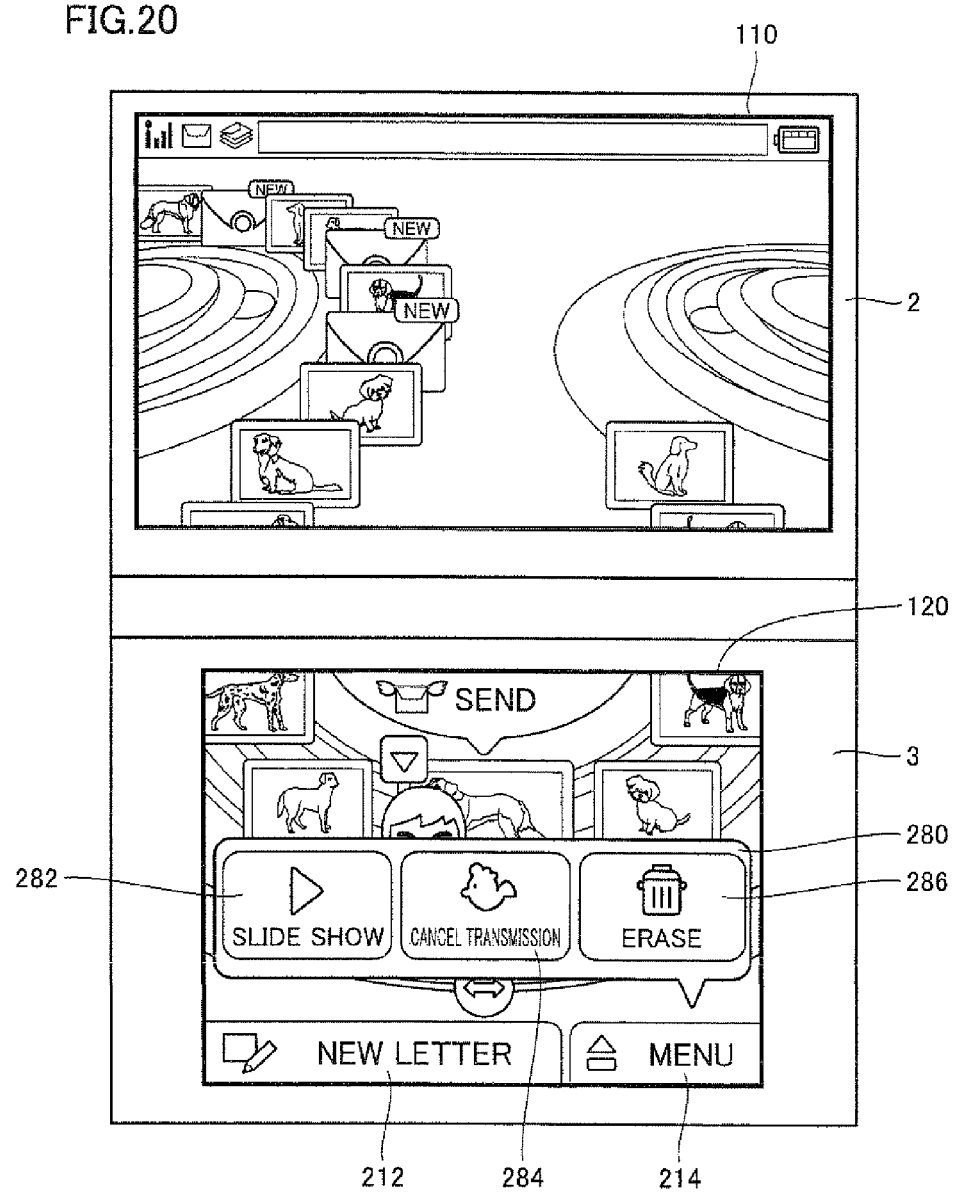
FIGS. 20 and 21 are diagrams each showing one example of a message operation menu screen provided by the message application according to the embodiment of the present invention.

FIG. 20 is a diagram showing one example of a message operation menu screen provided by the message application according to the embodiment of the present invention. A menu pop-up 280 shown in FIG. 20 is displayed, as a prescribed operation is performed while a message that has been created or received is selected.

This menu pop-up 280 includes a "slide show" button object 282, a "transmission cancel" button object 284, and an "erase" button object 286.

As the user uses stylus 300 or the like to press button object 282, slide show of the selected message is started. The message application according to the present embodiment can cause one message to include a motion picture or a plurality of images and can also express hand-written messages in the order of creation. In the message, such an effect that displayed contents are varied in association with lapse of time can be provided. In slide show, such an effect as variation in time sequence can be displayed.

As the user uses stylus 300 or the like to press button object 284, transmission of a message that has already been created but not yet been transmitted can be canceled. As described above, in the message application according to the present embodiment, a time of transmission can be designated in advance. Therefore, there is a message, of which transmission has been indicated by the user but which has not yet been transmitted, present in an out-box (transmission queue). As button object 284 is pressed, transmission of such a message that has not yet been transmitted can be canceled.

As the user uses stylus 300 or the like to press button object 286, the already-created message can selectively be erased.

(h4: Variation)

As described above, the message application according to the present embodiment provides the function to create a message replying to the received message. Therefore, there is also a case where exchange of a series of messages can preferably be grasped at a glance. In such a case, objects relating to exchange of a series of messages are preferably displayed in association with one another.

Figure 21:
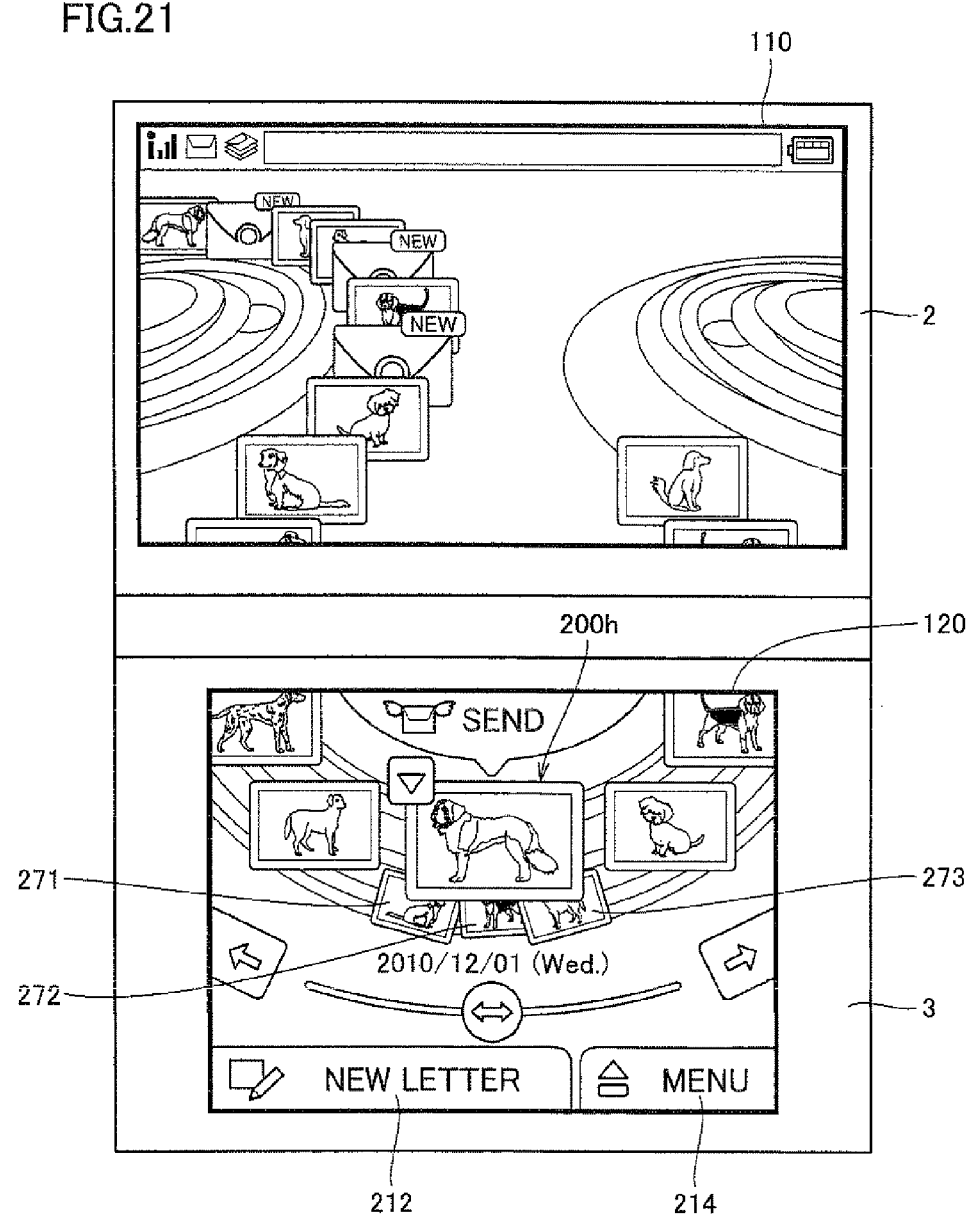

FIG. 21 is a diagram showing one example of the menu screen provided as a result of execution of the message application according to the embodiment of the present invention. As shown in FIG. 21, object 200$h$ is set as the object of interest, and three objects 271, 272 and 273 are displayed in association with this object 200$h$. These three objects 271, 272 and 273 correspond to a series of messages relating to the message corresponding to object 200$h$. It is noted that exchange of such a series of messages can be determined by making use of identification information or the like provided to the message. Namely, in replying to any message, a new message is created with identification information provided to the message to be replied being embedded. A series of messages having such common identification information is determined as being associated with one another.

J. FUNCTIONAL BLOCK

Figure 22:
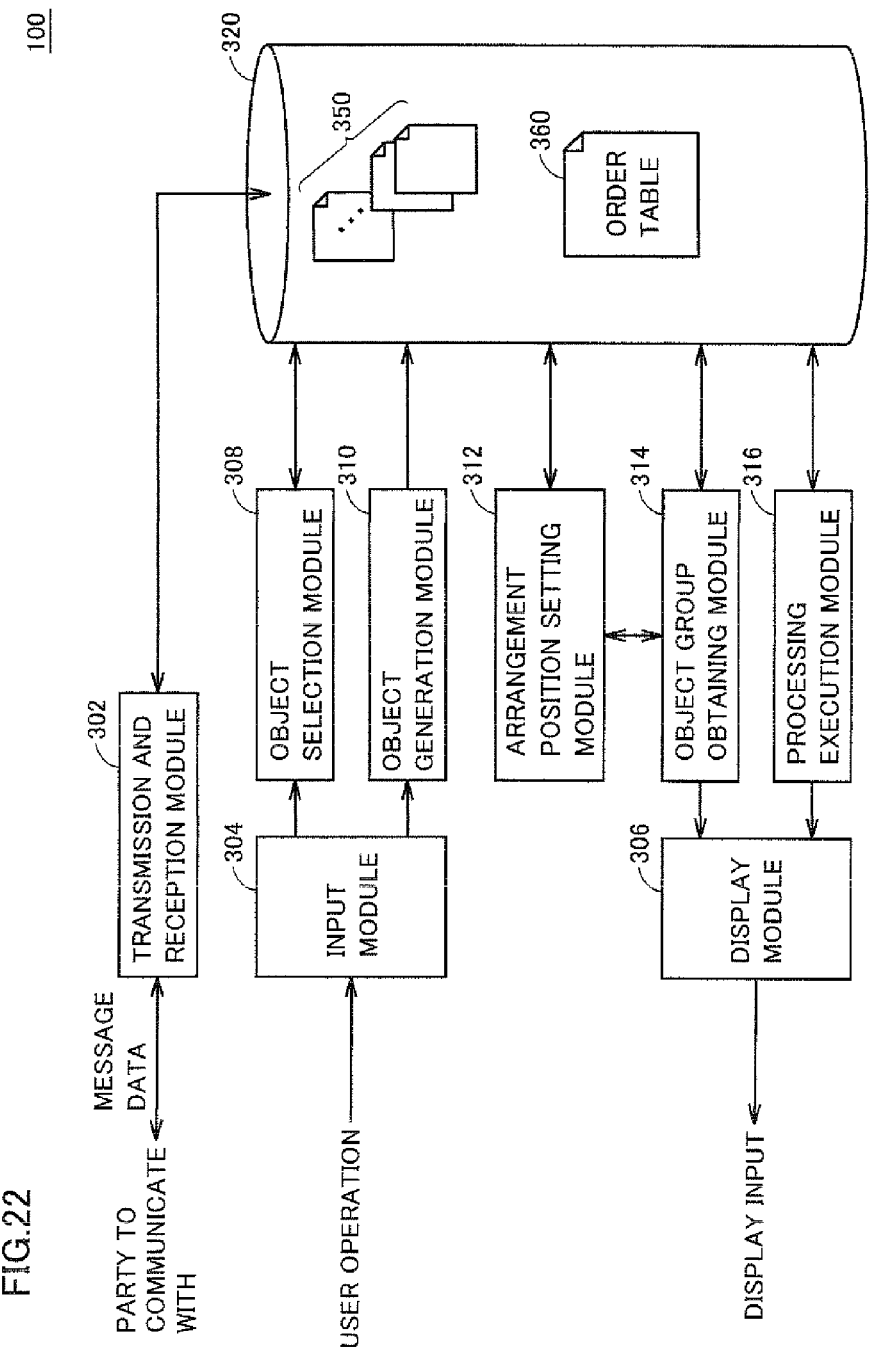
FIG. 22 is a block diagram of a function implemented in the game device according to the present embodiment.

FIG. 22 is a block diagram of a function implemented in game device 1 according to the present embodiment, Each functional block shown in FIG. 22 is implemented as a result of reading and execution of a display control program stored in game card 171 or the like by operation processing unit 100. Referring to FIG. 22, operation processing unit 100 includes as its functions, a transmission and reception module 302, an input module 304, a display module 306, an object selection module 308, an object generation module 310, an arrangement position setting module 312, an object group obtaining module 314, and a processing execution module 316. In addition, a data storage unit 320 is formed in non-volatile memory 136 or main memory 138 (FIG. 4) of game device 1. A dataset 350 and an order table 360 are held in this data storage unit 320.

Transmission and reception module 302 provides a function to transmit and receive message data to and from server device SRV or another game device 1. Transmission and reception module 302 exchanges an internal command with wireless module 134, infrared module 178 (FIG. 4) or the like for transmission and reception of data.

Input module 304 generates an internal command indicating a user's operation based on a detection signal from control pad 154, cross-shaped button 161, button groups 142 and 162, touch panel 122, and the like. In particular, input module 304 allows selection of the reference object (and an object in the vicinity thereof) displayed on lower LCD 120 with the use of the pointing device as shown in FIGS. 12 and 13.

Display module 306 controls upper LCD 110 and lower LCD 120 such that the plurality of objects are displayed in accordance with the respective arrangement positions set by arrangement position setting module 312 and the object group is displayed across upper LCD 110 and lower LCD 120. More specifically, display module 306 determines on which of upper LCD 110 and lower LCD 120 the object included in the object group is to be displayed, and provides stereoscopic display of an object determined to be displayed on upper LCD 110 and two-dimensional display of an object determined to be displayed on lower LCD 120.

In particular, display module 306 sets the reference object serving as the reference among the plurality of objects included in the object group and causes upper LCD 110 to stereoscopically display the objects such that an object ordered or positioned more distantly from the reference object is greater in stereo depth (distance in the direction of depth) in the direction perpendicular to the display surface of upper LCD 110. Here, display module 306 causes lower LCD 120 to display the reference object.

In addition, display module 306 determines stereo depth of each object in accordance with the order or the position from the reference object. Display module 306 arranges each object as well as left virtual camera 400L and right virtual camera 400R in the virtual three-dimensional space in accordance with the determined stereo depth. Moreover, display module 306 provides stereoscopic display by causing upper LCD 110 to display image for left eye PIMGL and image for right eye PIMGR obtained by image pick-up of each object by left virtual camera 400L and right virtual camera 400R respectively.

Further, display module 306 causes the plurality of objects included in the object group to be displayed in alignment along the track extending from the reference point in two different directions. More specifically, display module 306 causes the plurality of objects included in the object group to be displayed in alignment along the track in the inverted omega shape. Here, display module 306 provides stereoscopic display of the objects on upper LCD 110 such that they look overlapping in the direction of depth in accordance with stereo depth. Furthermore, display module 306 provides stereoscopic display such that an object ordered or positioned on the track more distantly from the reference object serving as the reference among the plurality of objects included in the object group is greater in stereo depth (position in the direction of depth) in the direction perpendicular to the display surface of upper LCD 110.

At the same time, display module 306 sets the reference object to serve as the reference among the plurality of objects included in the object group and causes the object ordered or positioned more distantly from the reference object to be displayed with a smaller size.

In addition, display module 306 changes the respective arrangement positions of the plurality of objects by moving the plurality of objects over the prescribed track in accordance with the user's operation while the set order of arrangement is maintained. Namely, display module 306 provides a function to scroll the object group.

Moreover, display module 306 causes each object included in the object group to be displayed in a manner in accordance with information on corresponding data (attribute information of the message). More specifically, attribute information of the message includes information for identifying whether the corresponding message is a message transmitted to another game device 1 or received from another game device 1. Display module 306 causes each object included in the object group to be displayed in a manner allowing identification of whether the corresponding message is a message that has been transmitted to another game device 1 or received from another game device 1.

In another form, attribute information of the message includes information indicating a creator of the corresponding message (creator character). Display module 306 causes an object included in the object group to be displayed in association with the corresponding creator character.

In another form, attribute information of the message includes information for identifying whether associated processing has been performed on the corresponding message or not (typically, whether the message has already been read or has not yet been read). Display module 306 causes each object included in the object group to be displayed in a manner allowing identification of whether the associated processing has been performed or not. Namely, display module 306 provides display, with identification of whether a message is an already-read message or an unread message.

Object selection module 308 accepts selection of one object from among the plurality of displayed objects in accordance with an internal command from input module 304.

Object generation module 310 generates an object (message) in accordance with a user's operation. Here, object generation module 310 provides the generated object with time information indicating the time of generation. Alternatively, object generation module 310 provides the generated object with time information designated by a user's further operation.

Arrangement position setting module 312 sets the order of arrangement of the objects in the object group. More specifically, attribute information of the message includes time information and arrangement position setting module 312 sets the order of arrangement based on this time information such that the plurality of objects are chronologically displayed.

Object group obtaining module 314 refers to dataset 350 and obtains the object group consisting of the plurality of objects to be displayed.

Processing execution module 316 performs the associated processing on the object (message) designated by a user's operation. More specifically, processing execution module 316 causes the selected object to be displayed in a zoomed-up manner.

Data held in data storage unit 320 will now be described.

Figure 23:
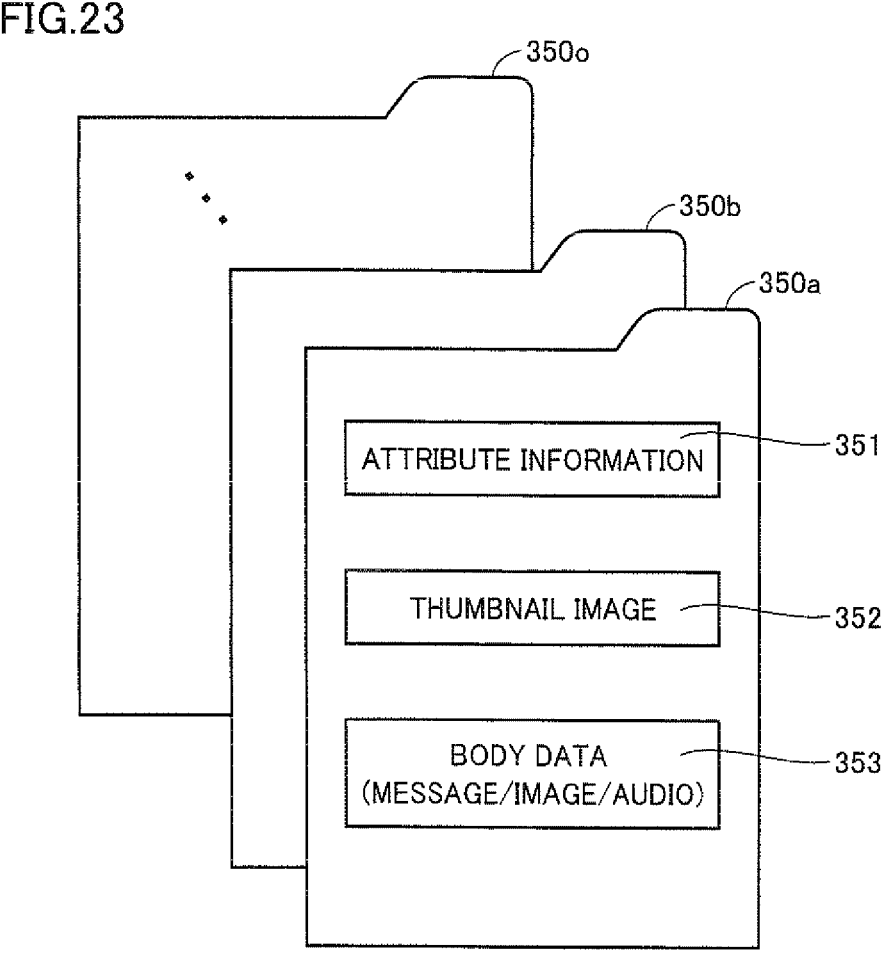
FIG. 23 is a diagram showing one example of a dataset held in the game device according to the present embodiment.

FIG. 23 is a diagram showing one example of dataset 350 held in game device 1 according to the present embodiment. Referring to FIG. 23, dataset 350 consists of data 350a, 350b, ... in correspondence with each message. Data 350a is constituted of attribute information 351, thumbnail image data 352 and body data 353.

Basically, when a message is received from another game device 1, new attribute information 351 and body data 353 are stored in dataset 350. It is noted that thumbnail image data 352 is usually generated as necessary. In a case of creation of a new message in game device 1 as well, new attribute information 351 and body data 353 are added to dataset 350.

Attribute information 351 includes information on each message. As described above, this attribute information 351 includes information as follows:

(1) Identification information indicating whether the corresponding message is either a transmission message or a reception message;

(2) Identification information indicating whether the corresponding message is either an already-read message or an unread message;

(3) Time of creation and/or time of reception of the corresponding message;

(4) Identification information indicating a data body of a creator character or the creator character of the corresponding message; and (5) Information specifying the corresponding message and messages included in a series of exchanges.

Thumbnail image data 352 is used for displaying the menu screen of the message application as shown in FIGS. 11 to 13. Thumbnail image data 352 corresponds to a reduced version of a display image of the corresponding message. Thumbnail image data 352 may be generated at the timing of display of the menu screen or at the timing of reception of the corresponding message. Alternatively, thumbnail image data 352 may be attached to a message to be transmitted.

Body data 353 is substantial data for displaying a message. Body data 353 includes a message (text and/or an image showing a hand-written message), image data, and audio data. When contents in the message are displayed in a zoomed-up manner on upper LCD 110 as shown in FIG. 16, this body data 353 is used.

Attribute information 351, thumbnail image data 352 and body data 353 may be held in one file, however, in the present embodiment, a common file name is used for each message and these three types of files are associated with one another. For example, by using a file name having an extension in accordance with the type of each file with a character string indicating the time of each message being common, such management that three types of files are associated with one message can be carried out. In this case, the file name itself serves as the attribute information (time information), and hence it is not necessarily required to store time information in attribute information 351.

A data structure of order table 360 will now be described in association with processing contents in arrangement position setting module 312 (FIG. 22).

Figure 24A:
FIGS. 24A and 24B are diagrams each showing one example of an order table held in the game device according to the embodiment of the present invention.
Figure 24B:

FIGS. 24A and 24B are diagrams each showing one example of order table 360 held in game device 1 according to the present embodiment. Referring to FIG. 24A, order table 360 includes a column of an order and a column of a file name. In the column of the file name, file names (time information) representing identification information for specifying each message are chronologically stored. By thus arranging messages chronologically based on time information, the order of arrangement of the objects is determined.

Arrangement position setting module 312 (FIG. 22) creates order table 360 by referring to dataset 350 stored in data storage unit 320. The order of arrangement of the objects is determined by creation of this order table 360.

This order table 360 is updated in response to increase and decrease in the number of objects to be displayed, that is, an event such as reception/creation of a new message, deletion of an already-received message, or the like.

For example, as shown in FIG. 24A, when the message arranged in the third place is deleted, a corresponding entry is deleted from order table 360 and the order of subsequent entries is advanced (see FIG. 24B). Similarly, when a new message is received or created, an entry corresponding to the new message is added at an appropriate position in order table 360 based on time information thereof and the order of subsequent entries is receded.

In addition, this order table 360 is referred to and the reference object is set, and then a distance of each object from the reference object (difference in the order) is calculated. In succession, a display position or a display size of each object in the menu screen of the message application is determined.

K. PROCESSING PROCEDURE

A processing procedure performed in the message application according to the embodiment of the present invention will now be described.

(k1: Overall Processing Procedure)

FIG. 25 is a flowchart involved with a processing procedure performed in game device 1 according to the present embodiment. Each step in each flowchart shown in FIG. 25 is typically provided as a result of reading and execution by operation processing unit 100 of a display control program or the like stored in game card 171 or the like. It is noted that a program executed by operation processing unit 100 does not have to be a single program and one application or a plurality of applications may be executed together with a program (or firmware) providing a basic OS (Operating System). In addition, a plurality of pieces of hardware may entirely or partially implement the processing shown below. This is also the case with each flowchart shown below.

Initially, when power button 142d (FIG. 1) is pressed to turn ON power of game device 1, operation processing unit 100 causes upper LCD 110 and lower LCD 120 to display the general menu screen (step S1). in this general menu screen, applications that can be executed on game device 1 are displayed in a list.

In succession, operation processing unit 100 determines which application has been selected (step S2). When the message application is selected (in the case of "message application" in step S2), operation processing unit 100 executes the message application (step S3). More specifically, operation processing unit 100 performs a message application subroutine which will be described later. Then, operation processing unit 100 repeatedly performs processing in step S3 until power button 142d (FIG. 1) is pressed to turn OFF power of game device 1 (step S4).

In contrast, when an application other than the message application has been selected (in the case of "other application" in step S2), operation processing unit 100 executes the selected application (step S5). Then, operation processing unit 100 repeatedly performs processing in step S5 until power button 142d (FIG. 1) is pressed to turn OFF power of game device 1 (step S6).

(k2: Message Application)

Figure 26:
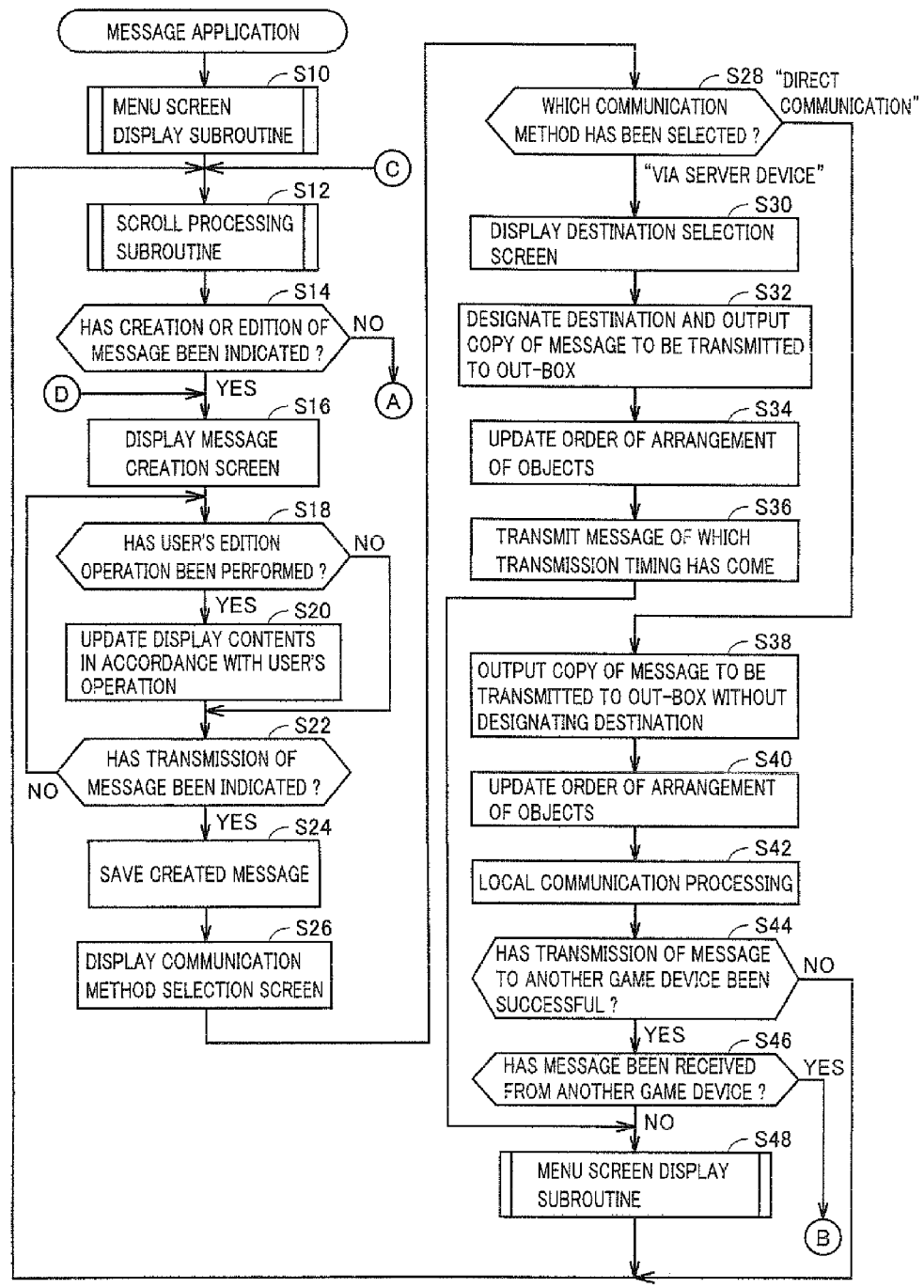
Figure 27:
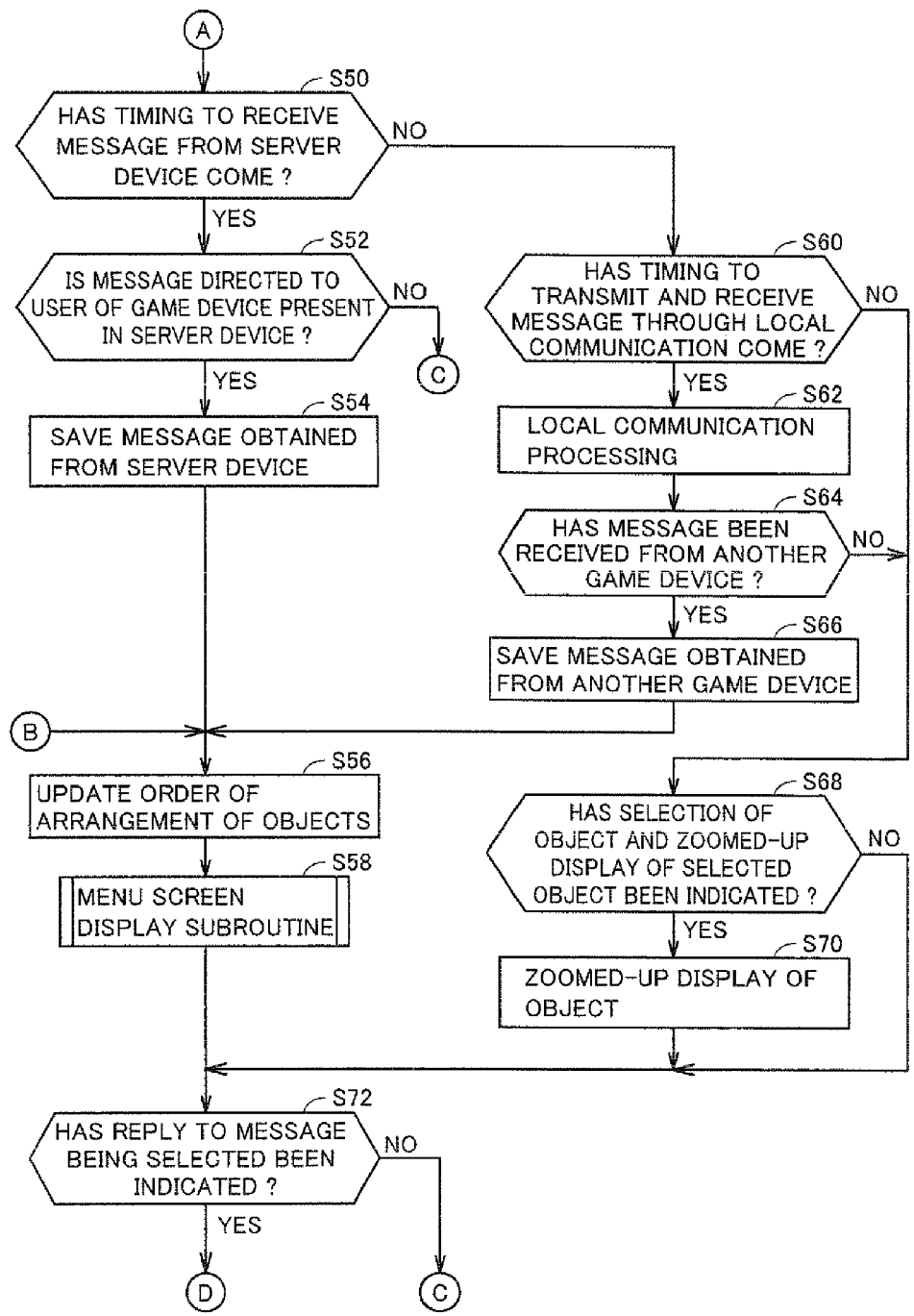
FIG. 27 is a flowchart showing a processing procedure in a message application subroutine shown in FIG. 25.
Figure 28:
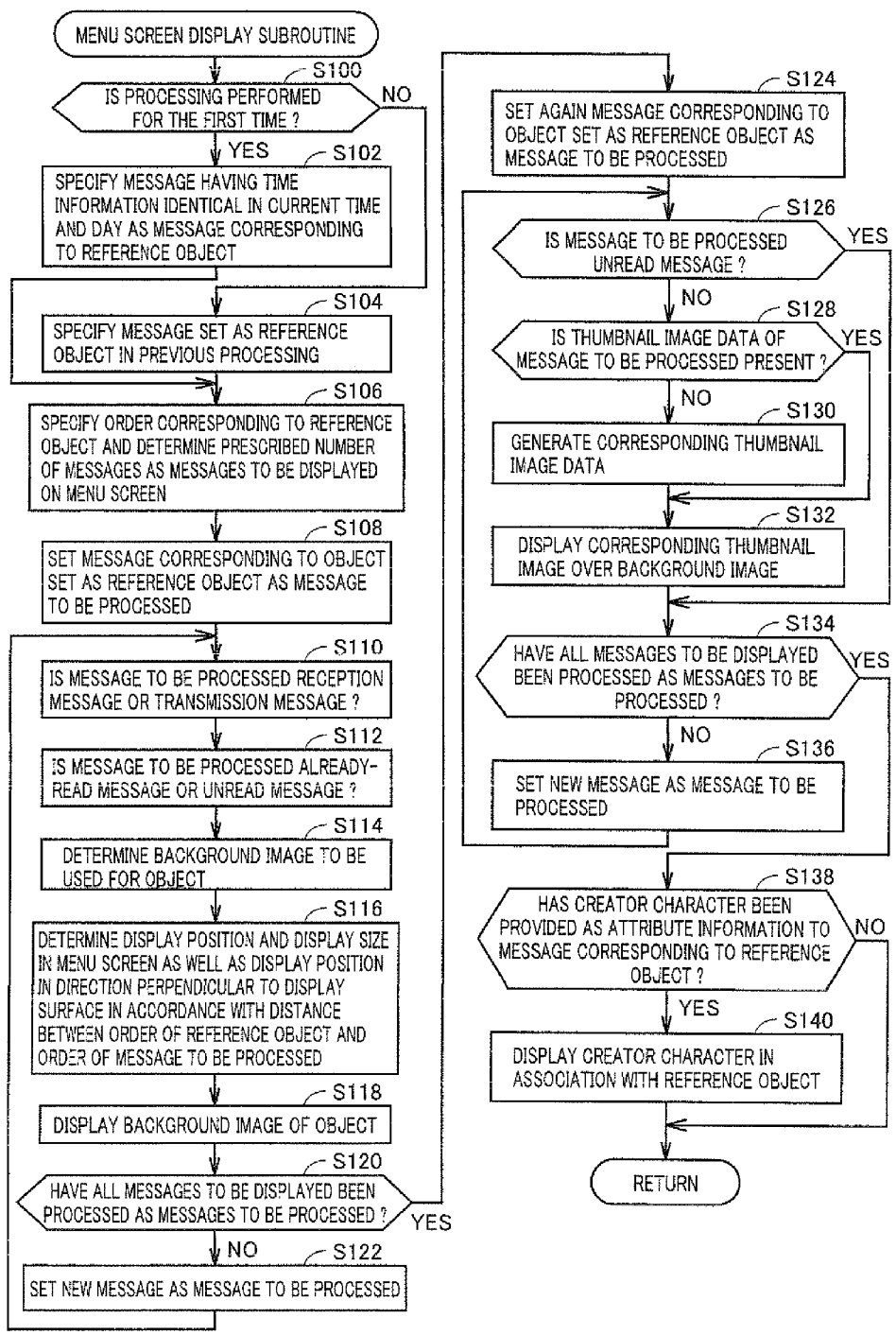
FIG. 28 is a flowchart showing processing contents in a menu screen display subroutine shown in FIGS. 26 and 27.

FIGS. 26 and 27 are flowcharts each showing a processing procedure in the message application subroutine shown in FIG. 25. Referring to FIGS. 26 and 27, operation processing unit 100 causes the menu screen of the message application to be displayed as shown in FIG. 11 (step S10). More specifically, operation processing unit 100 performs a menu screen display subroutine (FIG. 28 which will be described later). In succession, operation processing unit 100 performs processing for scrolling the object group displayed on the menu screen (step S12). More specifically, operation processing unit 100 performs a scroll processing subroutine (FIG. 29 which will be described later).

In succession, operation processing unit 100 determines whether creation or edition of the message has been indicated or not (step S14). More specifically, operation processing unit 100 determines whether or not "new letter" button object 212 has been pressed in the menu screen shown in FIG. 11. Alternatively, operation processing unit 100 determines whether "menu" button object 214 in menu pop-up 240 shown in FIG. 17 has been pressed or not.

When creation or edition of the message has been indicated (YES in step S14), operation processing unit 100 performs processing in step S16 and subsequent steps. In contrast, when creation or edition of the message has not been indicated (NO in step S14), operation processing unit 100 performs processing in step S50 and subsequent steps.

In step S16, operation processing unit 100 causes the message creation screen as shown in FIG. 18 to be displayed. In succession, operation processing unit 100 determines whether or not a user's edition operation has been performed while the message creation screen is displayed (step S18). More specifically, the user can perform (a) an operation to input a hand-written message (image), (b) an operation to attach audio data to a message, (c) an operation to attach image data to a message, (d) an operation to include a recommended link in a message, (e) an operation to change a background of a message, (f) an operation to add an effect to a message, (g) an operation to create an animation operation using a plurality of pages, and the like.

When the user's edition operation has been performed (YES in step S18), operation processing unit 100 updates display contents in accordance with the user's operation (step S20). In succession, operation processing unit 100 determines whether the user has indicated transmission of the message or not (step S22). More specifically, operation processing unit 100 determines whether "transmit" icon 256 in the message creation screen shown in FIG. 18 has been pressed or not.

When the user's edition operation has not been performed (NO in step S18), processing in step S20 is skipped and processing in step S22 is performed.

When the user indicated transmission of the message (YES in step S22), operation processing unit 100 causes the created message to be saved (step S24). More specifically, as shown in FIG. 23, at least attribute information 351 and body data 353 are newly generated in data storage unit 320.

When the user has not indicated transmission of the message (NO in step S22), processing in step S18 and subsequent steps is repeated.

After step S24 is performed, operation processing unit 100 causes the communication method selection screen shown in FIG. 19 to be displayed (step S26). In succession, operation processing unit 100 determines which communication method the user has selected (step S28). Namely, operation processing unit 100 determines whether button object 262 or 264 has been pressed or button object 266 has been pressed in the communication method selection screen shown in FIG. 19.

When a communication method of transmission via server device SRV to another game device 1 (user) has been selected ("via server device" in step S28), operation processing unit 100 performs processing in step S30 and subsequent steps. In contrast, when a communication method of directly transmitting and receiving data to and from another game device 1 has been selected ("direct communication" in step S28), operation processing unit 100 performs processing in step S38 and subsequent steps.

In step S30, operation processing unit 100 accesses server device SRV and causes a screen for selecting a destination of the message from among the registered users (friends) to be displayed. When button object 262 of "send to all friends" is pressed in the communication method selection screen shown in FIG. 19, all users registered as the initial setting are displayed as the destinations.

When processing for user's selection of the destination is completed, operation processing unit 100 designates the destination and outputs a copy of the message to be transmitted (message saved in step S24) to an out-box (transmission and reception module 302 shown in FIG. 22). In succession, operation processing unit 100 updates the order of arrangement of the objects, as a new message is saved in step S24 (step S34). Namely, operation processing unit 100 adds a new entry to order table 360 shown in FIGS. 24A and 24B and updates the order.

Thereafter, operation processing unit 100 performs transmission processing of the message of which transmission timing has come, among the messages (transmission messages) stored in the out-box (transmission queue) (step S36). Namely, operation processing unit 100 transmits to server device SRV, the message to be transmitted at the current time point. As described above, in the message application according to the present embodiment, the timing to transmit the message can be set and hence actual timing of transmission of the message may be the time designated by the user. Then, operation processing unit 100 updates the displayed menu screen by performing the menu screen display subroutine (step S48). Thereafter, the process returns to step S12.

In step S38, operation processing unit 100 outputs the copy of the message to be transmitted (message saved in step S24) to the out-box (transmission and reception module 320 shown in FIG. 22) without designating a destination (step S38). In succession, operation processing unit 100 updates the order of arrangement of the objects, as a new message is saved in step S24 (step S40). Namely, operation processing unit 100 adds a new entry to order table 360 shown in FIGS. 24A and 24B and updates the order.

In succession, operation processing unit 100 performs local communication processing (step S42) and determines whether transmission of the message to another game device 1 has been successful or not (step S44). When transmission of the message to another game device 1 has not been successful (NO in step S44), operation processing unit 100 provides display indicating failure in transmission of the message. Then, the process returns to step S12.

In contrast, when transmission of the message to another game device 1 has been successful (YES in step S44), operation processing unit 100 determines whether a message has been received from another game device 1 or not (step S46). Namely, when a message is directly exchanged with another game device 1 (in the case of local communication), a message is transmitted to another game device 1 and a message is received from another game device 1. Therefore, operation processing unit 100 determines in step S46 whether a reception message is present or not.

When a message has not been received from another game device 1 (NO in step S46), operation processing unit 100 updates the displayed menu screen by performing the menu screen display subroutine (step S48). Then, the process returns to step S12. In contrast, when a message has been received from another game device 1 (YES in step S46), the process proceeds to step S56.

In addition, in step S50, operation processing unit 100 determines whether the timing to receive a message from server device SRV has come or not (step S50). Namely, the message application according to the present embodiment accesses server device SRV in a prescribed cycle in order to obtain (fetch) a message. Therefore, in step S50, whether or not the timing of determination is in a cycle during which it should access server device SRV is determined. It is noted that the user can also explicitly indicate access to server device SRV. For example, as a button object such as check newly arriving message is pressed, access to server device SRV is made.

When the timing to receive a message from server device SRV has come (YES in step S50), operation processing unit 100 performs processing in step S52 and subsequent steps. In contrast, when the timing to receive a message from server device SRV has not yet come (NO in step S50), operation processing unit 100 performs processing in step S60 and subsequent steps.

In step S52, operation processing unit 100 accesses server device SRV and determines whether a message directed to the user of game device 1 is present or not (step S52). When the message directed to the user of game device 1 is not present (NO in step S52), the process returns to step S12.

In contrast, when the message directed to the user of game device 1 is present (YES in step S52), the message is obtained (fetched) from server device SRV and saved (step S54). In succession, operation processing unit 100 updates the order of arrangement of the objects (step S56), as the new message is saved in step S54. Namely, operation processing unit 100 adds a new entry to order table 360 shown in FIGS. 24A and 24B and updates the order. In succession, operation processing unit 100 updates the displayed menu screen by performing the menu screen display subroutine (step S58). Then, the process proceeds to step S72.

In step S60, operation processing unit 100 determines whether the timing to transmit and receive a message through local communication has come or not (step S60). Namely, the message application according to the present embodiment activates local communication in a prescribed cycle in order to obtain a message from another game device 1 through local communication. Therefore, in step S60, whether or not the timing of determination is in a period during which local communication should be activated is determined. It is noted that the user can also explicitly indicate activation of local communication. For example, as a button object such as exchange message with game device 1 present nearby is pressed, local communication is activated.

When the timing to transmit and receive a message through local communication has come (YES in step S60), operation processing unit 100 performs processing in step S62 and subsequent steps. In contrast, when the timing to transmit and receive a message through local communication has not yet come (NO in step S60), operation processing unit 100 performs processing in step S68 and subsequent steps.

In step S62, operation processing unit 100 performs local communication processing (step S62) and determines whether a message has been received from another game device 1 or not (step S64). When a message has not been received from another game device 1 (NO in step S64), the process proceeds to step S68.

In contrast, when a message has been received from another game device 1 (YES in step S64), the message obtained from another game device 1 is saved (step S66). In succession, operation processing unit 100 updates the order of arrangement of the objects (step S56), as the new message is saved in step S66. Namely, operation processing unit 100 adds a new entry to order table 360 shown in FIGS. 24A and 24B and updates the order. In succession, operation processing unit 100 updates the displayed menu screen by performing the menu screen display subroutine (step S58). Then, the process proceeds to step S72.

In step S68, operation processing unit 100 determines whether the user has indicated selection of an object and zoomed-up display of the selected object or not (step S68). When the user indicated selection of an object and zoomed-up display of the selected object (YES in step S68), operation processing unit 100 uses body data 353 of the message corresponding to the selected object so as to cause upper LCD 110 to display the object in a zoomed-up manner (step S70). Then, the process proceeds to step S72.

When the user has not indicated selection of an object and zoomed-up display of the selected object (NO in step S68), the processing in step S70 is skipped and the processing in step S72 is performed.

In step S72, operation processing unit 100 determines whether or not reply to the message being selected has been indicated or not (step S72). When reply to the message being selected has been indicated (YES in step S72), the process proceeds to step S16 and the message creation screen as shown in FIG. 18 is displayed such that a reply message can be created. On the other hand, when reply to the message being selected has not been indicated (NO in step S72), the process returns to step S12. Alternatively, not only reply but also forwarding of the message being selected can be made.

(k3: Menu Screen Display Subroutine)

FIG. 28 is a flowchart showing processing contents in the menu screen display subroutine (steps S48 and S58) shown in FIGS. 26 and 27. Referring to FIG. 28, operation processing unit 100 determines whether the processing is performed for the first time or not (step S100). Namely, whether or not the display subroutine is performed for the first time after the power of game device 1 has been turned ON is determined, Since a reference object has not been set in the initial stage, a reference object is set based on the timing of execution of the display subroutine (current time) and time information provided to the saved message. In contrast, in a stage other than the initial stage, since any object has been set as the reference object in the initial setting or by the user's operation, the menu screen of the message application is displayed based on this set reference object.

Namely, when the processing is performed for the first time (YES in step S100), a message having time information identical in current time and day among the messages saved in data storage unit 320 (FIG. 22) is specified as the message corresponding to the reference object (step S102). In contrast, when the processing is not performed for the first time (NO in step S100), the message set as the reference object in the previous processing is specified (step S104). When there is no message having time information identical in current time and day, a message having time information closest to the current time and day is specified as the message corresponding to the reference object. Alternatively, when there are plurality of messages having time information identical in current time and day, a message having time information closest to the current time among the plurality of messages is specified as the message corresponding to the reference object.

After the processing in step S102 or S104, operation processing unit 100 refers to order table 360 (FIGS. 22, 24A and 24B) and specifies the order corresponding to the reference object, as well as determines as messages to be displayed on the menu screen, a prescribed number of messages (objects) corresponding to the order within a prescribed range from the order corresponding to the reference object (step S106).

Then, operation processing unit 100 sets the message (data 350a, 350b, . . . shown in FIG. 23) corresponding to the object set as the reference object as the first message to be processed (step S108). In succession, operation processing unit 100 refers to attribute information 351 of the message to be processed and specifies which of a reception message and a transmission message the message to be processed is (step S110) as well as specifies which of an already-read message and an unread message the message to be processed is (step S112). Then, operation processing unit 100 determines background image 202 to be used for the object displayed on the menu screen (step S114).

In succession, operation processing unit 100 determines a display position and a display size in the menu screen as well as a display position in the direction perpendicular to the display surface (stereo depth: an amount of pop-up or an amount of recess) for the object indicating the message to be processed, in accordance with a distance between the order of the reference object and the order of the message to be processed in order table 360 (step S116). It is noted that operation processing unit 100 determines on which of upper LCD 110 and lower LCD 120 the display position of the object of the message to be processed is located, and when it is determined that the object is displayed on lower LCD 120, an image obtained as a result of image pick-up of the object by single virtual camera 400C (FIG. 7A) arranged in the virtual three-dimensional space is used for two-dimensional display thereof. As an alternative processing method, distance d1 between the pair of virtual cameras 400L and 400R (FIG. 7A) used for providing stereoscopic display may be set to zero and the image obtained as a result of image pick-up by one virtual camera may be used to provide two-dimensional display.

The display position of each object in the direction perpendicular to the display surface (stereo depth: an amount of pop-up or an amount of recess) can readily be calculated by defining positional relation as shown in FIG. 14 in advance.

In addition, operation processing unit 100 generates a rendering instruction for displaying background image 202 for the object indicating the message to be processed on the display portion (upper LCD 110 and/or lower LCD 120) based on the display position, the display size, and the display position in the perpendicular direction set in step S116 (step S118).

In succession, operation processing unit 100 determines whether or not all of the prescribed number of messages set as the messages to be displayed in step S108 have been processed as the messages to be processed (step S120). Namely, operation processing unit 100 determines whether display of background image 202 for all messages set as the messages to be displayed has been completed or not.

When there is a message which is to be processed but has not yet been processed among the prescribed number of messages set as the messages to be displayed (NO in step S120), operation processing unit 100 sets a new message among the prescribed number of messages set as the messages to be displayed, as a message to be processed (step S122), and repeats the processing in step S110 and subsequent steps. It is noted that, as a method of setting a message to be processed, preferably, a message corresponding to the order close to the order of the message corresponding to the reference object is successively selected. By adopting such a selection method, background image 202 is displayed alternately on the right and on the left with the reference object being located in the center, on the display portion of game device 1 (upper LCD 110 and lower LCD 120).

In contrast, when all the messages set as the messages to be displayed have already been processed as the messages to be processed (YES in step S120), operation processing unit 100 sets again a message corresponding to the object set as the reference object, as the message to be processed (step S124).

In succession, operation processing unit 100 determines whether the message to be processed is an unread message or not (step S126). When the message to be processed is an unread message (YES in step S126), the process jumps to step S134. This is because, in the case of an unread message, an object not including a thumbnail image is displayed as shown in FIG. 11 or the like.

In contrast, when the message to be processed is not an unread message (NO in step S126), operation processing unit 100 determines whether thumbnail image data 352 of the message to be processed is present or not (step S128). When thumbnail image data 352 of the message to be processed is not present (NO in step S128), operation processing unit 100 refers to body data 353 of the message to be processed and generates corresponding thumbnail image data 352 (step S130). In contrast, when thumbnail image data 352 of the message to be processed is present (YES in step S128), operation processing unit 100 skips the processing in step S130.

In succession, operation processing unit 100 generates a rendering instruction for displaying corresponding thumbnail image 208 over background image 202 based on the display position, the display size, and the display position in the perpendicular direction of background image 202 constituting the object of the message to be processed (step S132).

In succession, operation processing unit 100 determines whether or not all of the prescribed number of messages set as the messages to be displayed in step S108 have been processed as the messages to be processed (step S134). Namely, operation processing unit 100 determines whether display of thumbnail image 208 for all messages set as the messages to be displayed has been completed or not.

When there is a message which is to be processed but has not yet been processed among the prescribed number of messages set as the messages to be displayed (NO in step S134), operation processing unit 100 sets a new message among the prescribed number of messages set as the messages to be displayed, as a message to be processed (step S136), and repeats the processing in step S126 and subsequent steps. It is noted that processing for generating thumbnail image data relatively requires time and hence this generation processing is preferably performed as parallel processing.

In contrast, when all the messages set as the messages to be displayed have already been processed as the messages to be processed (YES in step S134), operation processing unit 100 determines whether or not a creator character has been provided as attribute information to the message corresponding to the reference object (step S138). When the creator character has been provided as the attribute information to the message corresponding to the reference object (YES in step S138), operation processing unit 100 generates a rendering instruction for displaying creator character 230 in association with the reference object (step S140).

After step S140 is performed or when the creator character is not provided as the attribute information to the message corresponding to the reference object (NO in step S138), the process returns.

(k4: Scroll Processing)

FIG. 29 is a flowchart showing processing contents in the scroll processing subroutine shown in FIG. 26. Referring to FIG. 29, operation processing unit 100 determines whether slide input has been detected on touch panel 122 or not (step S200). This slide input means such an operation as moving by a prescribed distance while pressing against touch panel 122 is maintained. When slide input has not been detected on touch panel 122 (NO in step S200), the process returns.

In contrast, when slide input has been detected on touch panel 122 (YES in step S200), operation processing unit 100 calculates an amount of displacement in the X direction by detected slide input (step S202). In succession, operation processing unit 100 determines whether the amount of displacement calculated in step S202 has exceeded a prescribed threshold value or not (step S204). When the amount of displacement calculated in step S202 has not exceeded the prescribed threshold value (NO in step S204), the process returns. An erroneous operation can be prevented by this processing in step S204.

When the amount of displacement calculated in step S202 has exceeded the prescribed threshold value (YES in step S204), operation processing unit 100 determines whether creator character 230 is displayed in association with the reference object or not (step S206). When creator character 230 is displayed in association with the reference object (YES in step S206), operation processing unit 100 erases displayed creator character 230 (step S208) for reducing an amount of processing during scroll processing. In contrast, when creator character 230 is not displayed in association with the reference object (NO in step S206), the processing in step S208 is skipped.

In succession, operation processing unit 100 determines a detected direction of displacement (step S210). When the detected direction of displacement is the right direction ("right direction" in step S210), operation processing unit 100 generates a rendering instruction such that the entire currently-displayed object group is displayed as being slid toward the right along a predetermined track (step S212). On the other hand, when the detected direction of displacement is the left direction ("left direction" in step S210), operation processing unit 100 generates a rendering instruction such that the entire currently-displayed object group is displayed as being slid toward the left along a predetermined track (step S214). When a speed of slide in slide input is calculated and when the speed of slide has exceeded a prescribed threshold value, the object group may be displayed such that it is slid more than the calculated amount of displacement (in such a manner that inertia is felt).

In steps S212 and S214, image data of the already-displayed object is made use of as it is, however, the display size and the display position in the perpendicular direction are also changed together with change in the display position in the menu screen. Therefore, operation processing unit 100 updates the display position of each object and sequentially updates also the display size and an amount of parallax (or a position in a direction of depth) thereof, in accordance with the detected amount of displacement.

When an object that has not been displayed on the menu screen is now displayed on the menu screen as a result of a slide operation, a thumbnail image and a background image necessary for the object are sequentially read.

Thereafter, operation processing unit 100 sets the object present at the position closest to the reference point in the menu screen as the reference object (step S216). In succession, operation processing unit 100 adjusts the display position of the object group such that the object set as the reference object is located at the reference point (step S218).

In addition, operation processing unit 100 determines whether or not a creator character has been provided as attribute information to the message corresponding to the reference object (step S220). When the creator character has been provided as the attribute information to the message corresponding to the reference object (YES in step S220), operation processing unit 100 generates a rendering instruction for displaying creator character 230 in association with the reference object (step S222).

After step S222 is performed or when the creator character is not provided as the attribute information to the message corresponding to the reference object (NO in step S222), the process returns.

L. OTHER FORMS

Though a case where a series of processes is performed in single game device 1 has been described in the embodiment above, the series of processes above may be implemented as being distributed among a plurality of entities. For example, in an information processing system including game device 1 and a server device capable of communicating with game device 1 through a network, a part of the series of processes above may be performed by the server device. In addition, in the information processing system including game device 1 and the server device capable of communicating with game device 1 through the network, a substantial part of the series of processes above may be performed by the server device and partial processing may be performed by game device 1.

Alternatively, for example, such a configuration that a communication device exchanging a message with another device is present separately from game device 1 may also be adopted. In this case as well, game device 1 and the communication device may cooperate with each other so as to implement the processing according to the present embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory storage medium encoded with a computer readable display control program executable by a computer for controlling a display having a predefined first display area configured to operate only as a stereoscopic display area and a predefined second display portion configured to operate only as a non-stereoscopic two-dimensional display, the display control program including instructions causing the computer to perform functions or operations comprising:
    creating a three-dimensional virtual space and placing an object group consisting of a plurality of moveable virtual objects within the virtual space;
    determining on which of said first display area at least a portion of the virtual object of said object group is to be displayed;
    stereoscopically displaying on said first display area at least a portion of the virtual space including any virtual object determined for display on said first display area and providing a non-stereoscopic view on said second display area of at least a portion of the virtual space including any virtual object determined for display on said second display area, wherein said object group is contiguously displayed across said stereoscopic first display area and said non-stereoscopic second display area; and
    controlling a shifting of said movable virtual objects between said stereoscopic first display portion and said non-stereoscopic second display area, wherein said virtual objects may be displayed as scrollable or shiftable in a manner crossing between said stereoscopic first display area and said non-stereoscopic second display area while displaying said object group contiguously across said stereoscopic first display area and said non-stereoscopic second display area.

2. The non-transitory storage medium encoded with a computer readable display control program according to claim 1 further including instructions causing the computer to set arrangement positions of the respective objects in accordance with a predetermined order of arrangement.

3. The non-transitory storage medium encoded with a computer readable display control program according to claim 2 further including instructions causing the computer to set a reference object serving as reference among the plurality of virtual objects included in said object group, and to stereoscopically display virtual objects on said first display area in a manner such that an object ordered or positioned more distantly from said reference object appears at greater depth in a direction perpendicular to a display surface of said first display area.

4. The non-transitory storage medium encoded with a computer readable display control program according to claim 3 further including instructions causing the computer to set the arrangement positions of virtual objects displayed on said first display area such that an object ordered or positioned further from said reference object appears at a greater depth in the virtual three-dimensional space, and
    instructions for stereoscopically displaying the virtual space such that an object ordered or positioned further from said reference object appears at a greater depth in the direction perpendicular to the display surface of said first display area, by arranging a left virtual camera and a right virtual camera in said virtual three-dimensional space and causing said first display area to display an image for left eye and an image for right eye obtained as a result of image pick-up of each object by said left virtual camera and said right virtual camera respectively.

5. The non-transitory storage medium encoded with a computer readable display control program according to claim 3 further including instructions causing the computer to accept user operations via a display pointing device, and instructions for displaying at least said reference object on said second display area, and
    instructions for enabling selection of said reference object displayed on said second display area by using said pointing device.

6. The non-transitory storage medium encoded with a computer readable display control program according to claim 1, wherein the display control program further includes
    instructions for stereoscopically displaying virtual objects on said first display area in a manner overlapping in a direction of depth in accordance with stereo depth in a direction perpendicular to a display surface of said first display area.

7. The non-transitory storage medium encoded with a computer readable display control program according to claim 1, wherein the display control program further includes instructions causing said computer of said display to interact with transmission and reception instructions for transmitting and receiving data of a displayed object to and from another device, and instructions for displaying each object included in said object group in a manner in accordance with information on corresponding data.

8. The non-transitory storage medium encoded with a computer readable display control program according to claim 7, wherein
    said information on said corresponding data includes information for identifying whether the data is data that has been transmitted to another device or received from another device, and the display control program further includes instructions for displaying each object included in said object group in a manner allowing identification of whether the corresponding data is data that has been transmitted to another device or received from another device.

9. The non-transitory storage medium encoded with a computer readable display control program according to claim 8, wherein
    said information on said corresponding data includes information indicating a creator of the data, and the display control program further includes instructions for displaying an object included in said object group in association with the information indicating the corresponding creator.

10. The non-transitory storage medium encoded with a computer readable display control program according to claim 7, wherein
    said display control program further includes processing execution instructions for performing associated processing on an object designated by a user's operation, said information on said corresponding data includes information for identifying whether the associated processing has been performed on a corresponding object, and
instructions for displaying each object included in said object group in a manner allowing identification of whether the associated processing has been performed.

11. The non-transitory storage medium encoded with a computer readable display control program according to claim 10, wherein
said display control program further includes object selection instructions for accepting selection of one object from among the displayed plurality of objects, and
said processing execution instructions include instructions for displaying the object selected by execution of said object selection instructions in a zoomed-up manner.

12. The non-transitory storage medium encoded with a computer readable display control program according to claim 1, wherein the display control program further includes instructions for displaying a plurality of virtual objects of said object group in alignment along a track extending in two different directions from a predetermined reference point.

13. The non-transitory storage medium encoded with a computer readable display control program according to claim 1, wherein the display control program further includes instructions for displaying the plurality of objects included in said object group in alignment along a track in an inverted omega shape.

14. The non-transitory storage medium encoded with a computer readable display control program according to claim 12, wherein the display control program further includes instructions for stereoscopically displaying the virtual space such that an object ordered or positioned on the track more distantly from a reference object serving as reference among the plurality of objects included in said object group appears at a greater depth in a direction perpendicular to a display surface of said predetermined first display area.

15. The non-transitory storage medium encoded with a computer readable display control program according to claim 1, wherein
one or more virtual objects may have time information associated therewith, and said display control program further includes instructions for setting relative arrangement positions of virtual objects such that displayed virtual objects are arranged spatially with respect to one another in a chronological order based on the time information associated to each object included in said object group.

16. The non-transitory storage medium encoded with a computer readable display control program according to claim 13, wherein
said display control program further includes object generation instructions for generating an object in accordance with a user's operation, and
said object generation instructions include instructions for providing the generated object with time information indicating one of either a time of generation or a time designated by the user's operation.

17. The non-transitory storage medium encoded with a computer readable display control program according to claim 2, wherein the display control program further includes instructions for changing in accordance with a user's operation respective arrangement positions of said plurality of objects by moving said plurality of objects over a prescribed track while a set order of arrangement is maintained.

18. The non-transitory storage medium encoded with a computer readable display control program according to claim 1, wherein the display control program further includes instructions for setting a reference object serving as reference among the plurality of objects included in said object group and for displaying an object ordered or positioned more distantly from said reference object with a smaller size on said first display area.

19. A display apparatus, comprising:
a predefined first display area configured to operate only as a stereoscopic display area;
a predefined second display area configured to operate only as a non-stereoscopic two-dimensional display area; and
a display information processing system, including at least one computer processor, the processing system being configured to:
place an object group consisting of a plurality of moveable virtual objects within a virtual space;
control a shifting of said moveable virtual objects between said stereoscopic first display area and said non-stereoscopic second display area, using said at least one computer processor, wherein said virtual objects may be displayed as scrollable or shiftable in a manner crossing between said stereoscopic first display area and said non-stereoscopic second display area while displaying said object group contiguously across said stereoscopic first display area and said non-stereoscopic second display area;
determine on which of said first display area and said second display area a virtual object of said object group is to be displayed, and
stereoscopically display on said first display area at least a portion of the virtual space including any virtual object determined for display on said first display area and provide a non-stereoscopic view on said second display area of at least a portion of the virtual space including any virtual object determined for display on said second display area, wherein said object group is contiguously displayed across said stereoscopic first display area and said non-stereoscopic second display area.

20. A display system including one or more computer processor, comprising:
a display having a predefined first display area configured to operate only as a stereoscopic display area and a predefined second display area configured to operate only as a non-stereoscopic two-dimensional display area;
one or more computer processor configured to create a three-dimensional virtual space and place an object group consisting of a plurality of moveable virtual objects another within the virtual space;
an object display controller configured to control a shifting of said moveable virtual objects between said stereoscopic first display area and said non-stereoscopic second display area, wherein said virtual objects may be displayed as scrollable of shiftable in a manner crossing between said stereoscopic first display area and said non-stereoscopic second display area while displaying said object group contiguously across said stereoscopic first display area and said non-stereoscopic second display area, and
said object display controller also configured to determine on which of said first display area and said second display area each virtual object of said object group is to be displayed, and to stereoscopically display on said first display area at least a portion of the virtual space including any virtual object determined for display on said first display area and provide a non-stereoscopic view on said second display area of at least a portion of the virtual space including any virtual object determined to be displayed on said second display area, wherein said object group is contiguously displayed across said stereoscopic first display area and said non-stereoscopic second display area.

21. A display control method performed by one or more computer processor of a display device having a predefined first display area configured to operate only as a stereoscopic display area and a predefined second display area configured to operate only as a non-stereoscopic two-dimensional display area, comprising:
  placing an object group consisting of a plurality of moveable virtual objects within a three-dimensional virtual space;
  controlling, using said one or more computer processor, a of said moveable virtual objects between said stereoscopic first display area and said non-stereoscopic second display area, wherein said virtual objects may be displayed as scrollable of shiftable in a manner crossing between said stereoscopic first display area and said non-stereoscopic second display area while displaying said object group contiguously across said stereoscopic first display and said non-stereoscopic second display;
  determining, using said one or more processor, on which of said first display area and said second display area each virtual object of said object group is to be displayed; and
  stereoscopically displaying on said first display area at least a portion of the virtual space including any virtual object determined for display on said first display area and providing a non-stereoscopic view on said second display area of at least a portion of the virtual space including any virtual object determined for display on said second display area, wherein said object group is contiguously displayed across said stereoscopic first display and said non-stereoscopic second display.

22. A non-transitory storage medium encoded with a computer readable display control program executable by a computer for controlling a display having a predefined first display area configured to operate only as a stereoscopic display area and a predefined second display area configured to operate only as a non-stereoscopic two-dimensional display area, the computer readable display control program comprising:
  object group placing instructions which cause said computer to place an object group consisting of a plurality of movable objects within a virtual space;
  object display instructions for causing said computer to control a shifting of said moveable objects between said stereoscopic first display area and said non-stereoscopic second display area, wherein said objects may be displayed as scrollable of shiftable in a manner crossing between said stereoscopic first display area and said non-stereoscopic second display area while displaying said object group contiguously across said stereoscopic first display area and said non-stereoscopic second display area;
  display area determining instructions for causing said computer to determine on which of said stereoscopic first display area and said non-stereoscopic second display area an object included in said object group is to be displayed, and
  display output instructions for causing a display apparatus to display a stereoscopic view of at least a portion of the virtual space including at least one object determined for display on said stereoscopic first display area and for causing the display apparatus to display a non-stereoscopic view on said second display area of at least a portion of the virtual space including an object determined for display on said non-stereoscopic second display area, wherein said object group is contiguously displayed across said stereoscopic first display area and said non-stereoscopic second display area.

23. The system according to claim 20 wherein said first predefined display area and second predefined display area are physically separated.

24. The system according to claim 23 wherein said display is a single display screen.

25. The system according to claim 23 wherein said display comprises two display screens, the first display screen for providing the stereoscopic first display area and the second display screen for providing the non-stereoscopic second display area.

* * * * *